US011709331B2

(12) United States Patent
Sedor et al.

(10) Patent No.: US 11,709,331 B2
(45) Date of Patent: *Jul. 25, 2023

(54) MODULAR FIBER OPTIC TRAY

(71) Applicant: Panduit Corp., Tinley Park, IL (US)

(72) Inventors: Thomas M. Sedor, Orland Park, IL (US); Jerry A. Wiltjer, Frankfort, IL (US); Robert A. Reid, Battleground, IN (US); Joseph E. Sanders, Elwood, IL (US); Joel D. Kwasny, Plainfield, IL (US); Bon B. Sledzinski, Westmont, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,576

(22) Filed: Jun. 7, 2022

(65) Prior Publication Data
US 2022/0299724 A1 Sep. 22, 2022

Related U.S. Application Data

(60) Continuation of application No. 16/924,768, filed on Jul. 9, 2020, now Pat. No. 11,372,185, which is a (Continued)

(51) Int. Cl.
G02B 6/00 (2006.01)
G02B 6/44 (2006.01)
G02B 6/38 (2006.01)

(52) U.S. Cl.
CPC ......... *G02B 6/4452* (2013.01); *G02B 6/3897* (2013.01); *G02B 6/4453* (2013.01); *G02B 6/4455* (2013.01)

(58) Field of Classification Search
CPC .. G02B 6/4452; G02B 6/3897; G02B 6/4453; G02B 6/4455; G02B 6/00
See application file for complete search history.

(56) References Cited

U.S. PATENT DOCUMENTS 2,056,219 A 10/1936 Stout et al.
2,550,339 A 4/1951 Ehrman
(Continued)

FOREIGN PATENT DOCUMENTS

CN 1319194 A 10/2001
CN 103004041 3/2013
(Continued)

OTHER PUBLICATIONS

Pretium Edge® Advanced Optical (AO) Solutions Features and Benefits; Corning Cable Systems LLC; 1 page; May 2013.
(Continued)

*Primary Examiner* — Jennifer Doan
(74) *Attorney, Agent, or Firm* — Christopher S. Clancy; James H. Williams; Peter S. Lee

(57) ABSTRACT

The present invention provides modular trays having cutout features that are configured to engage with a mounting feature of one or more removable rails. The removable rails may be removably secured to a tray body in a plurality of positions to allow a user to install or uninstall rails to support different sized fiber optic modules. For example, a tray may support a twenty-four optical fiber module, two twelve optical fiber modules, or three eight optical fiber modules. Fiber optic enclosures housing the trays can be affixed to the outside of a fiber optic enclosure and allow for easy stacking and unstacking.

16 Claims, 68 Drawing Sheets

Related U.S. Application Data continuation of application No. 16/257,830, filed on Jan. 25, 2019, now Pat. No. 10,725,258, which is a division of application No. 15/628,818, filed on Jun. 21, 2017, now Pat. No. 10,215,944.

(60) Provisional application No. 62/356,662, filed on Jun. 30, 2016.

(56) References Cited

U.S. PATENT DOCUMENTS

| | | | |
|---|---|---|---|
| 3,392,543 | A | 7/1968 | Miller |
| 3,478,535 | A | 11/1969 | Perez et al. |
| 4,034,572 | A | 7/1977 | Morris et al. |
| 4,266,853 | A | 5/1981 | Hutchings et al. |
| 4,585,303 | A | 4/1986 | Pinsard et al. |
| 4,655,521 | A | 4/1987 | Thomas |
| 4,792,203 | A | 12/1988 | Nelson et al. |
| 4,824,196 | A | 4/1989 | Bylander |
| 4,846,565 | A | 7/1989 | Swanson et al. |
| 4,986,762 | A | 1/1991 | Keith |
| 5,046,811 | A | 9/1991 | Jung et al. |
| 5,129,030 | A | 7/1992 | Petrunia |
| 5,142,606 | A | 8/1992 | Carney et al. |
| 5,167,001 | A | 11/1992 | Debortoli et al. |
| 5,212,761 | A | 5/1993 | Petrunia |
| 5,325,455 | A | 6/1994 | Henson et al. |
| 5,339,379 | A | 8/1994 | Kutsch et al. |
| 5,370,541 | A | 12/1994 | Bossard |
| 5,442,726 | A | 8/1995 | Howard et al. |
| 5,448,670 | A | 9/1995 | Blew et al. |
| 5,490,229 | A | 2/1996 | Ghandeharizadeh et al. |
| 5,497,444 | A | 3/1996 | Wheeler |
| 5,511,144 | A | 4/1996 | Hawkins et al. |
| 5,647,043 | A | 7/1997 | Anderson et al. |
| 5,717,810 | A | 2/1998 | Wheeler |
| 5,758,003 | A | 5/1998 | Wheeler et al. |
| 5,804,765 | A | 9/1998 | Siemon et al. |
| 5,836,786 | A | 11/1998 | Pepe |
| 5,902,155 | A | 5/1999 | Polgar et al. |
| 5,946,440 | A | 8/1999 | Puetz |
| 5,978,540 | A | 11/1999 | Bechamps et al. |
| 6,017,238 | A | 1/2000 | Johnston |
| 6,080,011 | A | 6/2000 | Tsao et al. |
| 6,085,003 | A | 7/2000 | Knight |
| 6,086,415 | A | 7/2000 | Sanchez et al. |
| 6,095,852 | A | 8/2000 | Gregory, II |
| 6,109,978 | A | 8/2000 | Stellman et al. |
| 6,167,183 | A | 12/2000 | Swain |
| 6,203,130 | B1 | 3/2001 | Montgelas et al. |
| 6,210,216 | B1 | 4/2001 | Tso-Chin et al. |
| 6,356,697 | B1 | 3/2002 | Braga et al. |
| 6,396,992 | B1 | 5/2002 | Debal |
| 6,591,051 | B2 | 7/2003 | Solheid et al. |
| 6,768,860 | B2 | 7/2004 | Liberty |
| 6,769,551 | B2 | 8/2004 | Rafferty et al. |
| 6,771,861 | B2 | 8/2004 | Wagner et al. |
| 6,788,846 | B2 | 9/2004 | Hileman et al. |
| 6,920,274 | B2 | 7/2005 | Rapp et al. |
| 6,944,389 | B2 | 9/2005 | Giraud et al. |
| 6,946,600 | B1 | 9/2005 | Stoller et al. |
| 6,974,438 | B2 | 12/2005 | Bentley |
| 7,000,784 | B2 | 2/2006 | Canty et al. |
| 7,031,588 | B2 | 4/2006 | Cowley et al. |
| 7,087,840 | B2 | 8/2006 | Herring et al. |
| 7,113,687 | B2 | 9/2006 | Womack et al. |
| 7,147,383 | B2 | 12/2006 | Sullivan |
| 7,200,314 | B2 | 4/2007 | Womack et al. |
| 7,200,316 | B2 | 4/2007 | Giraud et al. |
| 7,318,321 | B2 | 1/2008 | Grassmuck et al. |
| 7,320,507 | B2 | 1/2008 | White et al. |
| 7,330,629 | B2 | 2/2008 | Cooke et al. |
| 7,376,321 | B2 | 5/2008 | Bolster et al. |
| RE40,375 | E | 6/2008 | Abel et al. |
| 7,416,347 | B2 | 8/2008 | Livingston et al. |
| 7,418,182 | B2 | 8/2008 | Krampotich |
| 7,509,015 | B2 | 3/2009 | Murano |
| 7,529,458 | B2 | 5/2009 | Spisany et al. |
| 7,532,799 | B2 | 5/2009 | Gronvall et al. |
| 7,570,861 | B2 | 8/2009 | Smrha et al. |
| 7,628,644 | B1 | 12/2009 | Peluffo et al. |
| 7,672,561 | B1 | 3/2010 | Keith et al. |
| 7,681,187 | B2 | 3/2010 | Spitaels et al. |
| 7,682,187 | B2 | 3/2010 | Spitaels et al. |
| 7,686,518 | B2 | 3/2010 | Case et al. |
| 7,689,089 | B2 | 3/2010 | Wagner et al. |
| 7,722,411 | B2 | 5/2010 | Merrow et al. |
| 7,729,586 | B2 | 6/2010 | Keith |
| 7,744,176 | B2 | 6/2010 | Milligan |
| 7,756,378 | B2 | 7/2010 | Ruiz |
| 7,756,380 | B2 | 7/2010 | Ruiz et al. |
| 7,760,983 | B2 | 7/2010 | Jadaud |
| 7,826,705 | B2 | 11/2010 | McGranahan et al. |
| D628,462 | S | 12/2010 | Sato |
| 7,854,333 | B2 | 12/2010 | Kottke et al. |
| 7,856,166 | B2 | 12/2010 | Biribuze et al. |
| 7,876,995 | B2 | 1/2011 | Keith et al. |
| 7,887,244 | B2 | 2/2011 | Milette et al. |
| 7,889,961 | B2 | 2/2011 | Cote et al. |
| 7,903,925 | B2 | 3/2011 | Cooke et al. |
| 7,945,135 | B2 | 5/2011 | Cooke et al. |
| 7,945,136 | B2 | 5/2011 | Cooke et al. |
| 7,962,000 | B2 | 6/2011 | Wagner et al. |
| 7,974,105 | B2 | 7/2011 | Dean, Jr. et al. |
| 7,979,985 | B2 | 7/2011 | Spitaels et al. |
| 8,014,646 | B2 | 9/2011 | Keith et al. |
| 8,038,015 | B2 | 10/2011 | Laursen et al. |
| 8,038,354 | B2 | 10/2011 | Nielson et al. |
| 8,061,534 | B2 | 11/2011 | Laursen et al. |
| 8,075,198 | B2 | 12/2011 | Milette et al. |
| 8,075,344 | B2 | 12/2011 | Shih |
| 8,121,458 | B2 | 2/2012 | Barth et al. |
| 8,135,257 | B2 | 3/2012 | Cooke et al. |
| 8,154,886 | B2 | 4/2012 | Hendrix et al. |
| 8,179,684 | B2 | 5/2012 | Smrha et al. |
| 8,184,938 | B2 | 5/2012 | Cooke et al. |
| 8,203,450 | B2 | 6/2012 | German et al. |
| 8,254,742 | B2 | 8/2012 | Womack |
| 8,280,216 | B2 | 10/2012 | Cooke et al. |
| 8,285,104 | B2 | 10/2012 | Davis et al. |
| 8,290,332 | B2 | 10/2012 | Mudd |
| 8,290,333 | B2 | 10/2012 | Barlowe et al. |
| 8,297,854 | B2 | 10/2012 | Bickham et al. |
| 8,301,004 | B2 | 10/2012 | Cooke et al. |
| 8,326,107 | B2 | 12/2012 | Cooke et al. |
| 8,331,752 | B2 | 12/2012 | Biribuze et al. |
| 8,403,599 | B2 | 3/2013 | Hawkins et al. |
| 8,411,465 | B2 | 4/2013 | Dean, Jr. et al. |
| 8,418,974 | B2 | 4/2013 | Felcman et al. |
| 8,433,171 | B2 | 4/2013 | Cooke et al. |
| 8,437,147 | B2 | 5/2013 | Dean, Jr. et al. |
| 8,437,597 | B2 | 5/2013 | Cooke et al. |
| 8,452,148 | B2 | 5/2013 | Cooke et al. |
| 8,452,149 | B2 | 5/2013 | Krampotich et al. |
| 8,472,776 | B2 | 6/2013 | Ruiz |
| 8,520,996 | B2 | 8/2013 | Cowen et al. |
| 8,538,226 | B2 | 9/2013 | Makrides-Saravanos et al. |
| 8,559,783 | B2 | 10/2013 | Campos et al. |
| 8,565,572 | B2 | 10/2013 | Krampotich |
| 8,625,950 | B2 | 1/2014 | Beamon et al. |
| 8,625,951 | B2 | 1/2014 | Pimentel et al. |
| 8,705,926 | B2 | 4/2014 | Giraud et al. |
| 8,712,206 | B2 | 4/2014 | Cooke et al. |
| 8,746,466 | B2 | 6/2014 | Taylor |
| 8,867,883 | B2 | 10/2014 | Crain et al. |
| 8,879,881 | B2 | 11/2014 | Cote et al. |
| 8,934,253 | B2 | 1/2015 | Anderson et al. |
| 8,938,147 | B2 | 1/2015 | Krampotich |
| 8,953,924 | B2 | 2/2015 | Cote et al. |
| 8,965,168 | B2 | 2/2015 | Cowen et al. |
| 8,992,099 | B2 | 3/2015 | Blackwell, Jr. et al. |
| 9,008,485 | B2 | 4/2015 | Ramirez et al. |
| 9,020,320 | B2 | 4/2015 | Cooke et al. |
| 9,075,216 | B2 | 7/2015 | Cote et al. |

(56) References Cited

U.S. PATENT DOCUMENTS

| | | |
|---|---|---|
| 9,075,217 B2 | 7/2015 | Giraud et al. |
| 9,116,324 B2 | 8/2015 | Cooke et al. |
| 9,140,870 B2 | 9/2015 | Marmon et al. |
| 9,170,392 B2 | 10/2015 | Krampotich et al. |
| 9,213,161 B2 | 12/2015 | Cote et al. |
| 9,213,363 B2 | 12/2015 | Anderson et al. |
| 9,279,951 B2 | 3/2016 | McGranahan et al. |
| 9,690,065 B2 | 6/2017 | Wiltjer et al. |
| 9,841,574 B1 | 12/2017 | Pilon |
| 10,215,944 B2 * | 2/2019 | Sedor .................. G02B 6/4455 |
| 10,416,406 B1 | 9/2019 | Ebrahimi |
| 10,725,258 B2 * | 7/2020 | Sedor .................. G02B 6/4455 |
| 11,372,185 B2 * | 6/2022 | Sedor .................. G02B 6/4455 |
| 2006/0018622 A1 | 1/2006 | Caveney et al. |
| 2008/0089656 A1 | 4/2008 | Wagner et al. |
| 2008/0175552 A1 | 7/2008 | Smrha et al. |
| 2009/0245743 A1 | 10/2009 | Cote et al. |
| 2010/0051886 A1 | 3/2010 | Cooke et al. |
| 2010/0052346 A1 | 3/2010 | Cooke et al. |
| 2010/0054684 A1 | 3/2010 | Cooke et al. |
| 2010/0296791 A1 | 11/2010 | Makrides-Saravanos et al. |
| 2010/0310225 A1 | 12/2010 | Anderson et al. |
| 2010/0316334 A1 | 12/2010 | Kewitsch |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2011/0268405 A1 | 11/2011 | Cote et al. |
| 2011/0268406 A1 | 11/2011 | Giraud et al. |
| 2011/0268408 A1 | 11/2011 | Giraud et al. |
| 2011/0268410 A1 | 11/2011 | Giraud et al. |
| 2011/0268411 A1 | 11/2011 | Giraud et al. |
| 2011/0274402 A1 | 11/2011 | Giraud et al. |
| 2012/0114295 A1 | 5/2012 | Guzzo et al. |
| 2013/0011105 A1 | 1/2013 | Barlowe et al. |
| 2013/0028567 A1 | 1/2013 | Parikh et al. |
| 2013/0121657 A1 | 5/2013 | Seo et al. |
| 2013/0148935 A1 | 6/2013 | Cooke et al. |
| 2013/0214662 A1 | 8/2013 | Pimentel et al. |
| 2013/0251319 A1 | 9/2013 | Compton et al. |
| 2013/0251326 A1 | 9/2013 | Cooke et al. |
| 2013/0287357 A1 | 10/2013 | Solheid et al. |
| 2014/0010511 A1 | 1/2014 | Smrha et al. |
| 2014/0079365 A1 | 3/2014 | Hill et al. |
| 2015/0026843 A1 | 9/2015 | Blackwell, Jr. et al. |
| 2016/0033732 A1 | 2/2016 | Giraud et al. |
| 2016/0062050 A1 | 3/2016 | Giraud et al. |
| 2016/0062055 A1 | 3/2016 | Giraud et al. |
| 2016/0062058 A1 | 3/2016 | Dagley et al. |
| 2016/0062068 A1 | 3/2016 | Giraud et al. |
| 2016/0299308 A1 | 10/2016 | Wiltjer et al. |

FOREIGN PATENT DOCUMENTS

| | | |
|---|---|---|
| EP | 2159613 A2 | 8/2009 |
| EP | 2544035 A1 | 1/2013 |
| JP | 2000287345 A | 10/2000 |
| JP | 2002124790 A | 4/2002 |
| JP | 2004118091 A | 4/2004 |
| JP | 2012530955 A | 12/2012 |
| WO | 9942881 A1 | 8/1999 |
| WO | 2016033580 A1 | 3/2016 |

OTHER PUBLICATIONS

Pretium Edge® AO Solutions the Next Evolution of Your Data Center Revolution; Corning Cable System, LLC; 8 pages; May 2013.

Dell™ Poweredge™ 1950 Server; Deli, Inc.; 2 pages; Nov. 2006.
Dell™ Best Practices Guide for Rack Enclosures PE2440 & PE4220; Dell, Inc.; 17 pages; 2009.
Service Description: PowerEdge™ Basic Server Installation with Rack Mounting; Dell, Inc.; 2 pages; 2003.
Deli™ PowerEdge™ 1950 III Server; Dell, Inc.; 2 pages; Jun. 2008.
Service Description: Installation of a Dell Server, Storage or Peripheral Device; Dell, Inc.; 11 pages; Aug. 5, 2013.
Server Administrator Version 7.2 Installation Guide; Dell, Inc.; 106 pages; Jan. 2013.
WorkForce® Pro WP-4530 Instructions; Epson American, Inc.; 4 pages; Aug. 2011.
Hubbell OptiChannel High Density 144 Port 1U Fiber Enclosure; Hubbell Premise Wiring; 2 pages; Jan. 2012.
Hubbell OptiChannel Ultra Compact Fiber LC to MPO Cassette Modules; Hubbell Premise Wiring; 2 pages; Oct. 2010.
Pretium Edge® HD Solutions for Enterprise Data Centers and Storage Area Networks; Corning Cable Systems, LLC; 20 pages; Nov. 2012.
RapidNet™ Pre-Terminated Network Cabling Systems LITPD203 Rev. 2; HellermannTyton; 8 pages; Apr. 2005.
Value-Added Module (VAM) System Monitor, Splitter, WDM, CWDM and DWDM Modules 6th Edition; TE Connectivity 32 pages; Aug. 2014.
Mini VAM Connector Cleaning Instructions ADCP-90-412, Issue 3; ADC Telecommunications, Inc.; 8 pages; Sep. 2002.
Express Fiber Management® (XFM) MPO Optical Cassettes; AFL; 2 pages; 2003.
Fiber Optic Cassette Module 12 Fiber, MTP to 6-SC and 6-LC Configuration Customer Drawing; Panduit™ Corp.; 1 page; Oct. 26, 2004.
MTP® Brand Bulkhead Adapters; US Conec; 2 pages; 2010.
QuickNet™ SFQ Series MTP Fiber Optic Cassettes Specification Sheet; Panduit Corp.; 2 pages; Jan. 2009.
High Density SFQ Small Form Factor QuickNet™ Fiber Cable Assemblies Product Bulletin; Panduit Corp.; 2 pages; Feb. 2011.
Development of Mini-MPO Connector; Naoko Shimoji, Jun Yamakawa and Masato Shiino; 5 pages; Jun. 29, 1998.
Opticom™ Fiber Optic Rack Mount Enclosure CM274 Installation Instructions; Panuit Corp.; 2 pages; 2002.
Evolution of Cabling Standards (Q&A); NORDX/CDT; 8 pages; Feb. 2002.
Opticom QuickNet Rack Mount Fiber Cassette Enclosures Installation Instructions FS006; Panduit Corp.; 11 pages; 2008.
Introducing the NG4access ODF platform—the next-generation optical distribution frame that increases density while reducing cost and installation time in the network; TE Connectivity; 4 pages; Aug. 2012.
Pretium Edge® Extension and Flush Mount Bracket for EDGE-01U; Corning Cable Systems, LLC; 2 pages; Dec. 10, 2013.
Fiber Enclosures; Hubbell Premise Wiring; 10 pages; http://ecatalog.hubbell-premise.com/ProductInformation/ViewCatalog.aspx?Dest=hubbell-premise.com/literature/ecatalog/i.pdf; printed Sep. 25, 2015.
OptiMo® Ultra High Density Pre-terminated Fiber Optic Solutions; Legrand® Ortronics; 1 page; undated.
Belden® Infrastructure Solutions Catalog, cover page; p. 21; and back page, 2013 (3 pgs.).
Hallam Manufacturing Cable Zone Patch Frames, undated (2 pgs.).
Leviton® Nertwork Solutions Patch Panel Selection Guide, cover page; p. 12; and back page, undated (3 pgs.).
Siemon™ VersaPOD Zero-U Sliding Vertical Patch Panels (3 pgs)., Jun. 27, 2016.
Teleconnectivity Zero RU Quick-Fit Bracket, cover page; p. 2; and back page (3 pgs.), 2013.

* cited by examiner

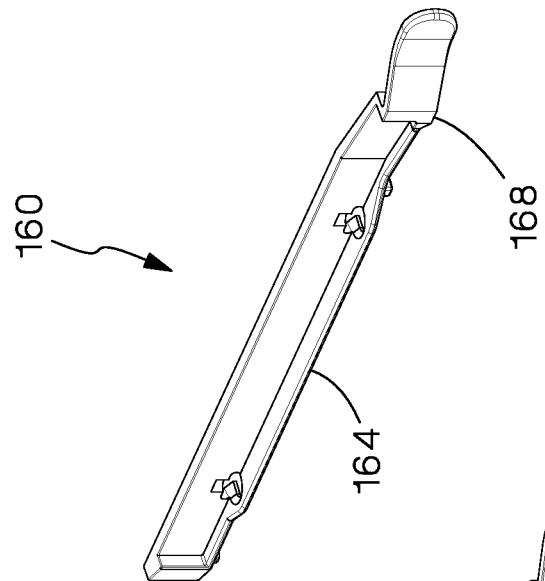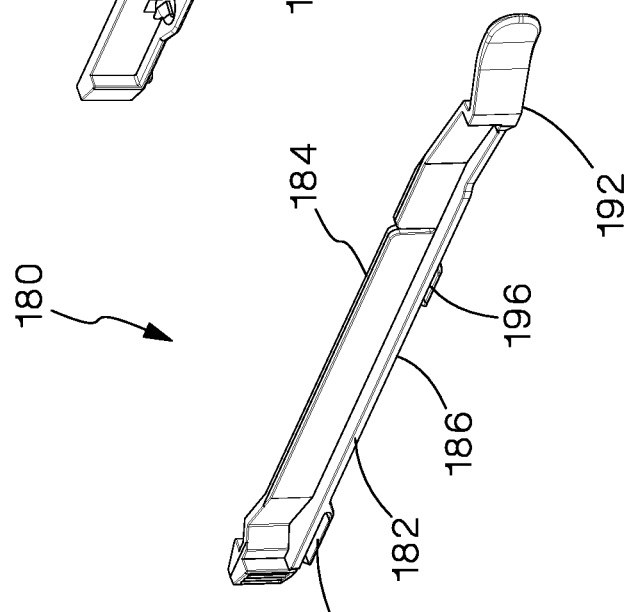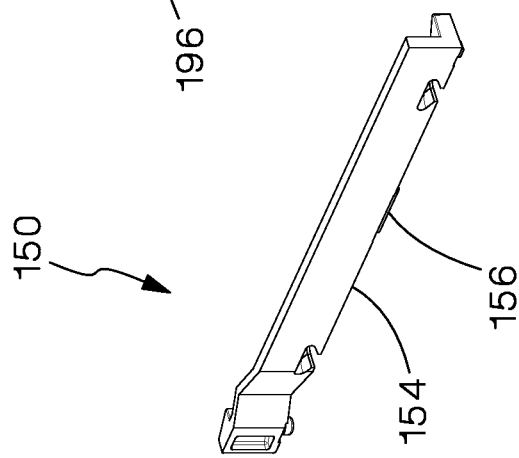

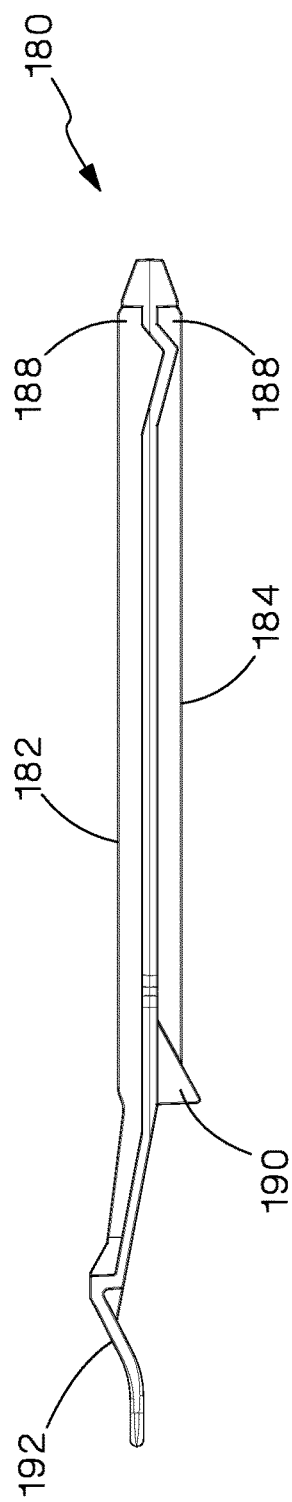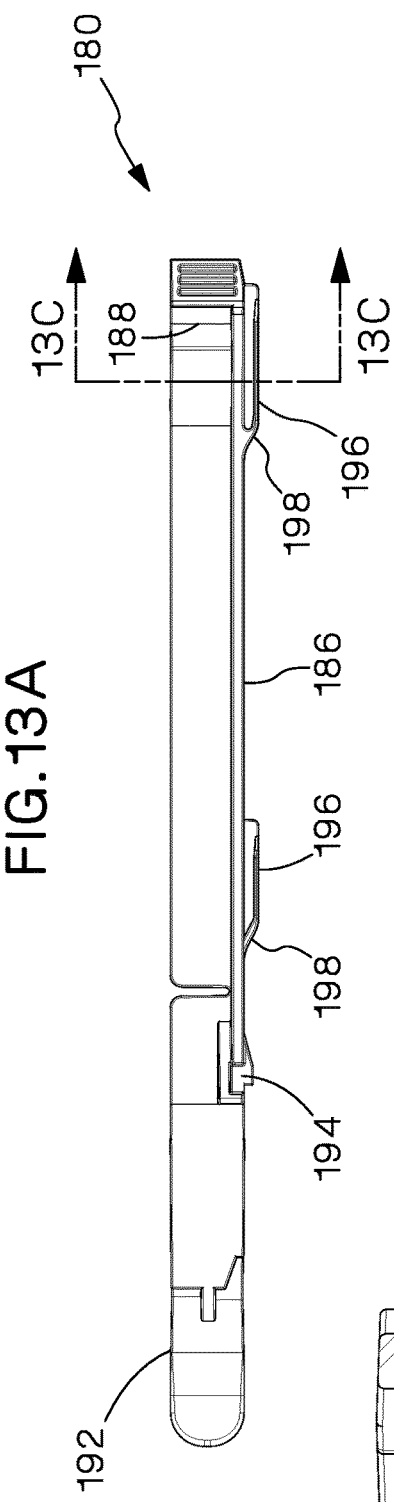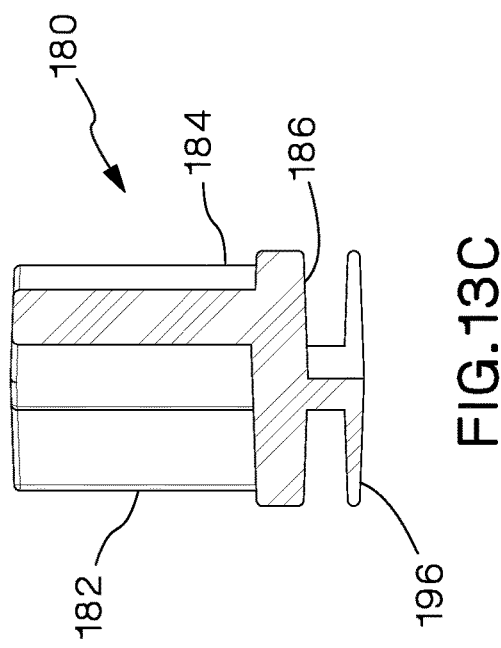

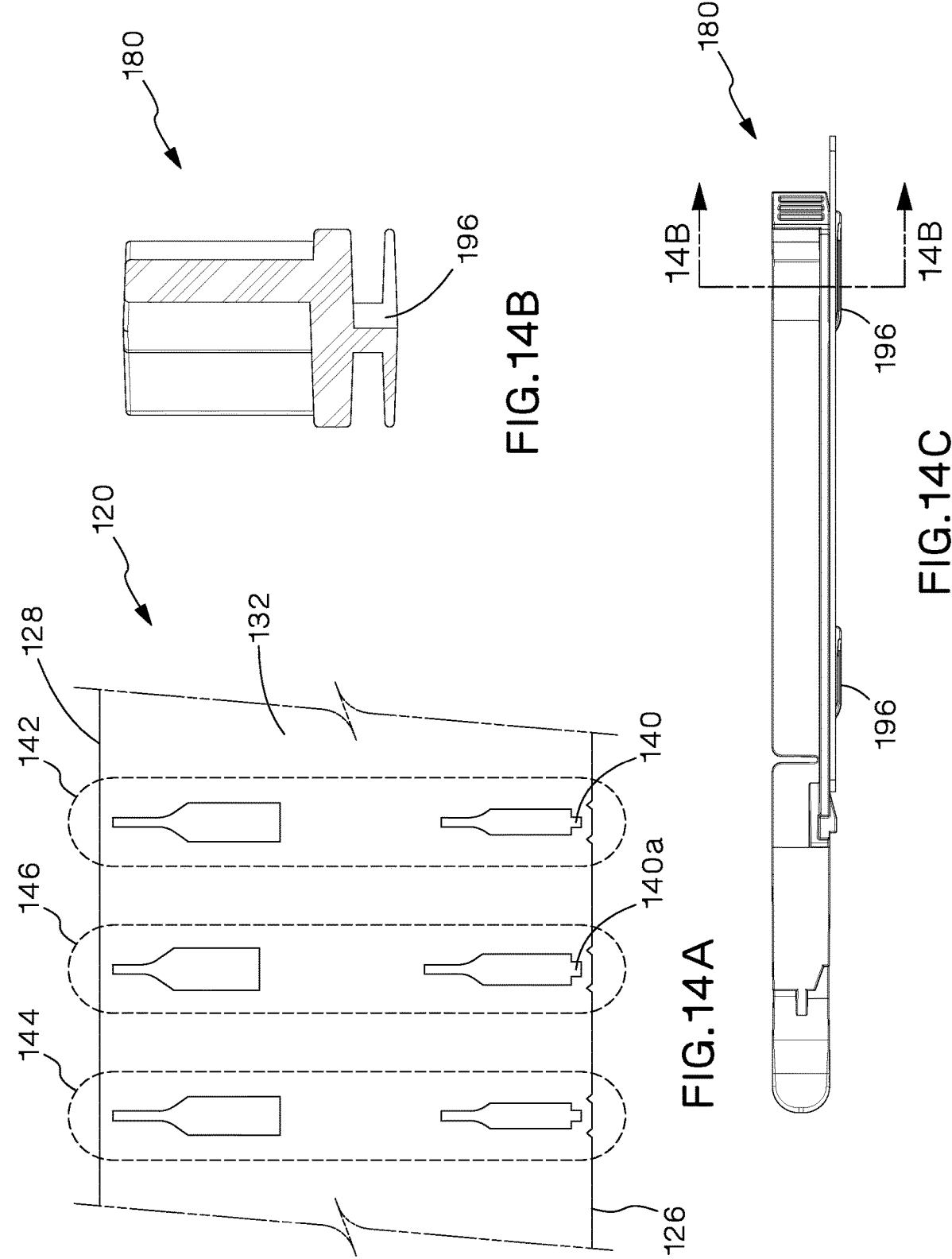

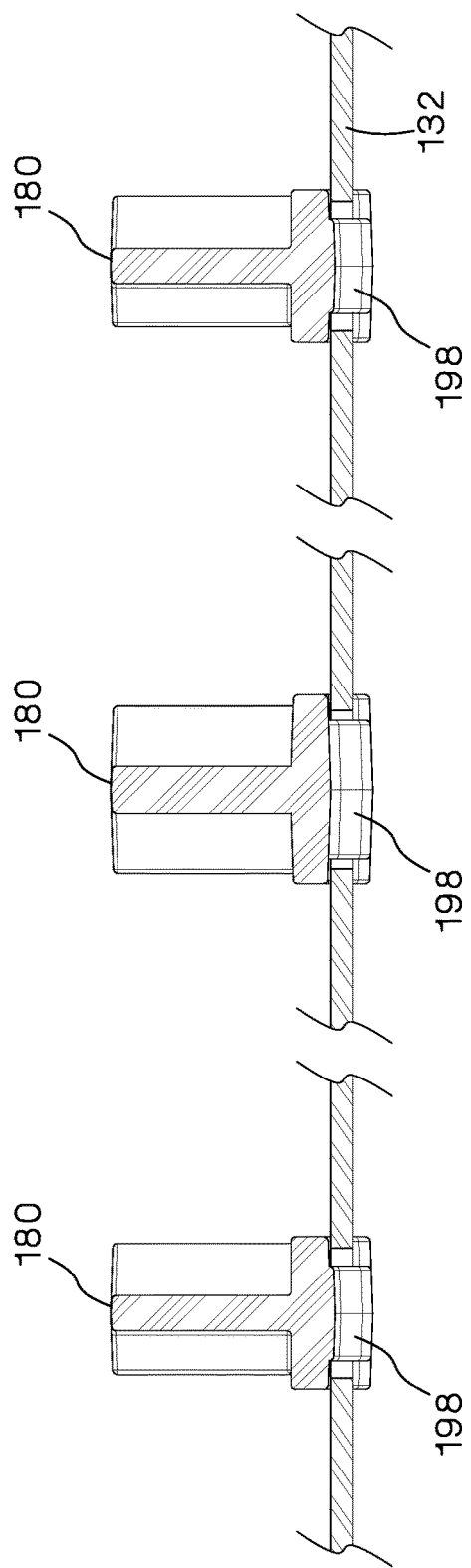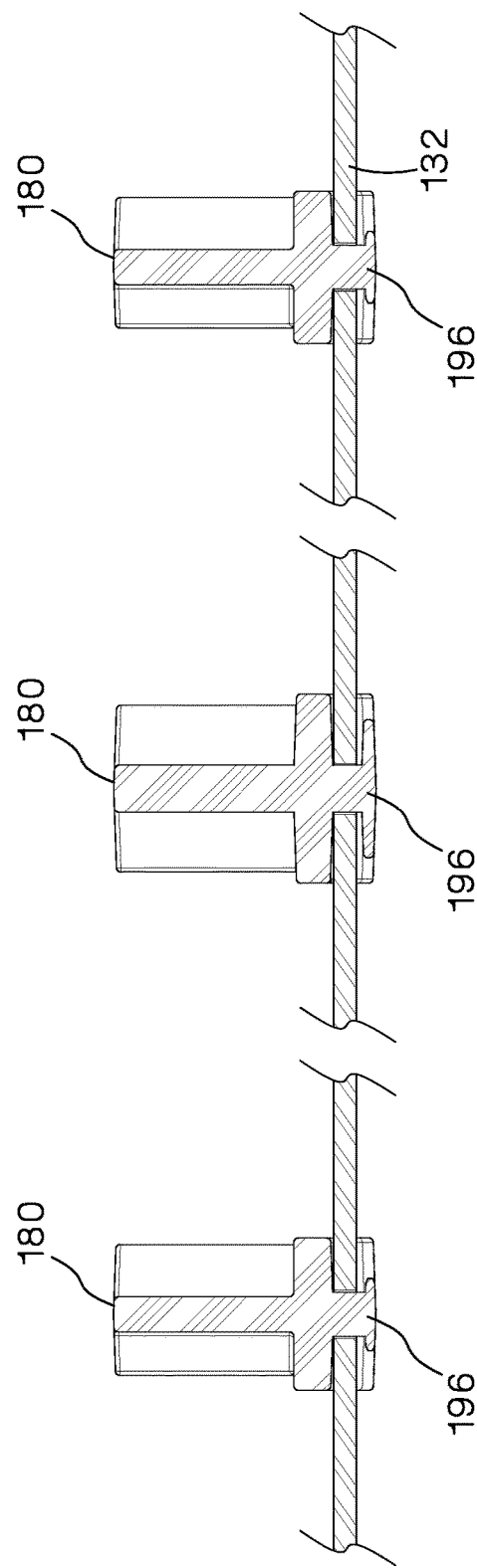

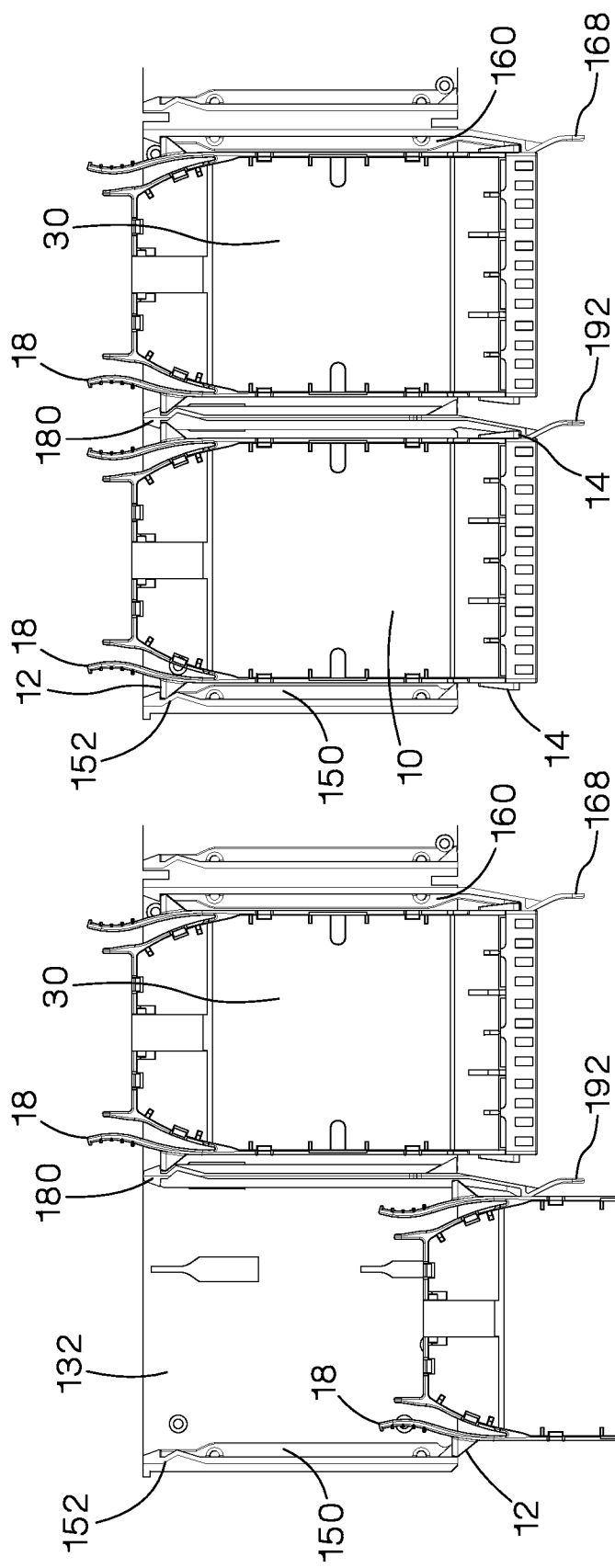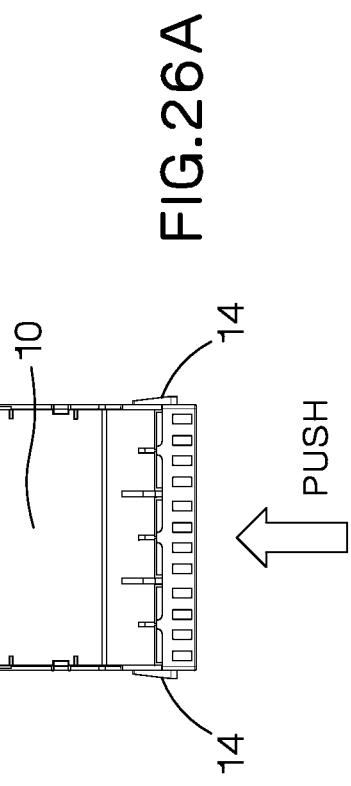

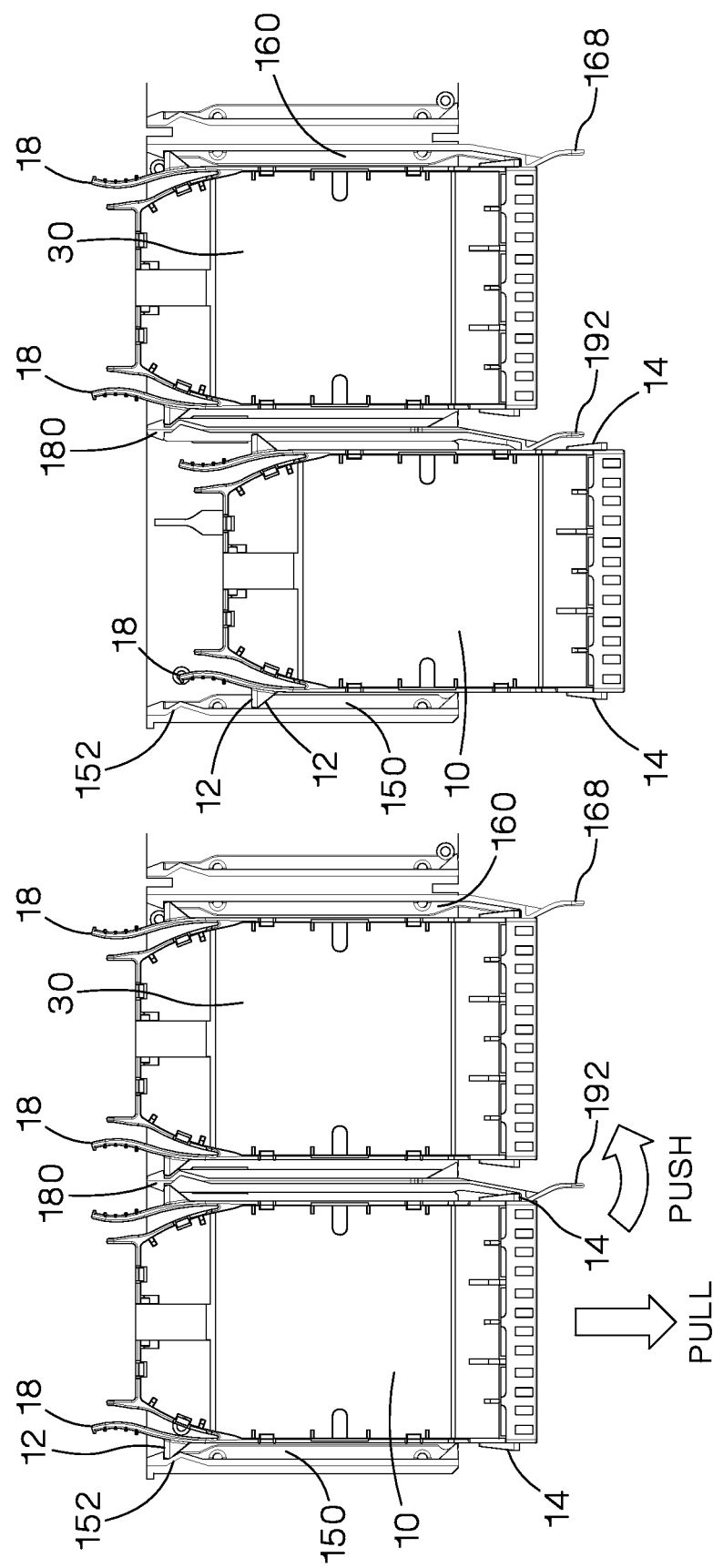

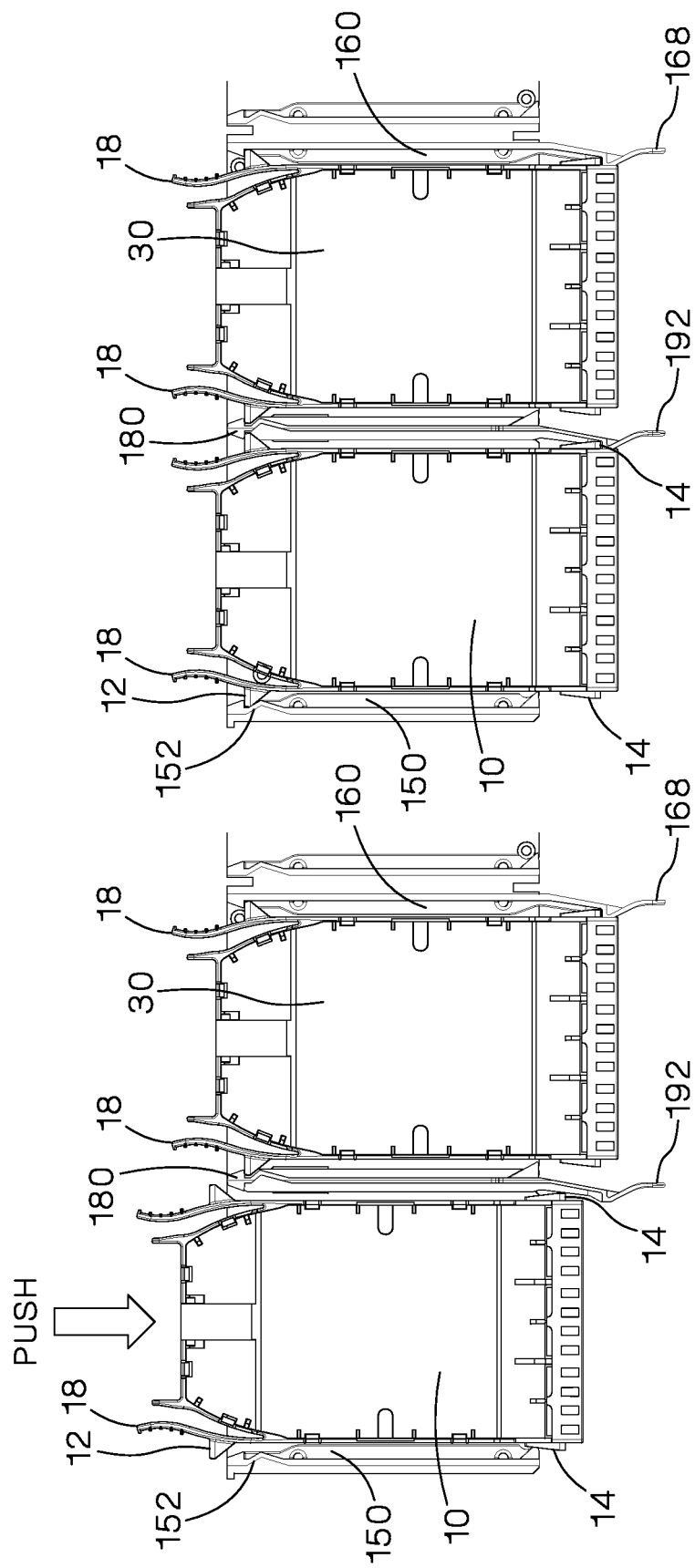

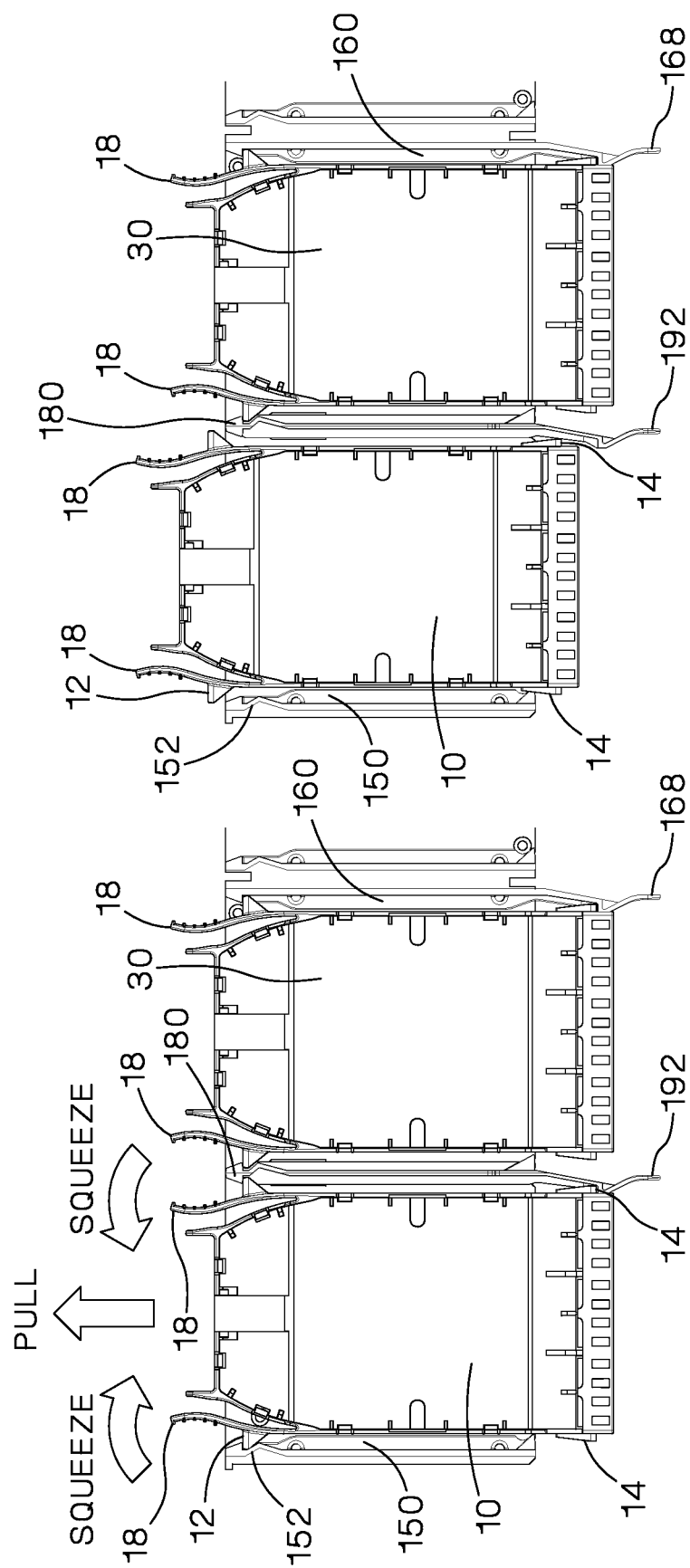

MODULAR FIBER OPTIC TRAY

CROSS REFERENCE TO RELATED APPLICATIONS

This application is a continuation of U.S. patent application Ser. No. 16/924,768, filed Jul. 9, 2020, which is a continuation of U.S. patent application Ser. No. 16/257,830, filed Jan. 25, 2019 (issued as U.S. Pat. No. 10,725,258 Jul. 28, 2020), which is a divisional of U.S. patent application Ser. No. 15/628,818, filed Jun. 21, 2017 (issued as U.S. Pat. No. 10,215,944 Feb. 26, 2019), which claims priority to U.S. Provisional Ser. No. 62/356,662, filed Jun. 30, 2016, the entirety of all of which are hereby incorporated by reference in its entirety herein.

BACKGROUND OF THE INVENTION

The present invention relates to data center management, and, in particular, enclosures for high speed data transport fiber cabling systems. Optical fibers allow for transmission of communications over longer distances and at higher bandwidths than wire cables. Optical fibers are also advantageous for communication systems because signals suffer less loss than wire cables and are immune to electromagnetic interference. Optical fibers are therefore often used for high bandwidth, long distance applications. One of the primary functions of a data center is to provide connections between incoming and outgoing optical fiber connections.

A user may desire to use different sized fiber optic modules housing optical fiber connections. At present, such a user installs and removes entire banks of patch panels or trays in order to accommodate different sized fiber optic modules because trays are currently designed to only support one size of fiber optic module. Thus, it may be advantageous to provide a tray that allows different sized fiber optic modules to be installed within the tray without replacing or removing the tray itself.

SUMMARY OF THE INVENTION

The present invention is directed to a tray to support fiber optic equipment. The tray includes a tray body having a first side edge portion, a second side edge portion, a front side edge portion, a rear side edge portion and a middle portion. The middle portion of the tray body has a plurality of cutout features. The first side edge portion is configured to be secured to a first rail. The second side edge portion is configured to be secured to a second rail. The cutout features are configured to engage with a mounting feature of a third rail such that the third rail may be removably secured to the tray body in a plurality of positions.

Another embodiment of the present invention is directed to a system to support fiber optic equipment. The system includes a tray body having a first side edge portion, a second side edge portion, a front side edge portion, a rear side edge portion and a middle portion. The middle portion of the tray body has a first set of cutout features and a second set of cutout features. The system also includes a first rail secured to the first side edge portion, a second rail secured to the second side edge portion, and a third rail having a mounting feature configured to be removably secured to the first set of cutout features or the second set of cutout features.

Another embodiment of the present invention is directed to a method of supporting a plurality of sizes of fiber optic modules. The method includes inserting a mounting feature of a rail into a first set of cutout features in a tray body. The method further includes removing the mounting feature of the rail from the first set of cutout features in the tray body. The method further includes inserting the mounting feature of the rail into a second set of cutout features in the tray body.

BRIEF DESCRIPTION OF THE DRAWINGS

FIGS. 6A, 6B, and 6C are perspective views of the left, removable, and right rails of the patch panel, respectively.
FIGS. 13A, 13B, and 13C are top, side, and cross-section views of the removable rail of the patch panel.
FIG. 14A is a top view of a portion of the modular tray.
FIG. 14B is a cross-section view of the removable rail.
FIG. 14C is a side view of the removable rail.
FIG. 23 is cross sectional views of the three removable rails of FIG. 15.
FIG. 24 is cross sectional views of the three removable rails of FIG. 15.
FIGS. 26A and 26B are top views of a portion of the modular tray with modules installed in the tray.

FIGS. 27A and 27B are top views of a portion of the modular tray with modules installed in the tray.

FIGS. 28A and 28B are top views of a portion of the modular tray with modules installed in the tray.

FIGS. 29A and 29B are top views of a portion of the modular tray with modules installed in the tray.

DETAILED DESCRIPTION OF THE INVENTION

Figure 1A:
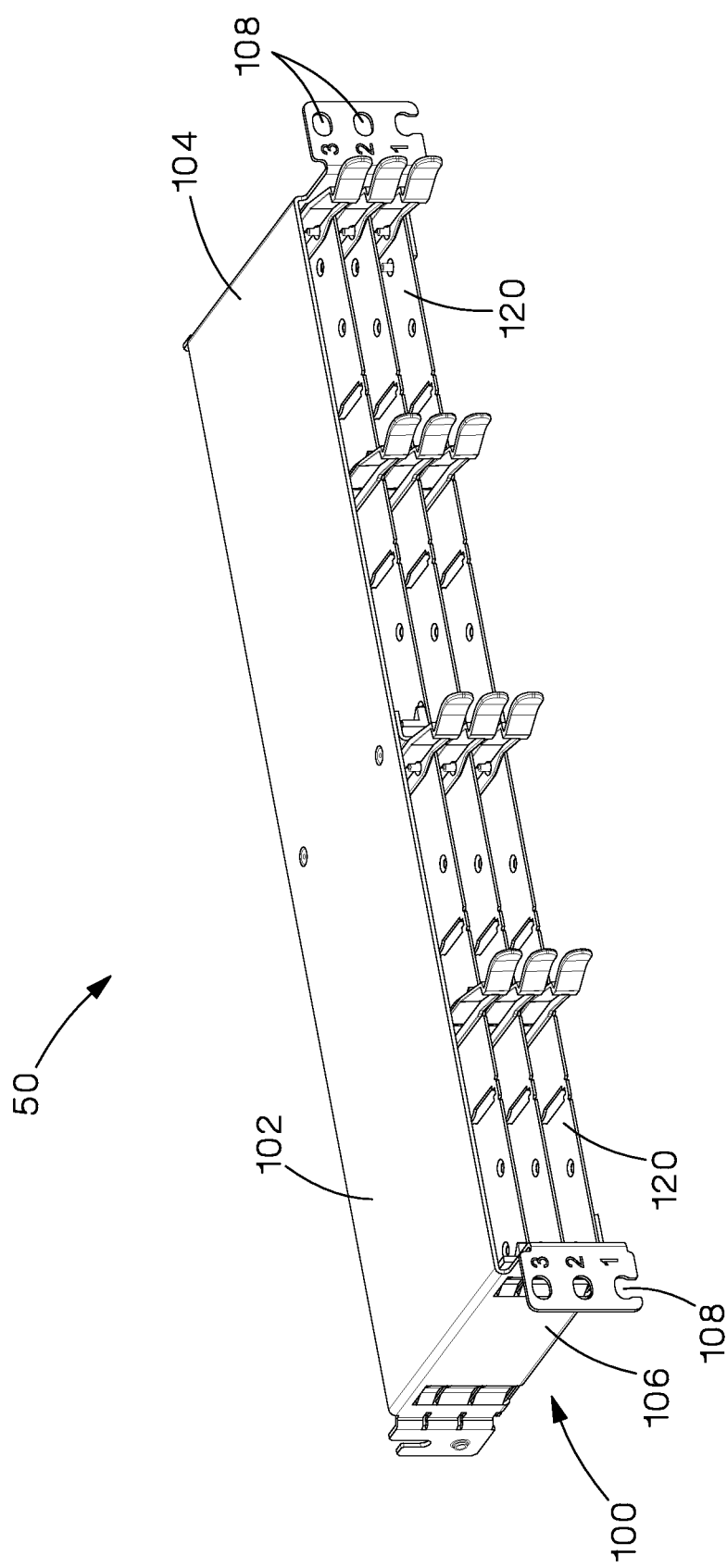
FIG. 1A is a perspective view of the patch panel.
Figure 1B:
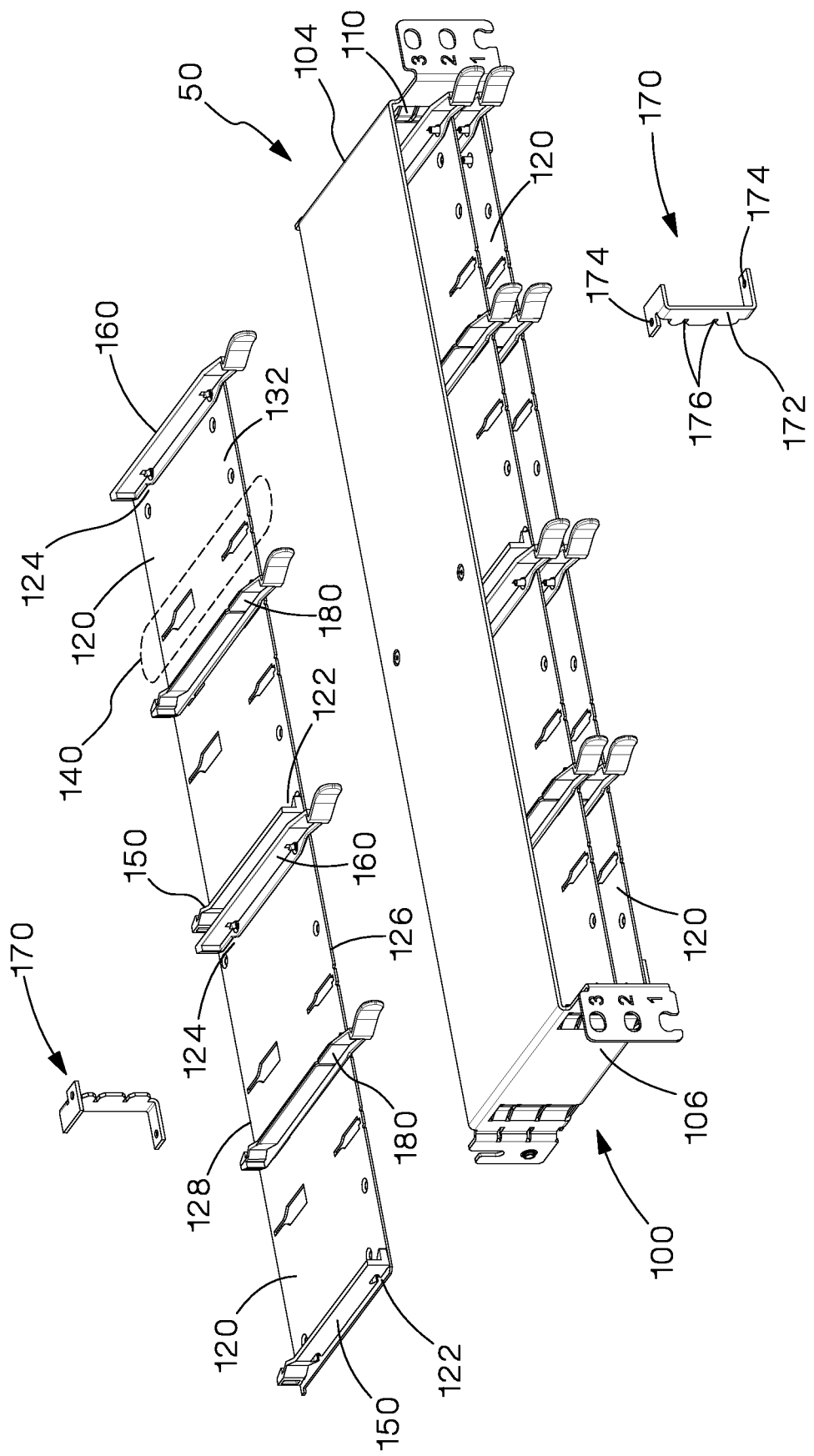
FIG. 1B is an exploded view of the patch panel of FIG. 1A.
Figure 5:
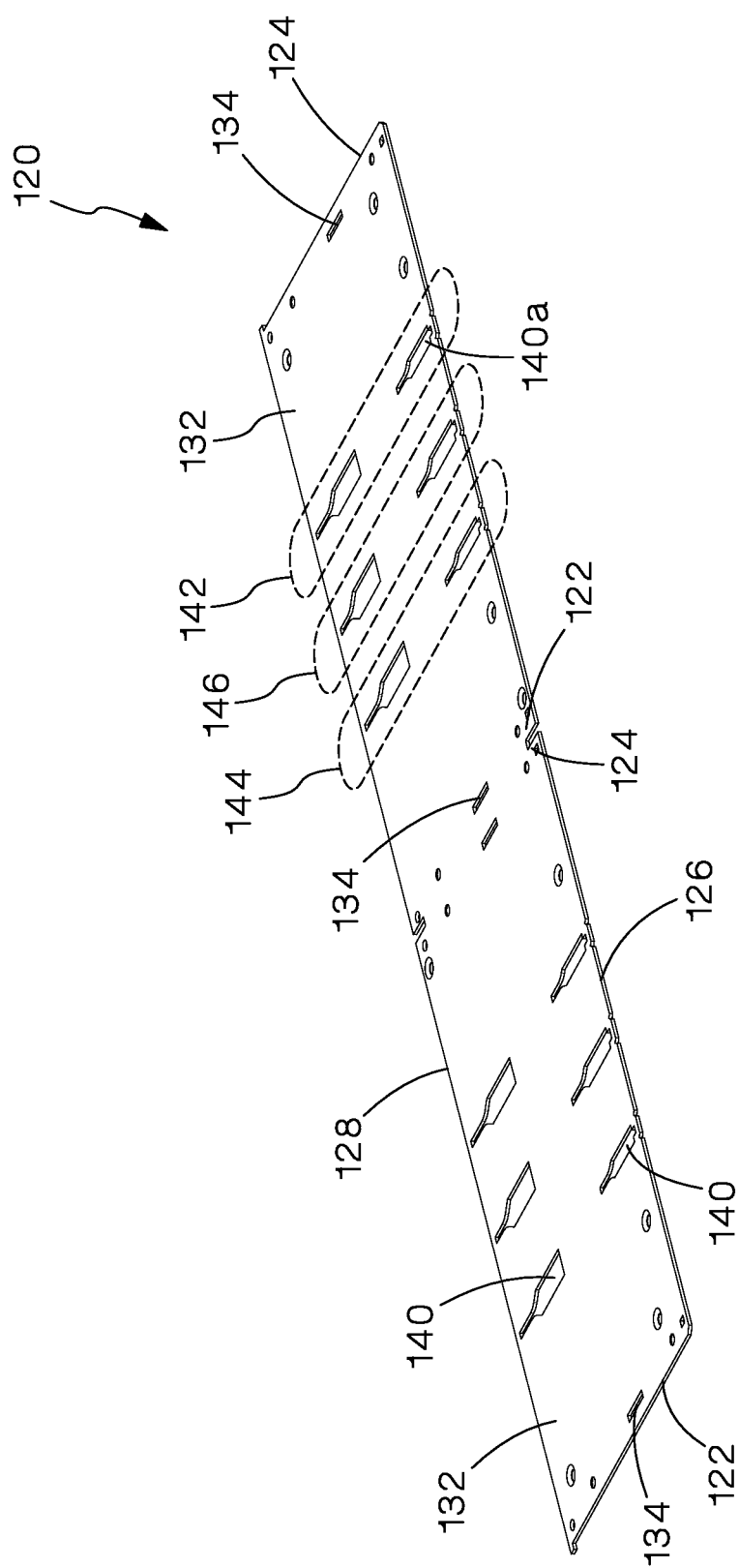
FIG. 5 is a perspective view of the modular tray of the patch panel.

As shown in FIGS. 1A and 1B, a patch panel 50 consists of a frame 100, modular tray 120, and center support brackets 170. A plurality of removable rails 180 as shown in FIG. 6B may be added to or removed from the modular tray 120 in order to support differently-sized fiber optic modules 10 that support a different number of optical fibers. Referring to FIG. 5, in a preferred embodiment, the removable rails may be added or removed in order to support one 24-optical fiber module 20, two 12-optical fiber modules 30, or three 8-optical fiber modules 40. The fiber optic modules shown in all of the Figures (for example, FIG. 7) of this application include duplex LC adapters at the front of the module that lead to 1 MPO adapter at the rear of the module. The 24-optical fiber module 20 shown in the Figures includes 12 LC adapters; the 12-optical fiber module 30 as shown in the Figures includes 6 LC adapters; and the 8-optical fiber module 40 as shown in the Figures includes 4 LC adapters. One of ordinary skill in the art would understand that different numbers of optical fibers and different numbers and types of adapters may be used in a fiber optic module that may be installed within the present invention.

Figure 2A:
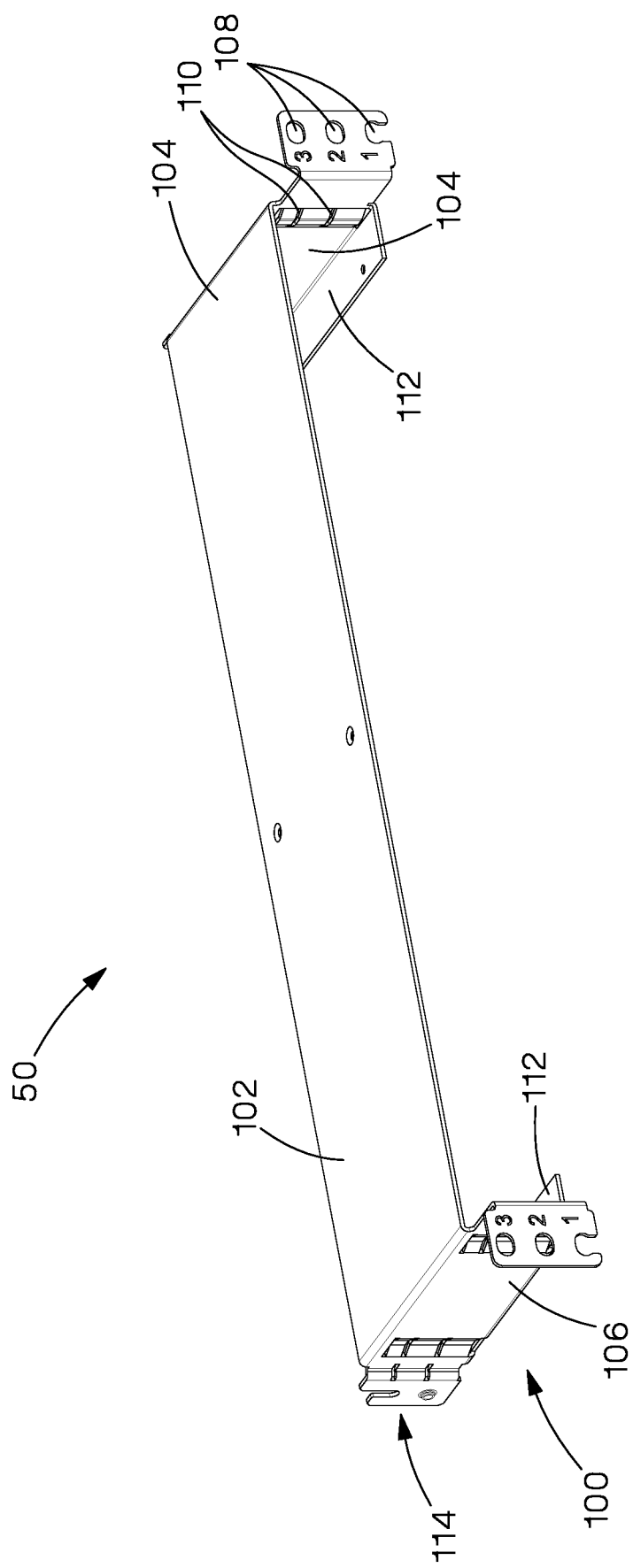
FIG. 2A is a perspective view of the frame of the patch panel.
Figure 2B:
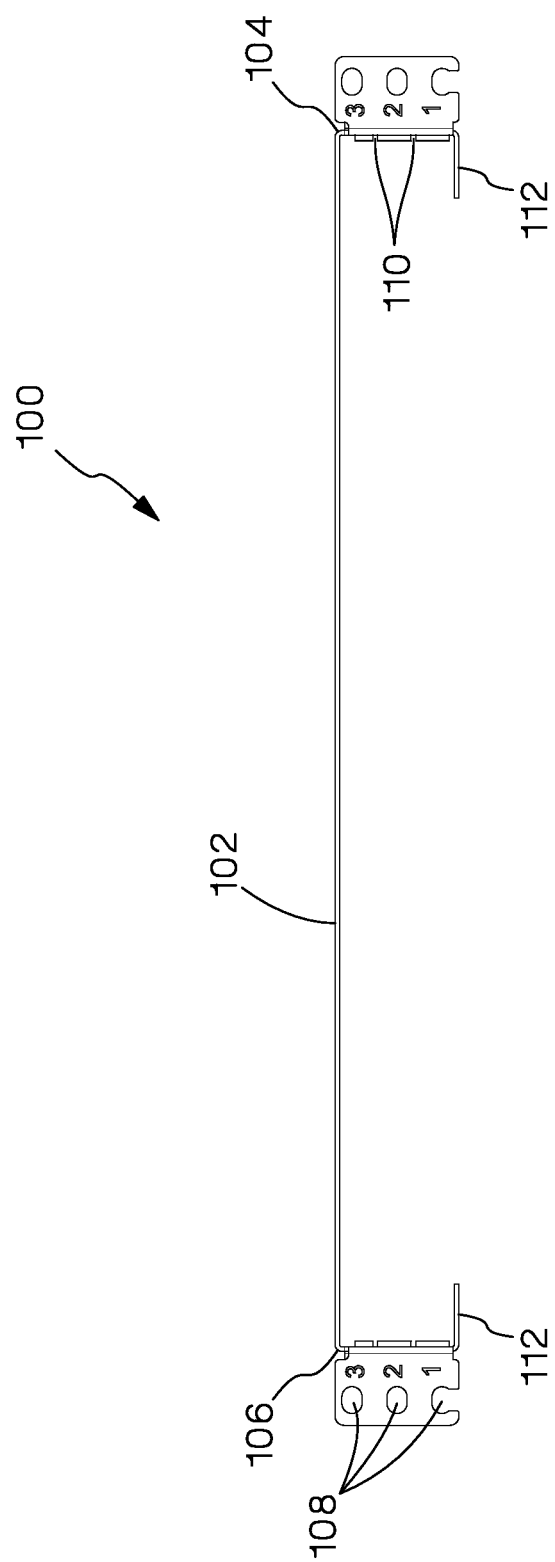
FIG. 2B is a front view of the frame of the patch panel.
Figure 2C:
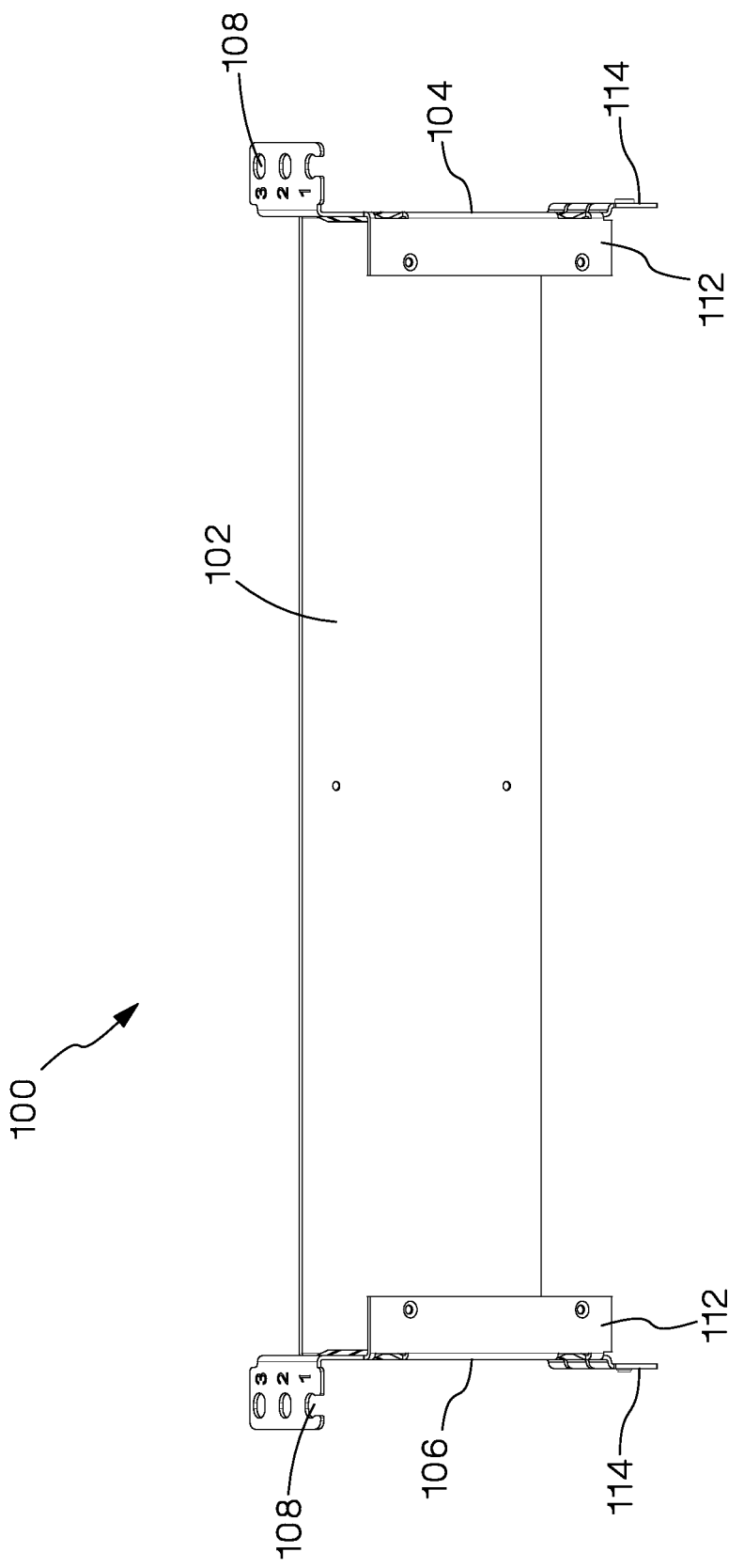
FIG. 2C is a bottom view of the frame of the patch panel.
Figure 3:
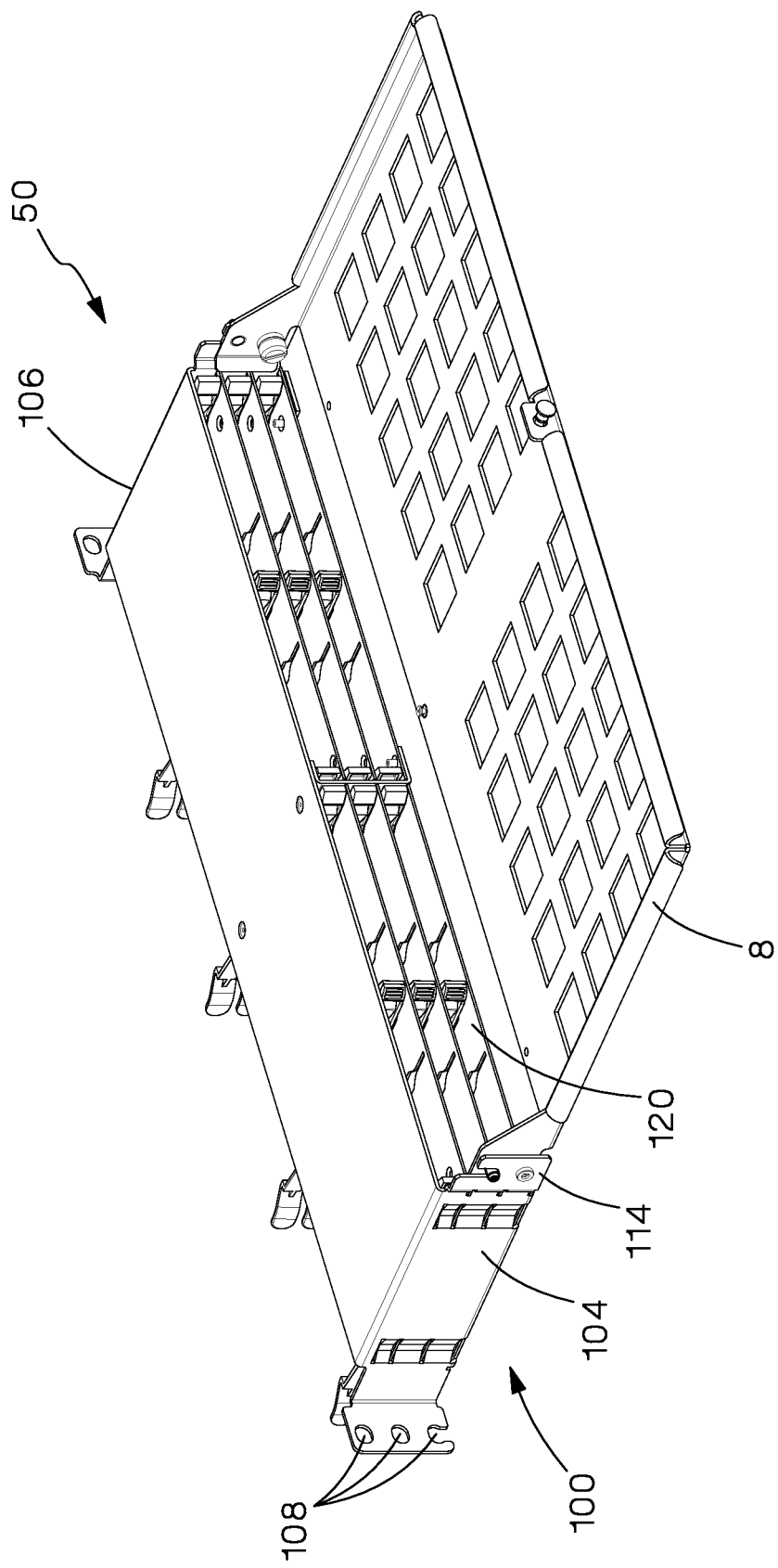
FIG. 3 is a perspective view of the rear of the patch panel.

Referring now to FIGS. 2A, 2B, and 2C, the frame 100 includes a top cover 102, right side 104, left side 106, and a bottom flange 112. The bottom flange 112 is configured to support a modular tray 120. The right side 104 and left side 106 of the frame each include two bridge lance features 110 disposed above the bottom flange 112. The bridge lance features 110 are slots formed in the right side 104 and left side 106 of the frame 100 to support additional modular trays 120 in the frame 100. In a preferred embodiment, two bridge lance features 110 are disposed in each side so that the frame 100 can support two additional modular trays 120 above the modular tray 120 supported by the bottom flange 112. One of ordinary skill in the art would understand that the bridge lance features 110 and center support brackets 170 (described below) may have more or fewer slots that support modular trays 120. The frame may also include holes 108 for mounting the frame 100 to fiber optic enclosure rail 4 within a fiber optic enclosure 2 and mounts 114 for cable slack management trays 8 as shown in FIG. 3.

Figure 4B:
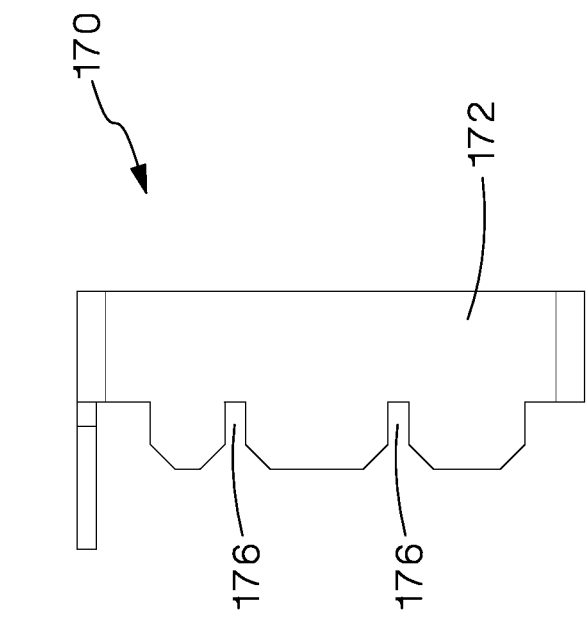
FIGS. 4A and 4B are perspective and side views of the center support brackets, respectively.
Figure 4A:
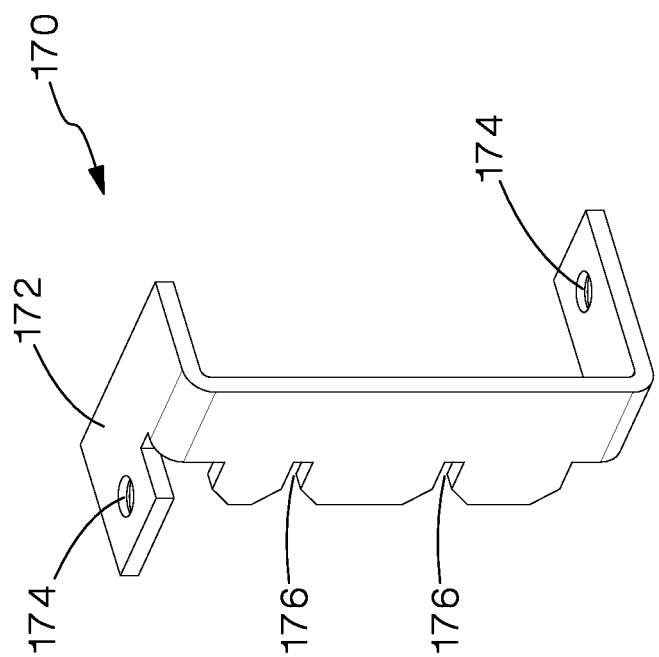

Referring now to FIGS. 4A and 4B, the center support brackets 170 are comprised of a bracket body 172, holes 174 to attach the bracket to the frame 100 and lowermost tray 120, and notches 176 to support the additional modular trays 120 disposed in the frame 100. In a preferred embodiment, the center support brackets 170 include two notches 176 to support two additional modular trays 120.

Figure 6D:
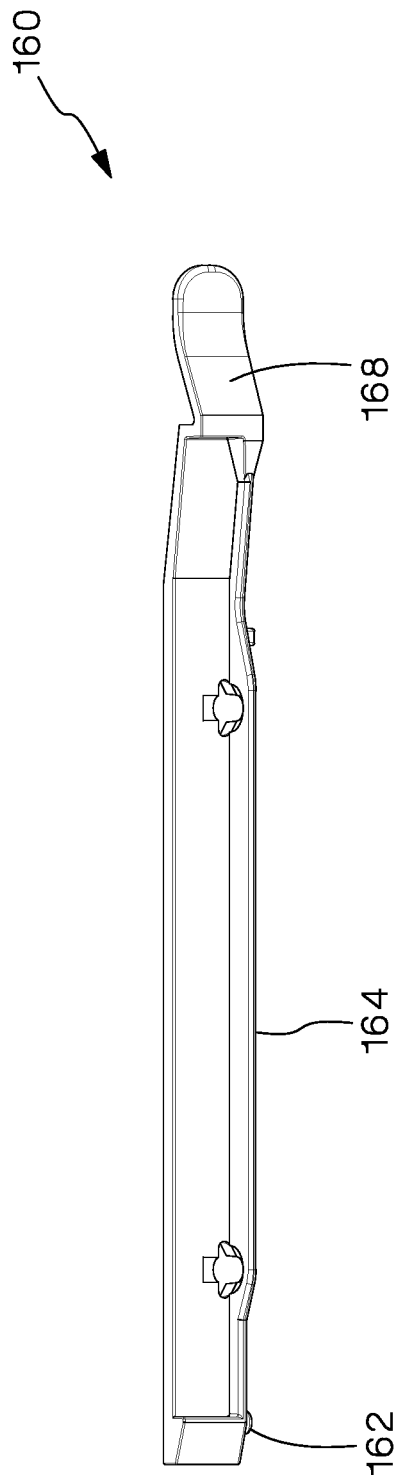
FIGS. 6D and 6E are perspective views of the right and left rails of the patch panel, respectively.
Figure 6E:
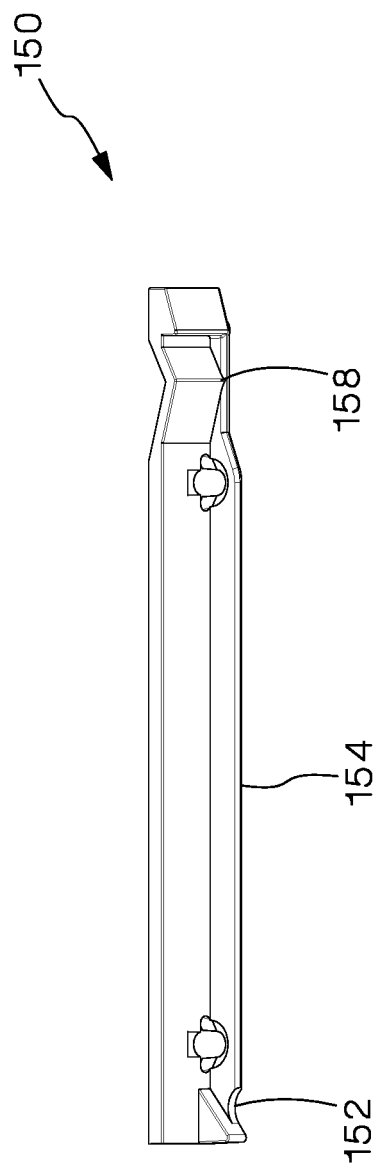

Referring now to FIG. 5, a modular tray 120 includes at least one tray body 132, at least one set of cutout features 140 disposed in the tray body 132, an alignment slot 134 located on the left edge 122 and right edge 124 of the tray body 132, a left rail 150 (see FIGS. 6A and 6E), and a right rail 160 (see FIGS. 6C and 6D). As shown in FIG. 5, two tray bodies 132 may make up one modular tray 120. The alignment slots 134 are each configured to receive an alignment feature 156, 166 located on the bottom portion 154 of the left rail 150 and bottom portion 164 of right rail 160. As shown in FIG. 6E, in addition to the alignment feature 156, the left rail 150 also includes a rear latch retention feature 152 and a fiber optic module contact protrusion 158. The rear latch retention feature 152 is configured to receive a rear fiber optic module retention latch 12 of a fiber optic module 10. The fiber optic module contact protrusion 158 is configured to abut against a fiber optic module 10 during installation of a fiber optic module 10 as well as once the fiber optic module 10 is installed. As shown in FIG. 6D, in addition to the alignment feature 166, the right rail also includes a rear latch retention feature 162 and a front stop latch 168. The front stop latch 168 is configured to retain a fiber optic module retention feature 12 when a fiber optic module 10 is fully installed in the modular tray 120. Both the left rail 150 and right rail 160 are riveted, secured with screws, or otherwise permanently installed onto the left edge 122 and right edge 124, respectively, of the modular tray body 132.

Figure 7:
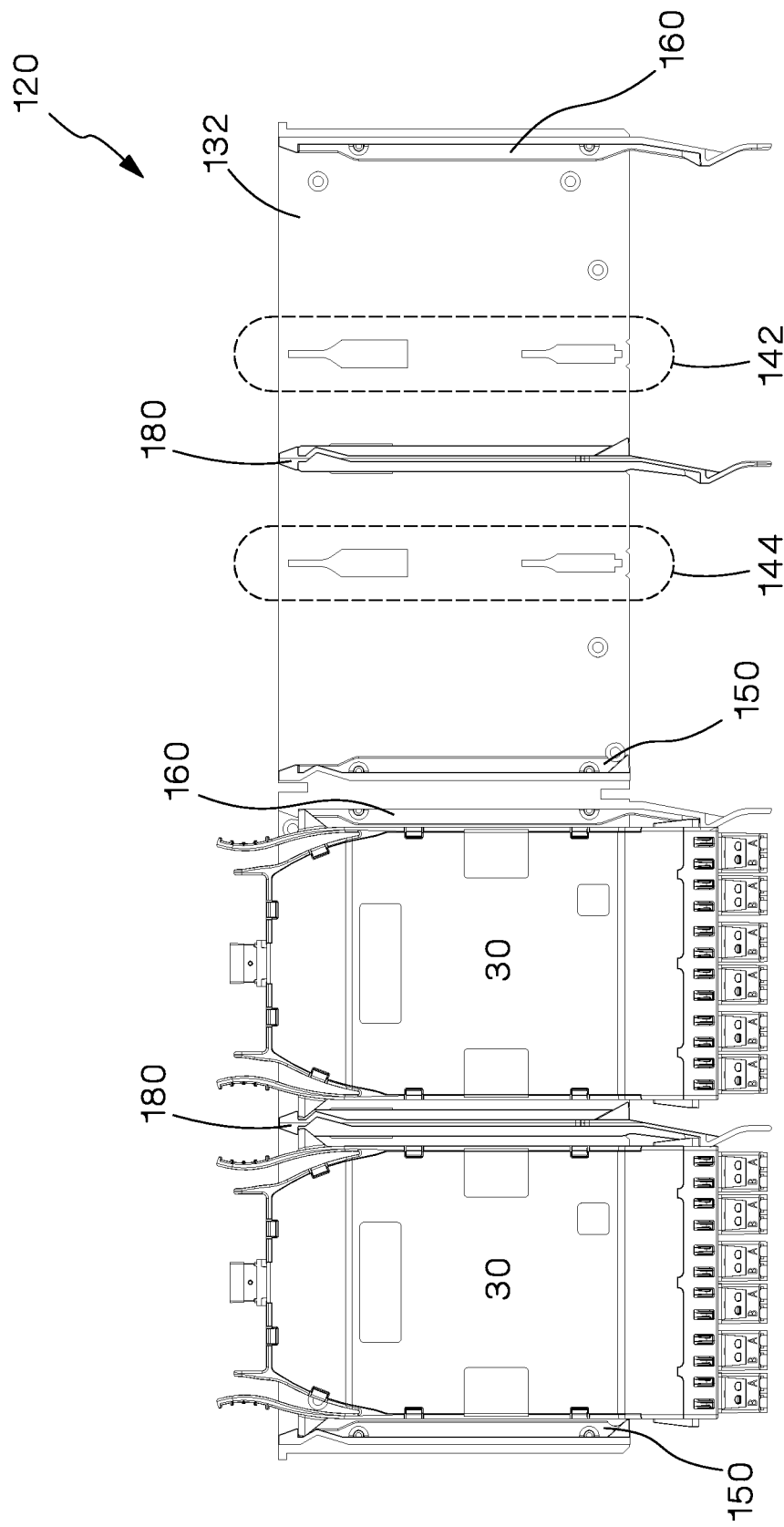
FIG. 7 is a top view of the modular tray with two modules installed in the tray.
Figure 8:
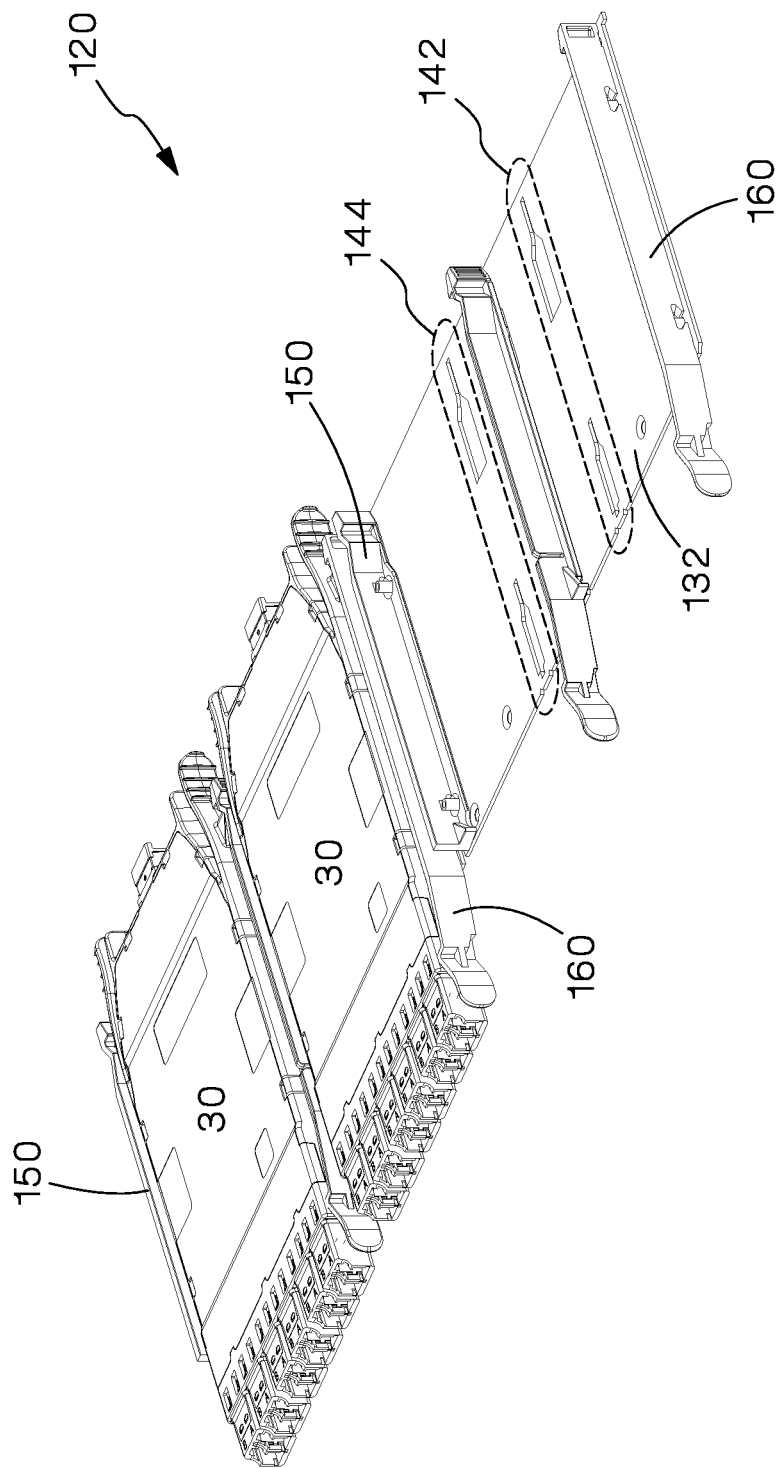
FIG. 8 is a perspective view of the modular tray with two modules installed in the tray.
Figure 9:
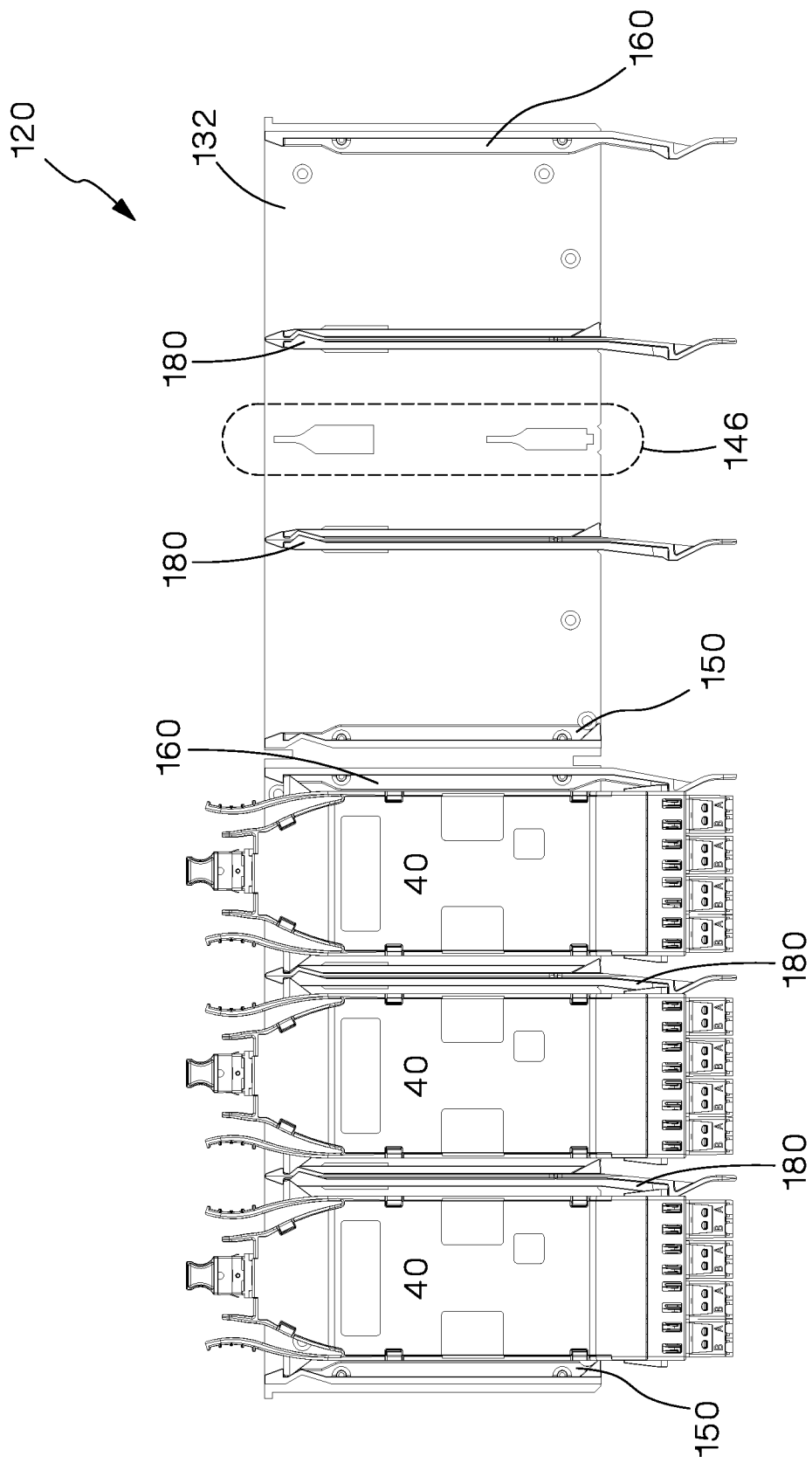
FIG. 9 is a top view of the modular tray with three modules installed in the tray.
Figure 10:
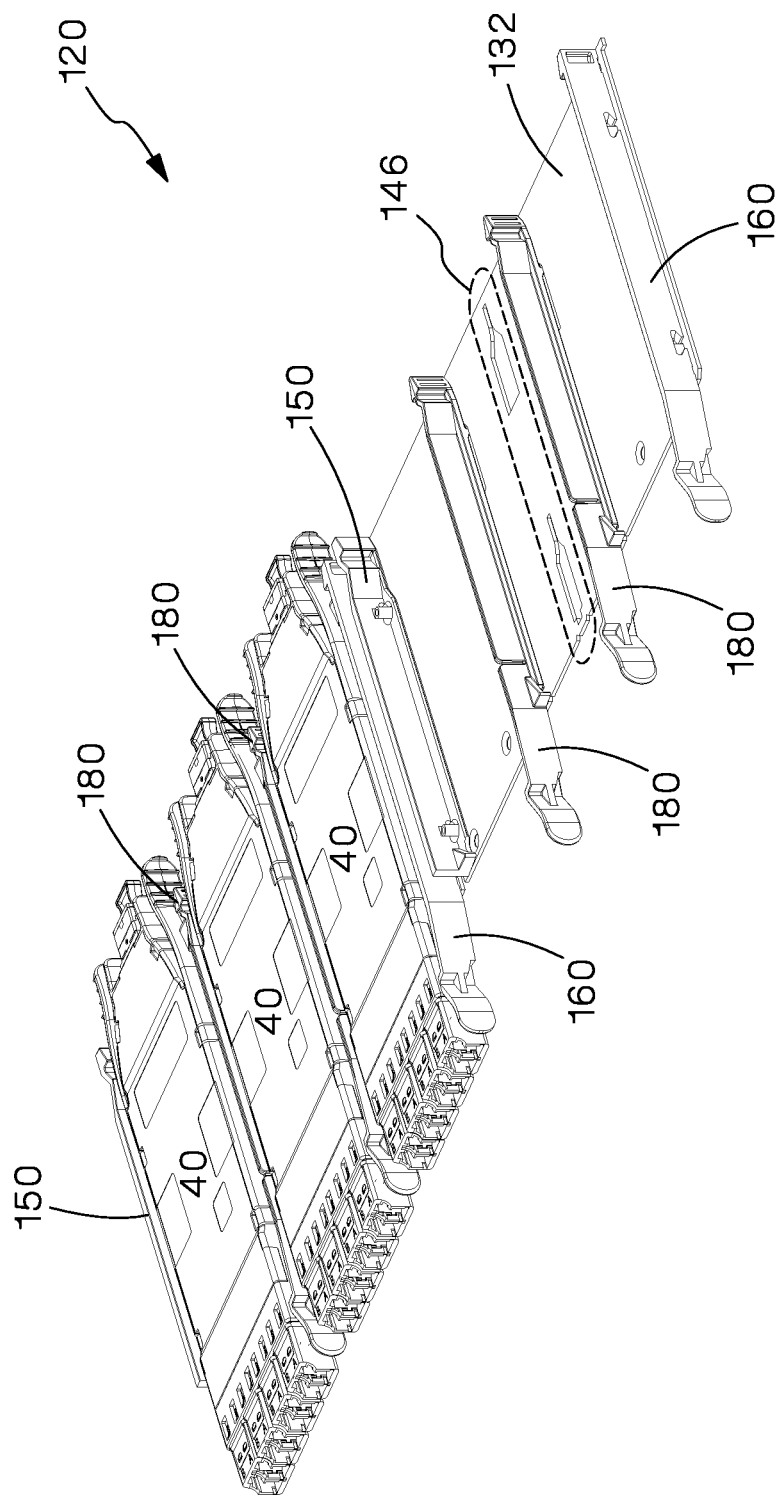
FIG. 10 is a perspective view of the modular tray with three modules installed in the tray.
Figure 11:
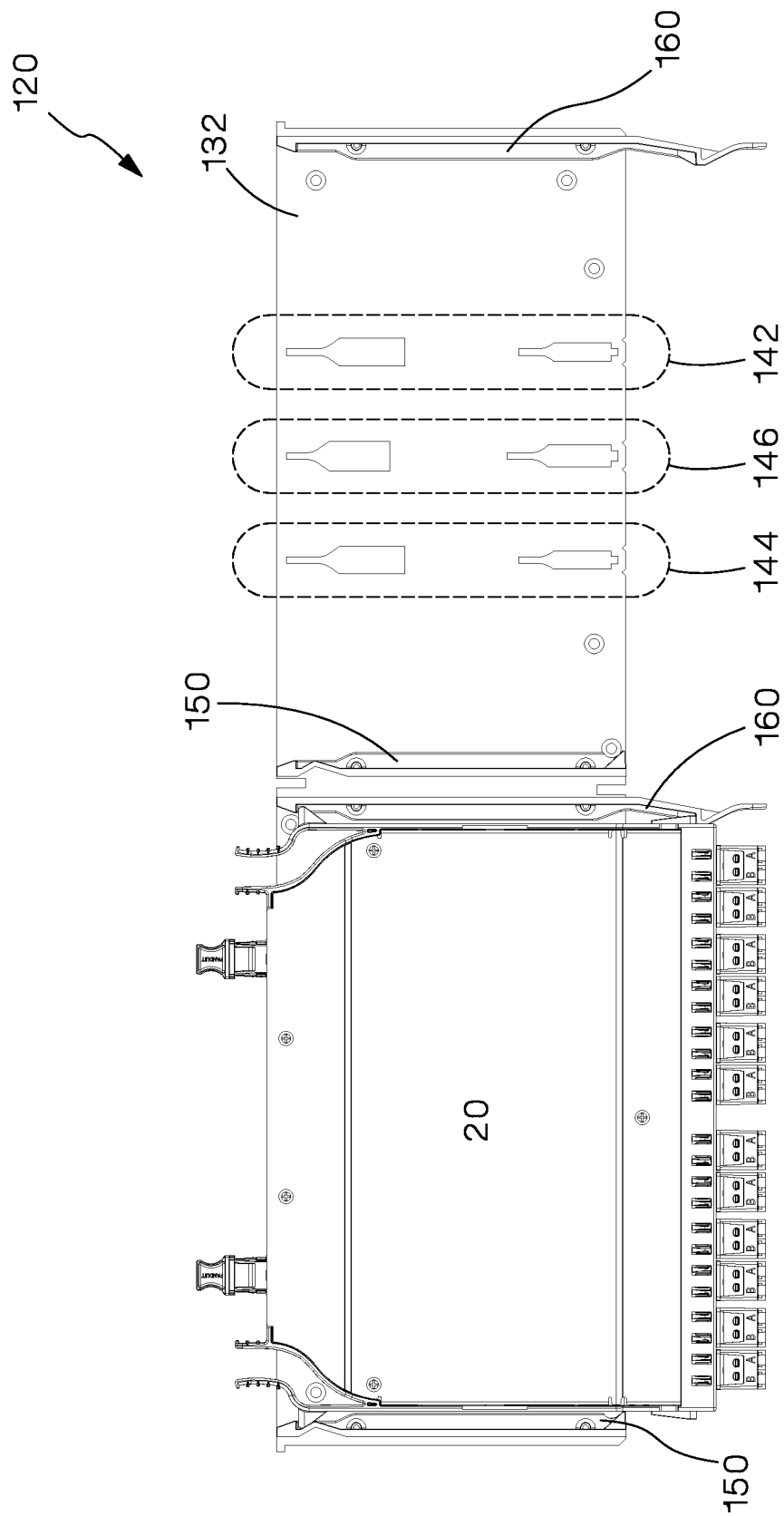
FIG. 11 is a top view of the modular tray with one module installed in the tray.
Figure 12:
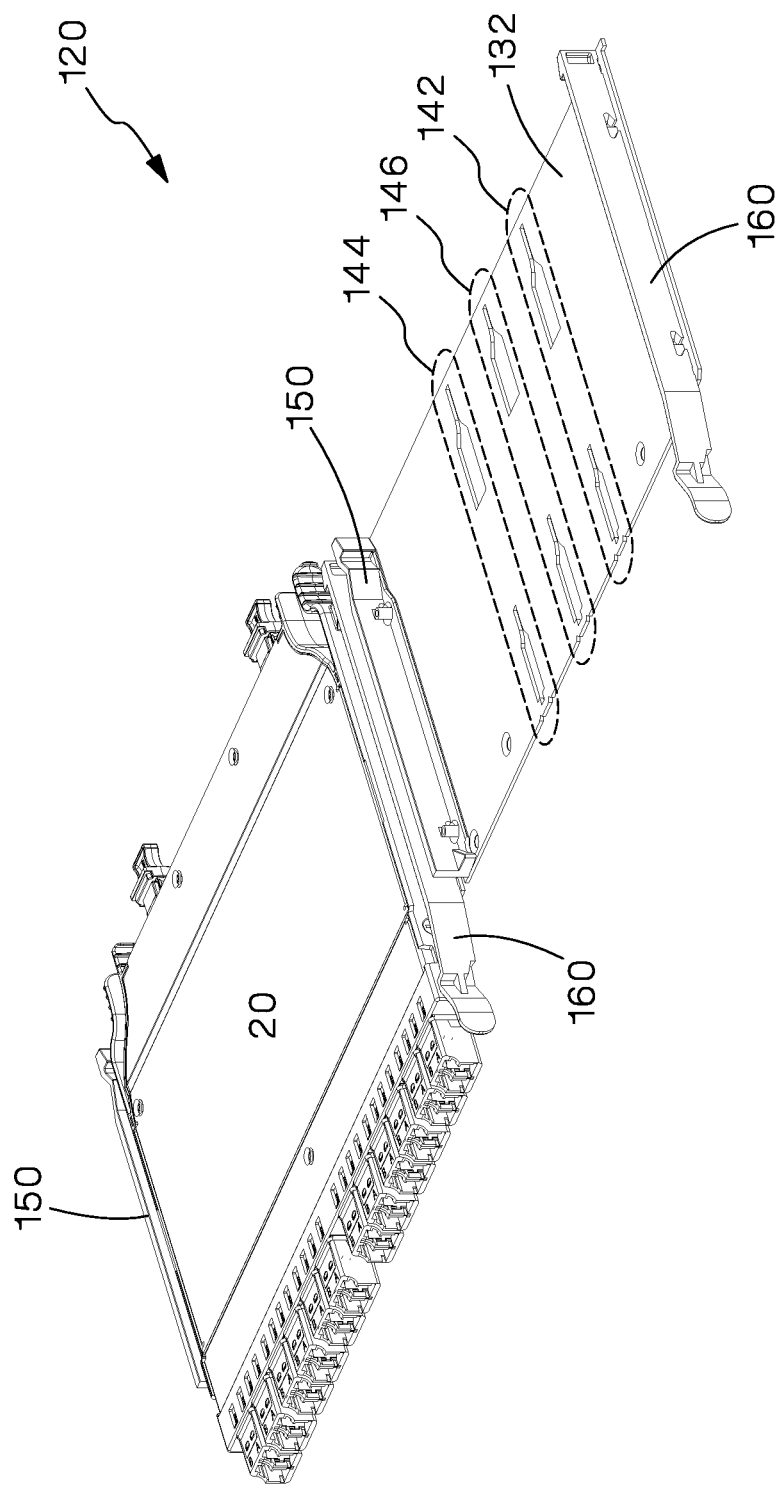
FIG. 12 is a perspective view of the modular tray with one module installed in the tray.

Referring back to FIG. 5, the cutout features 140 of the modular tray 120 are configured to receive a removable rail 180 in such a way that the removable rail 180 may be secured to and removed from the modular tray 120. In a preferred embodiment, one cutout feature 120 is a set of two or more cutouts in the body of the tray 120 each shaped to receive a portion of the removable rail 180. The cutout features 120 are preferably shaped as a larger rectangle at the portion of the cutout closest to the front of the modular tray 120 with a rear portion of the cutout that forms a slit. One set of cutout features 140 are disposed in a line parallel to the left and right rails 150, 160. Preferably, three sets of cutout features 140 are disposed on the modular tray. One middle set of cutout features 146 is disposed along the midline between the left and right rails 150, 160, so that, when a removable rail 180 is installed within the middle set of cutout features 146, two 12-optical fiber modules 30 may be installed on either side of the removable rail 180 as shown in FIGS. 7-8. Two additional sets of cutout features, left set of cutout features 144 and right set of cutout features 142, are disposed on either side of the middle set of cutout features 146 so that, when removable rails 180 are installed in both the left set of cutout features 144 and right set of cut out features 142, three 8-optical fiber modules 40 may be installed into the modular tray 120 as shown in FIGS. 9-10. Finally, when no removable rails 180 are installed in the modular tray 120, one 24-optical fiber module may be installed between the left rail 150 and right rail 160 as shown in FIGS. 11-12.

Referring now to FIGS. 13A, 13B, and 13C, the removable rails 180 include two rear latch retention features 188, a module contact protrusion 190, a front stop latch 192, a front retention boss 194, and at least one T-shaped mounting feature 196. One rear latch retention feature 188 is disposed on the left side 182 and right side 184 of the removable rail 180. The rear latch retention features 188, module contact protrusion 190, and front stop latch 192 are the same as on the left rail 150 and right rail 160. The front retention boss 194 is disposed within the front-most portion of the front-most cutout feature 140a when the removable rail 180 is fully installed in a modular tray 120. The T-shaped mounting feature 196 is located on the bottom of the removable rail 180 and includes a tapered front portion 198. The T-shaped mounting feature is shaped so that it can be inserted into the larger rectangle portion of the cutout features 140 closest to the front of the modular tray 120 and then slid toward the back of modular tray 120 so that the T-shaped mounting feature 196 securely engages with the rear portion of the cutout features 140 that forms a slit.

Figure 17:
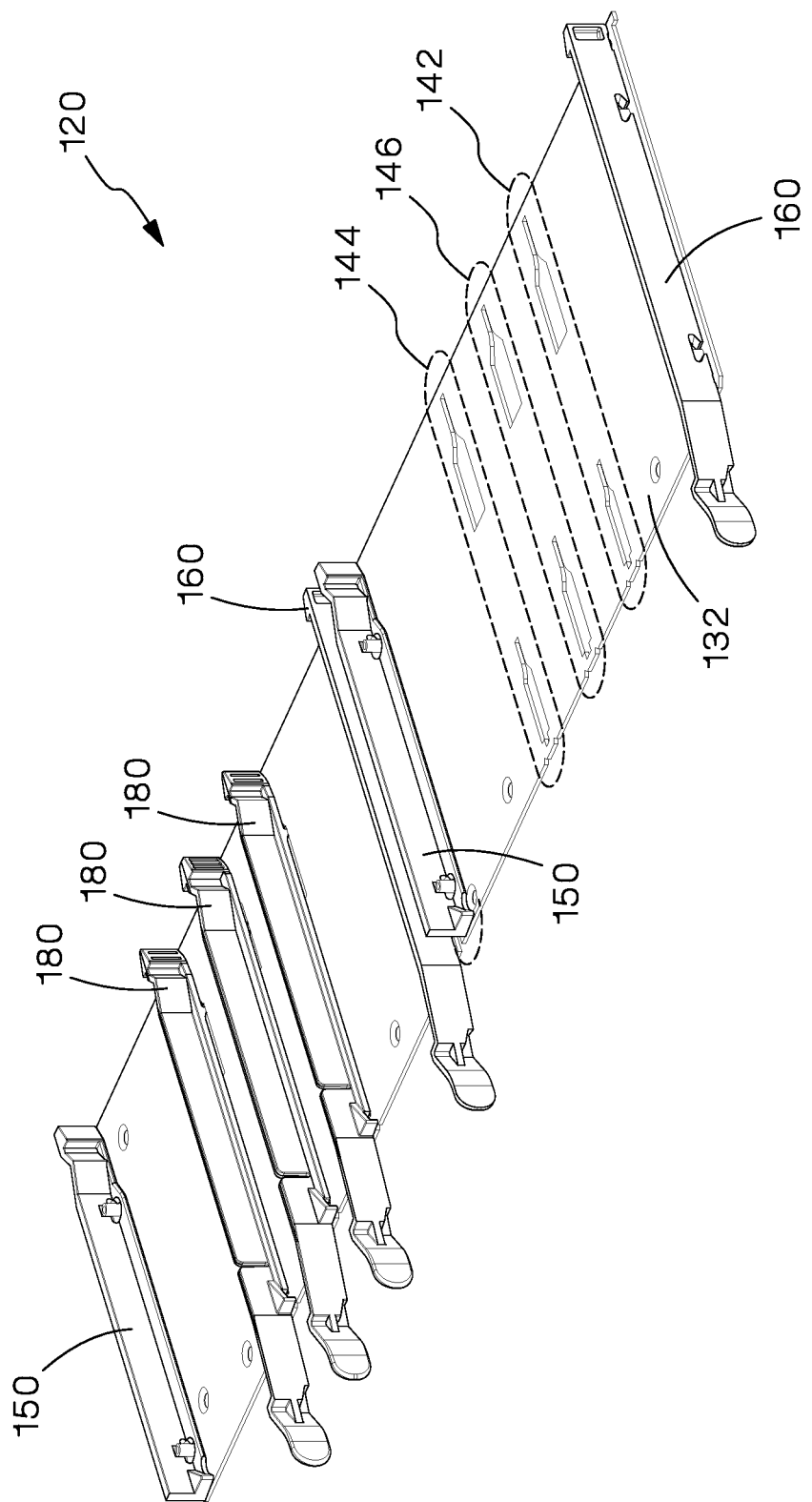
FIG. 17 is a perspective view of the modular tray with three removable rails installed in the tray.
Figure 18:
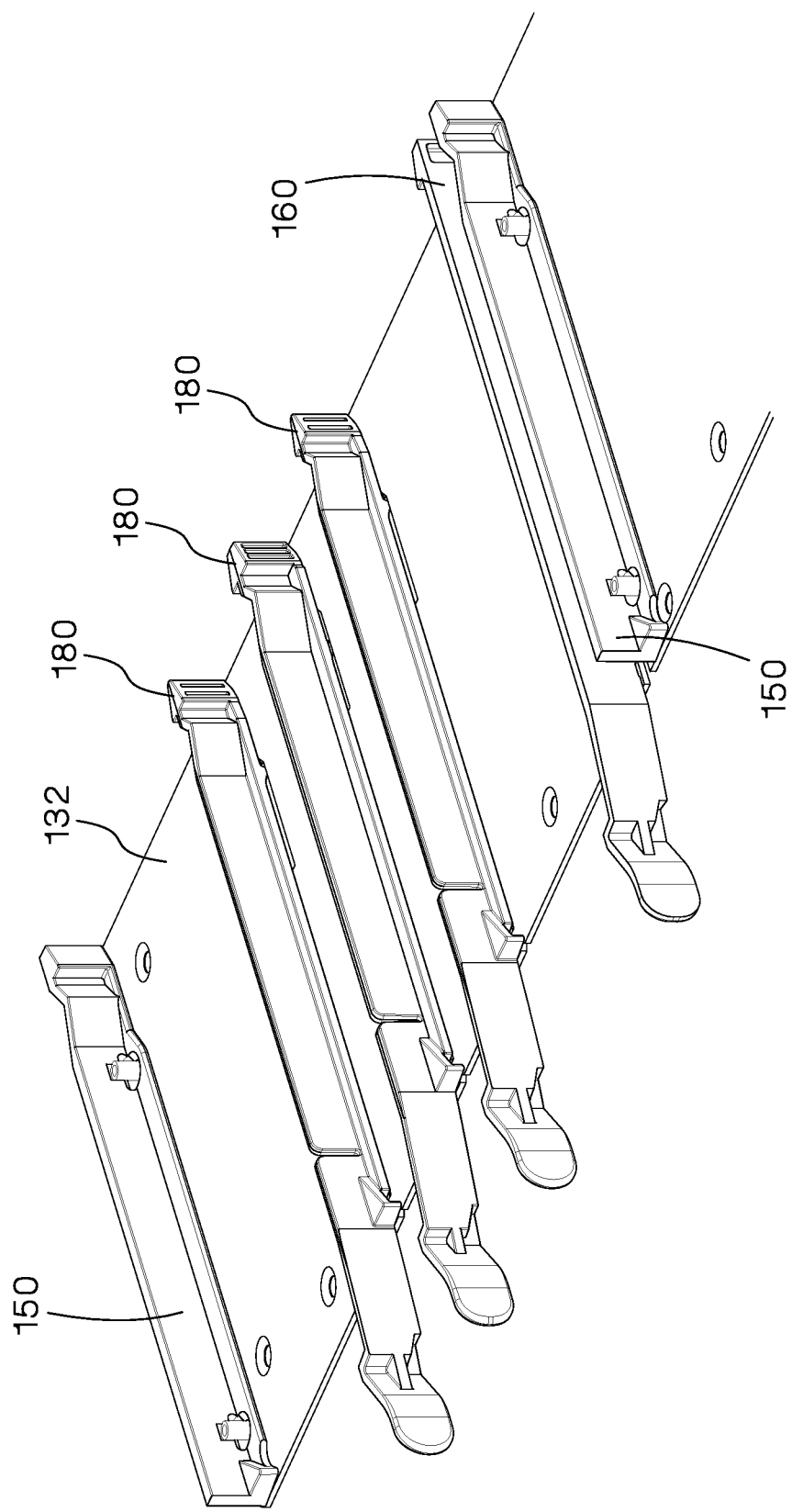
FIG. 18 is a perspective view of a portion of the modular tray with three removable rails installed in the tray.
Figure 19:
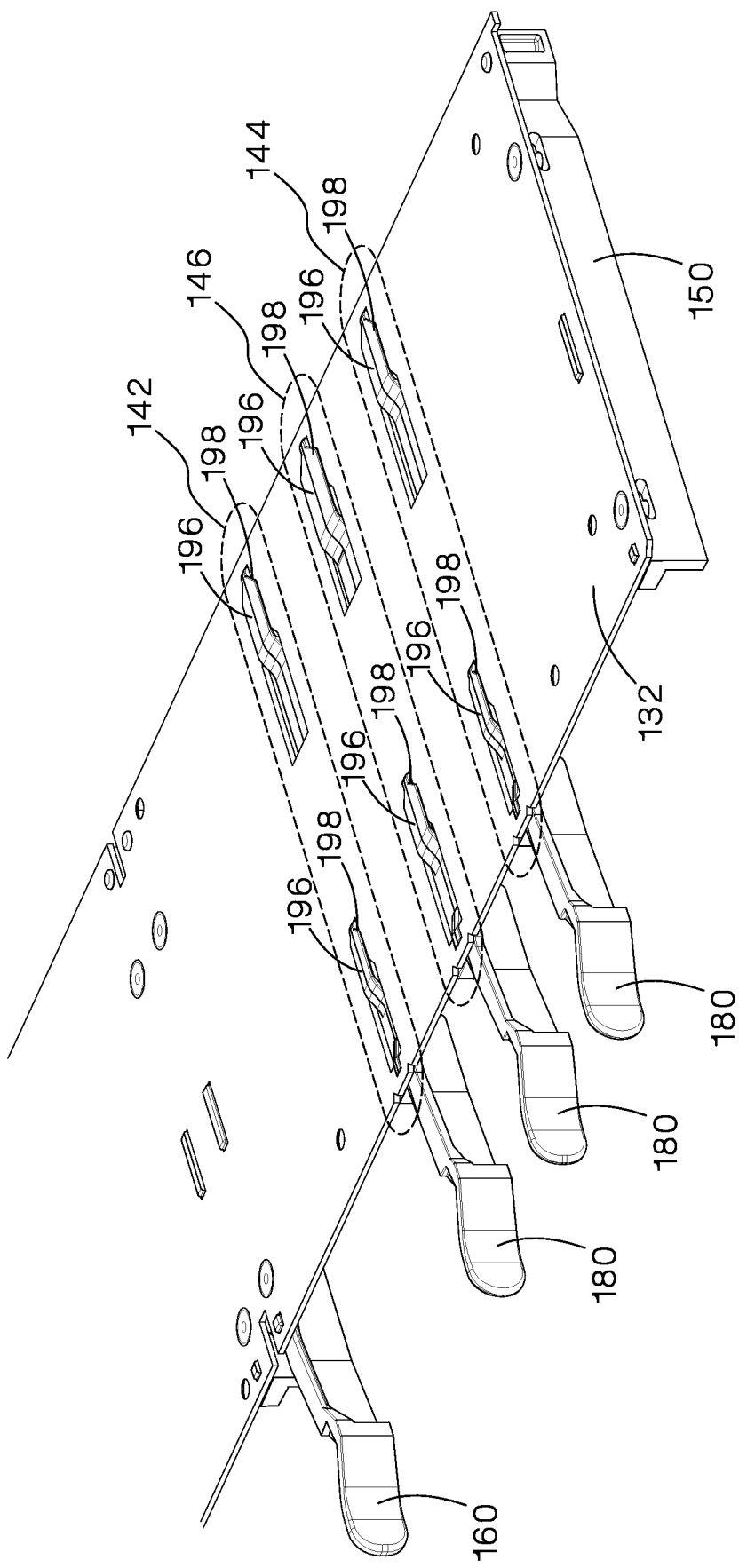
FIG. 19 is a perspective view of the bottom of a portion of the modular tray with three removable rails installed in the tray.
Figure 20:
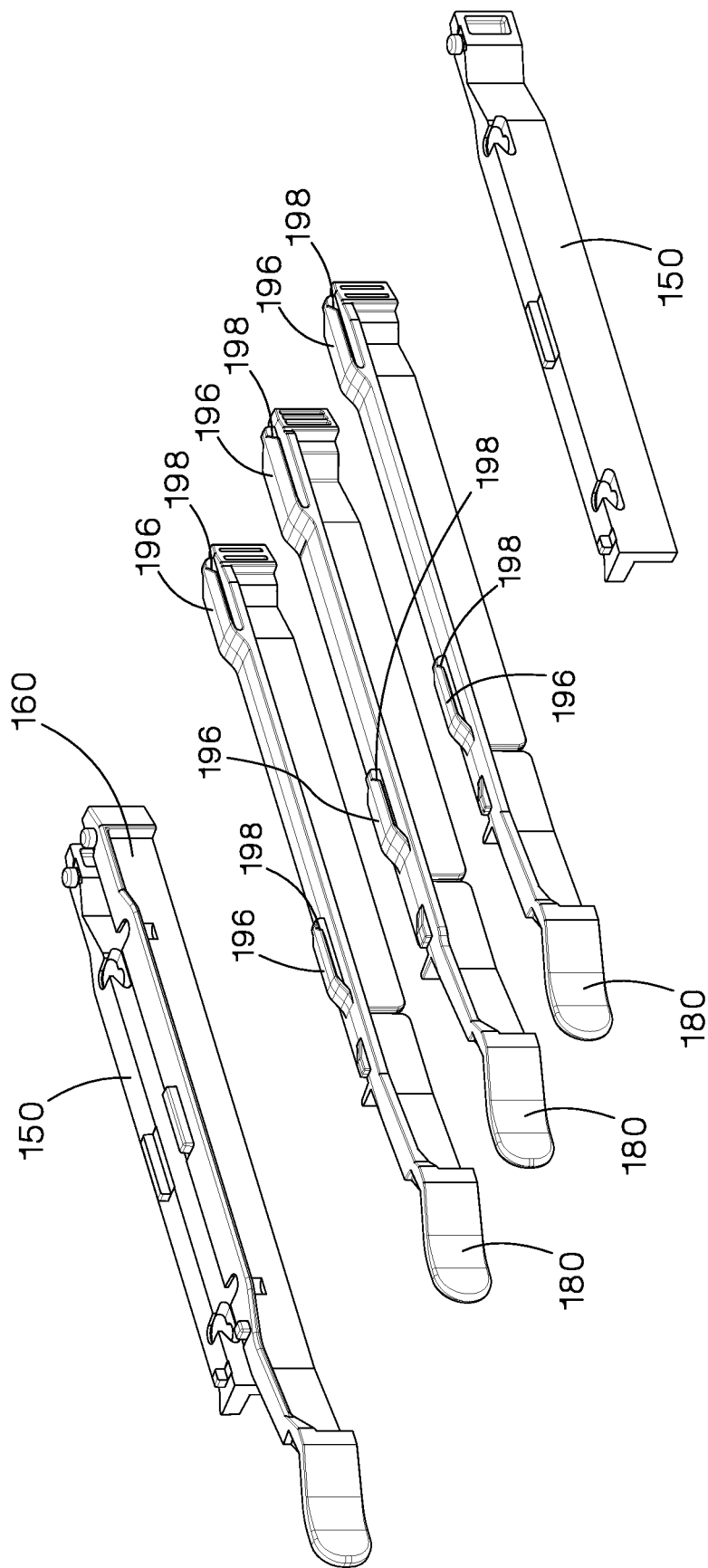
FIG. 20 is a perspective view of the left and right rails and three removable rails of the patch panel.

As shown in FIGS. 14-24, if different sets of cutout features 140 are disposed on the tray 120, one or more of the sets may be slightly different—i.e. as shown in FIGS. 17-19, the cutout features may be of different sizes or shapes, or, may be closer or further away from the front of the tray 120 than cutout features in other sets of cutout features. If this is the case, the removable rails 180 configured to be disposed in the cutout features would also be slightly different so that only a removable rail 180 designed to be installed in a particular set of cutout features 140 could be installed in that set of cutout features 140. Such different sizes or shapes may allow for different rails to be used in different positions. Additionally, these rails of different sizes or shapes may be color coded or otherwise identified to match up the appropriate removable rail 180 to a set of cutout features 140.

Figure 15:
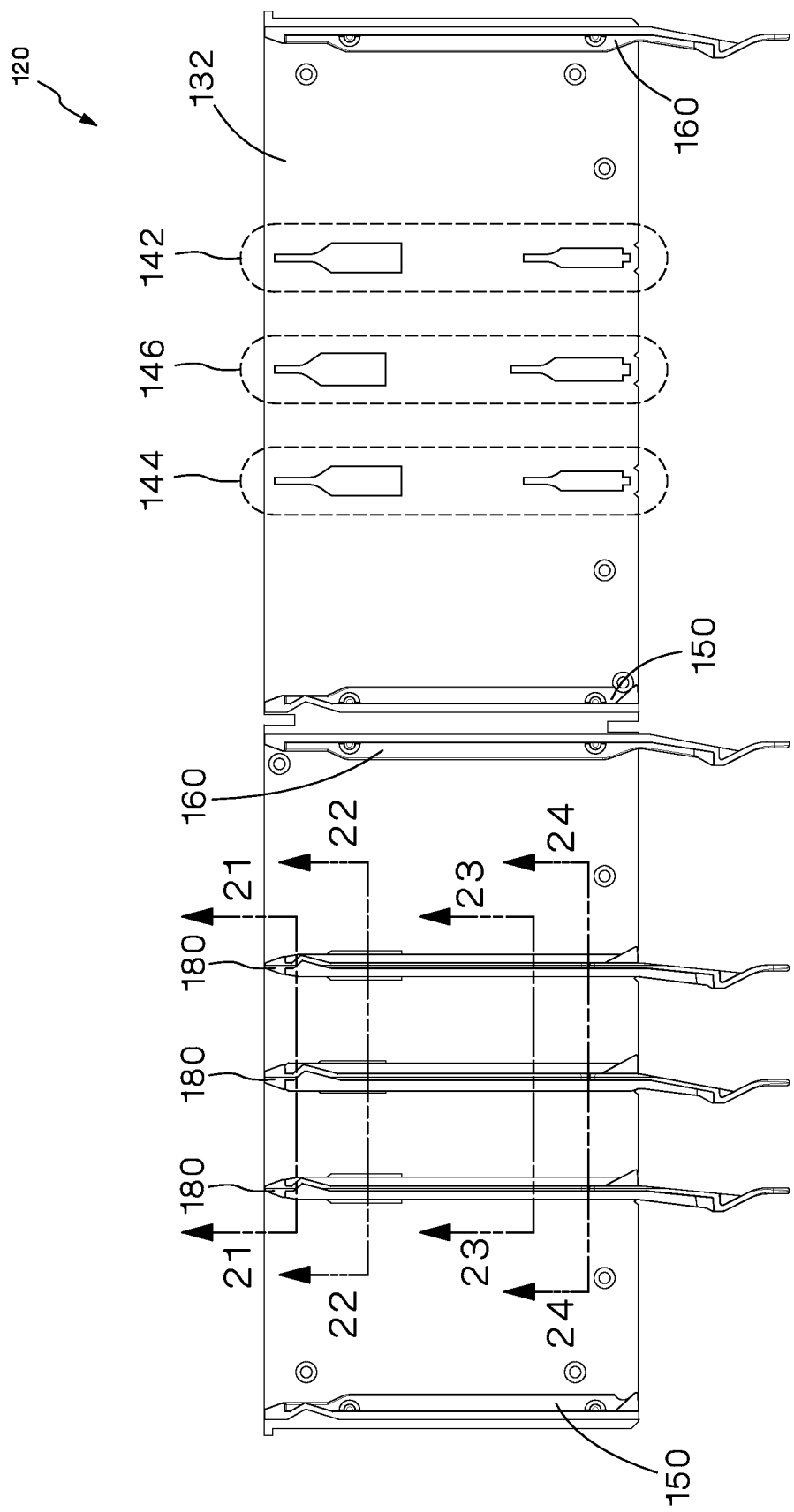
FIG. 15 is a top view of the modular tray with three removable rails installed in the tray.
Figure 16:
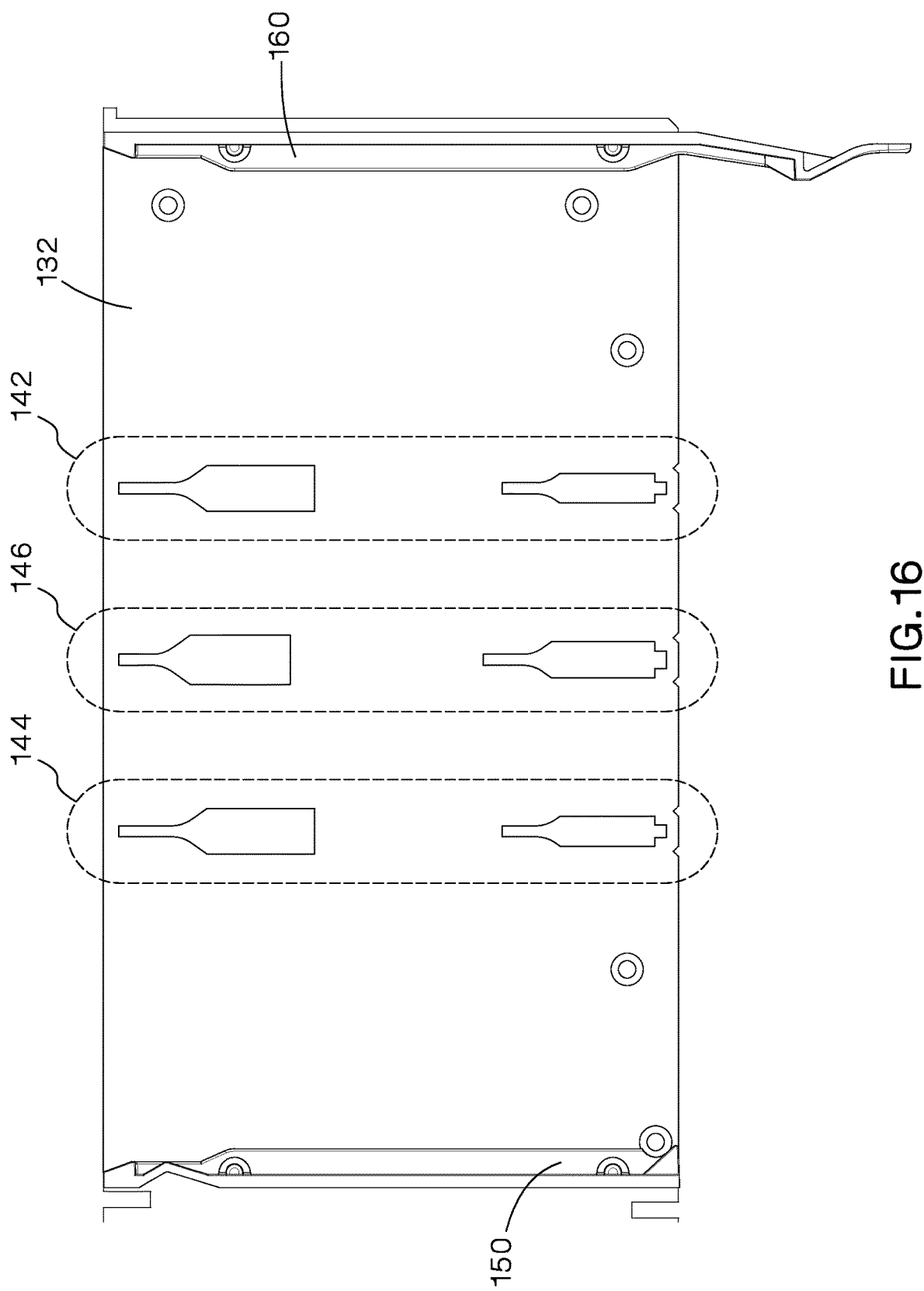
FIG. 16 is a top view of a portion of the modular tray with the right and left rails.
Figure 21:
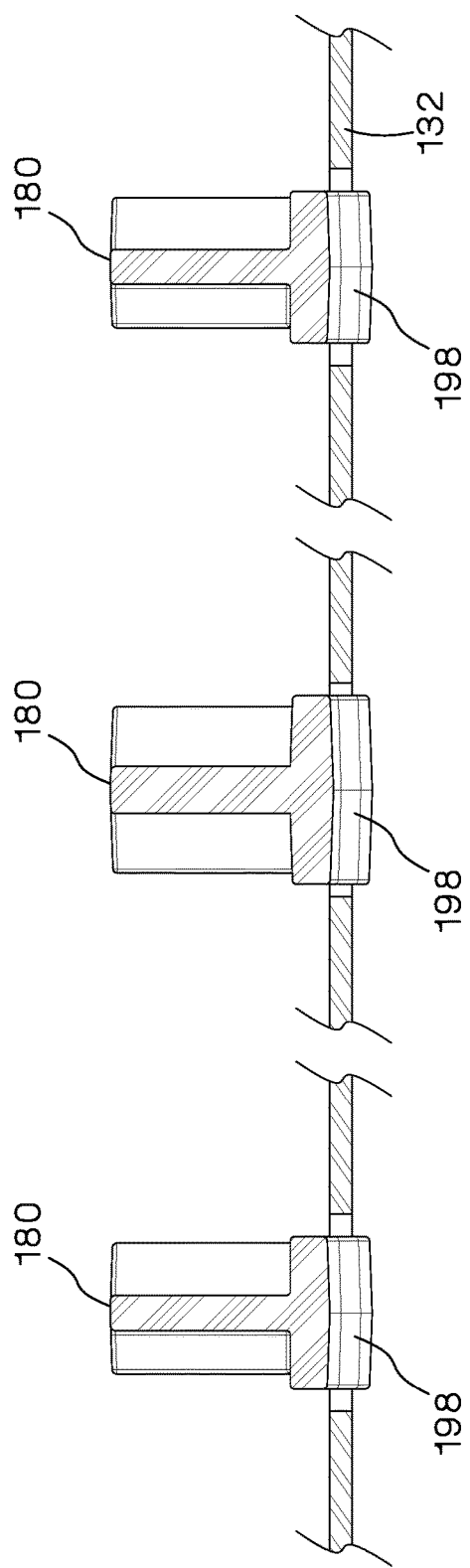
FIG. 21 is cross sectional views of the three removable rails of FIG. 15.
Figure 22:
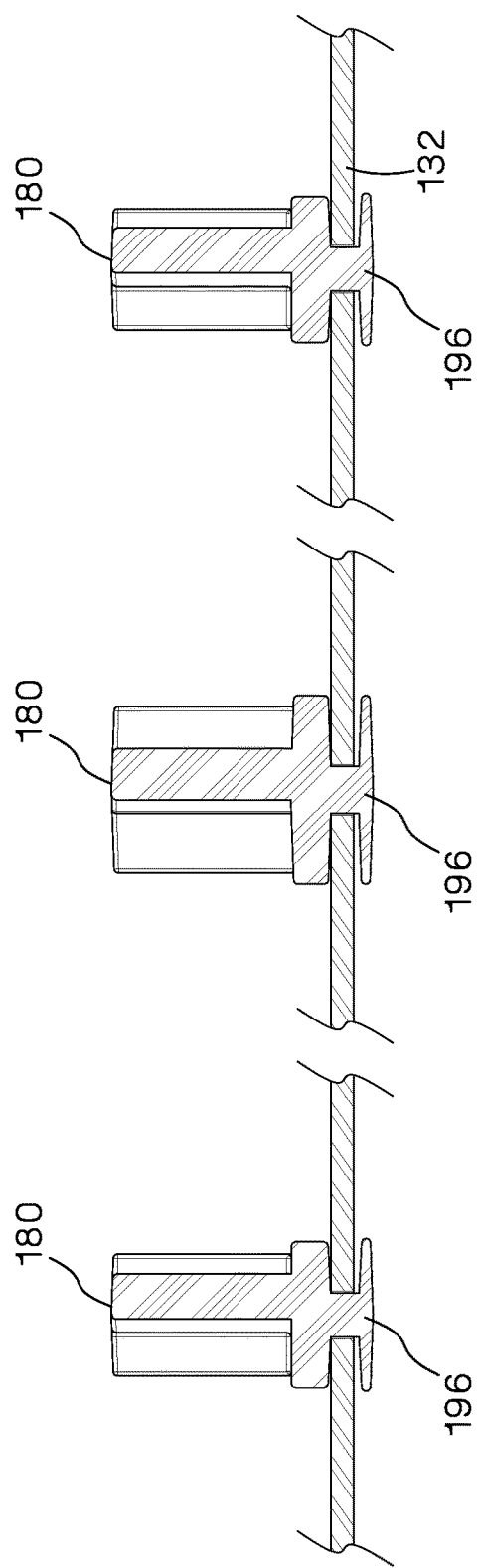
FIG. 22 is cross sectional views of the three removable rails of FIG. 15.

FIGS. 21-24 provide cross-sectional views of the removable rails 180 installed in the modular tray 120 shown in FIG. 15. As can be seen in FIG. 21, the tapered front of the T-shaped mounting feature 198 at the rear of the center removable rail 180 is larger than the outside removable rails 180. Similarly, as shown in FIG. 22, the cross-section of the center removable rail 180 is larger than the cross-section of the outside removable rails 180. Thus, the center removable rail 180 would only fit within the middle set of cutout features 146, and the outside removable rails 180 would only fit within the left and right sets of cutout features 142, 144. FIGS. 23 and 24 show that the second T-shaped features of the removable rails 180 have similarly-sized cross sections—i.e. the tapered front 198 and cross section of the T-shaped mounting features 196 of the center removable rail 180 are larger than the tapered front 198 and cross section of the T-shaped mounting features 196 of the outside removable rails 180. One of ordinary skill in the art would understand that this feature may be accomplished in many other ways—for example, the middle set of cutouts 146 and T-shaped mounting feature 196 of the middle removable rail 180 may be disposed slightly closer to the front if the modular tray 120 than the left and right sets of cutouts 242, 244 and the T-shaped mounting features 196 of the left and right removable rails 180.

Figure 25A:
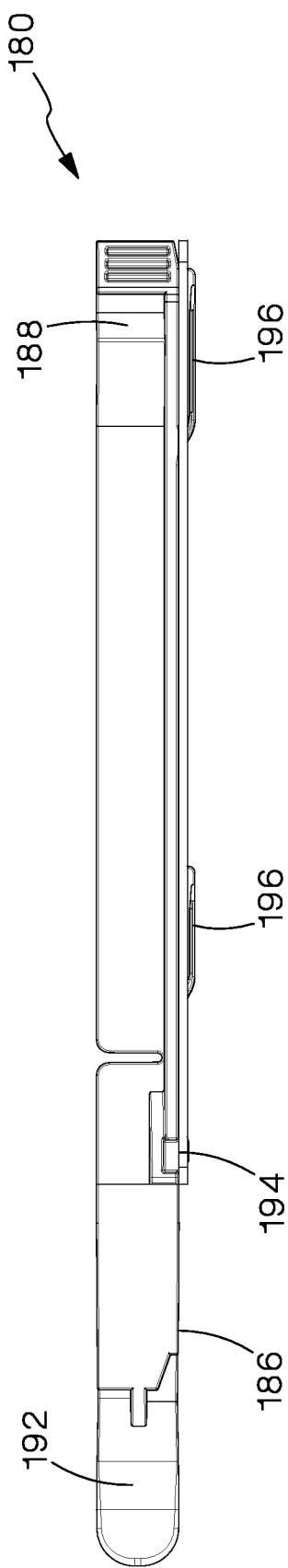
FIGS. 25A and 25B are side views of the two different removable rails shown in FIG. 20.
Figure 25B:
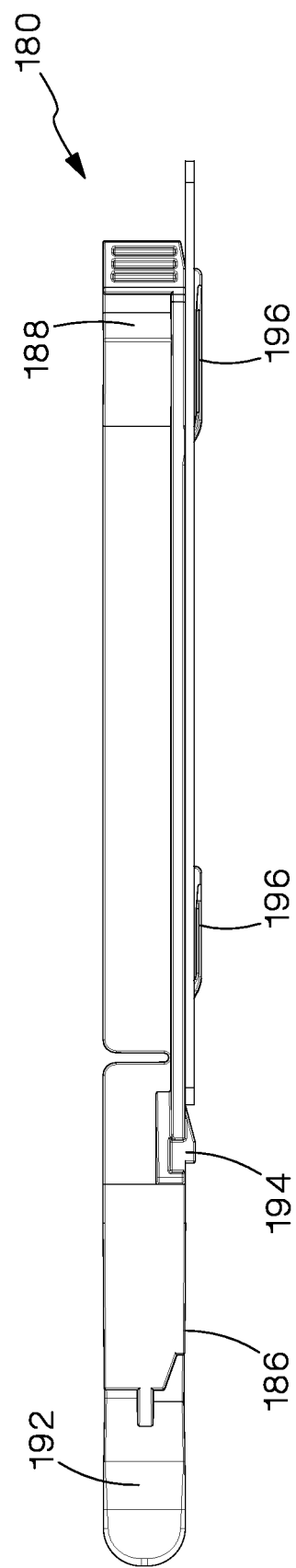

As shown in FIGS. 25A and 25B, in which the removable rail 180 is fully installed in FIG. 25A, in order to install a removable rail 180 into a modular tray 120, the T-shaped mounting feature(s) 196 of the removable rail 180 are inserted through the larger portion of the cutout features 140 in one set of cutout features. The removable rail 180 is then slid toward the back of the modular tray 120 until the T-shaped mounting feature 196 is secured within the narrower portion of the cutout features 140. When the T-shaped mounting features 196 reach the rear-most portion of the cutout features 140, the front retention boss 194 slides into and abuts the front of the front-most cutout 140a. Thus, the front retention boss 194 secures the removable rail 180 in the modular tray 120. In order to remove the removable rail 180, a user first uses his hand or other tool to press the front retention boss 194 upward past the front of the front-most cutout 140a. Once the front retention boss 194 clears the front-most cutout 140*a*, the removable rail 180 may be slid toward the front of the modular tray 120 until the T-shaped features 196 of the removable rail 180 are located in the larger portion of the cutout features 140. The removable rail 180 is then no longer secured to the modular tray 120 and may be removed.

As shown in FIGS. 26A and 26B, once the removable rail 180 is installed, fiber optic modules 10 may be installed onto the tray 120 in a conventional manner. In particular, to install a fiber optic module 10 from the front of the fiber optic enclosure 2, a user pushes the fiber optic module 10 from the front of the enclosure into a space on the tray formed by two of the rails installed on the modular tray 120. The user continues pushing the fiber optic module 10 into the space until the front retention feature 14 of the fiber optic module 10 seats within a front stop latch 168 or 192. As shown in FIGS. 27A and 27B, to uninstall a fiber optic module 10 from the front of the enclosure 2 a user pushes the front stop latch 168 or 192 to the right to release the fiber optic module 10. The user then pulls the fiber optic module 10 toward the front of the fiber optic enclosure 2.

Referring now to FIGS. 28A and 28B, to install a fiber optic module 10 from the rear of the fiber optic enclosure 2, the user pushes the fiber optic module 10 from the rear of the enclosure 2 into a space on the tray 120 formed by two of the rails installed on the modular tray 120. The user continues pushing until the rear module retention latches 12 of the fiber optic module 10 seat in the rear latch retention features 152, 162, or 188 of the rails. As shown in FIGS. 29A and 29B, to uninstall a fiber optic module 10, a user squeezes the rear module retention latches 12 of the module toward each other until the fiber optic module 10 is released from the rear latch retention features 152, 162, or 188. The user then continues to pull the fiber optic module 10 toward the rear of the fiber optic enclosure 2.

Figure 30:
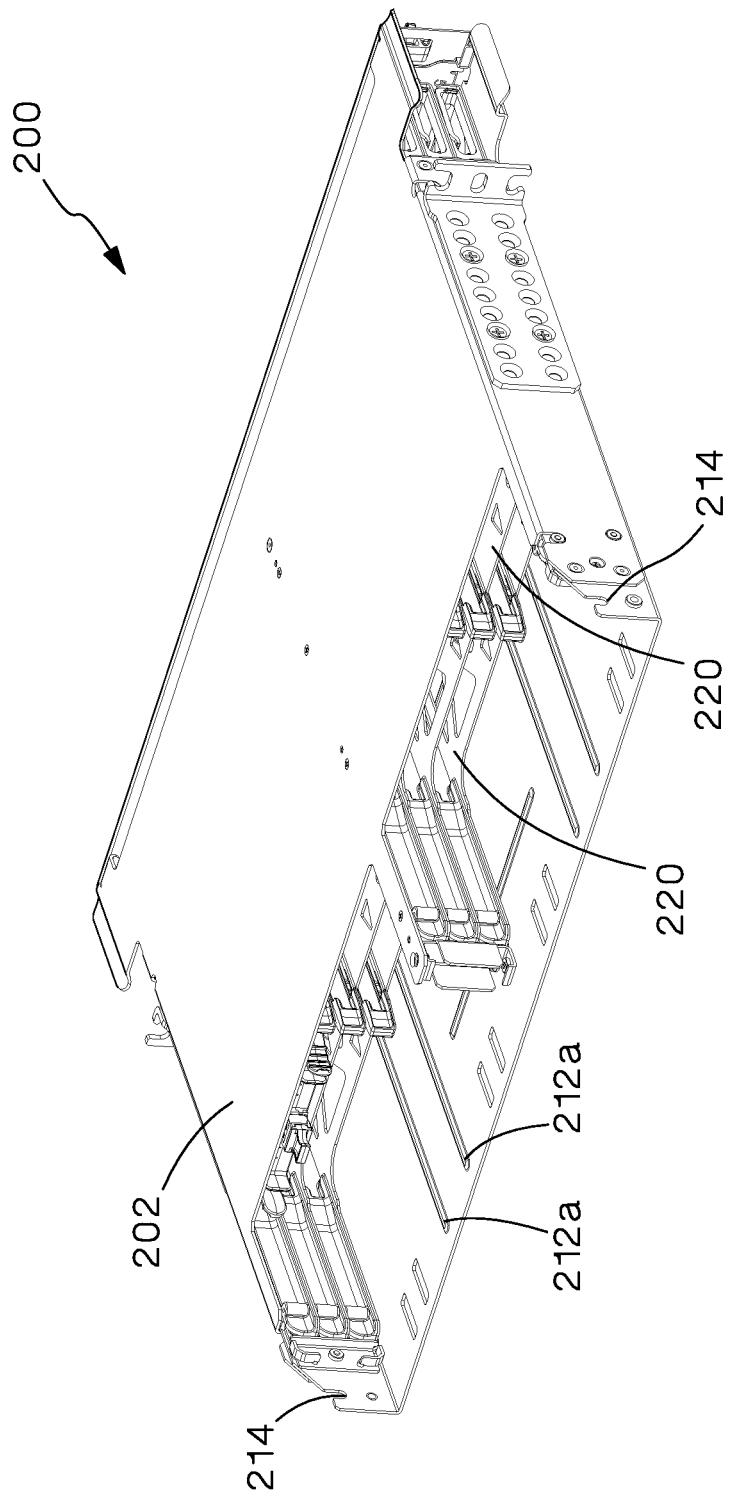
FIG. 30 is a perspective view of the rear of a High Density Fiber Enclosure ("HDFE").
Figure 31:
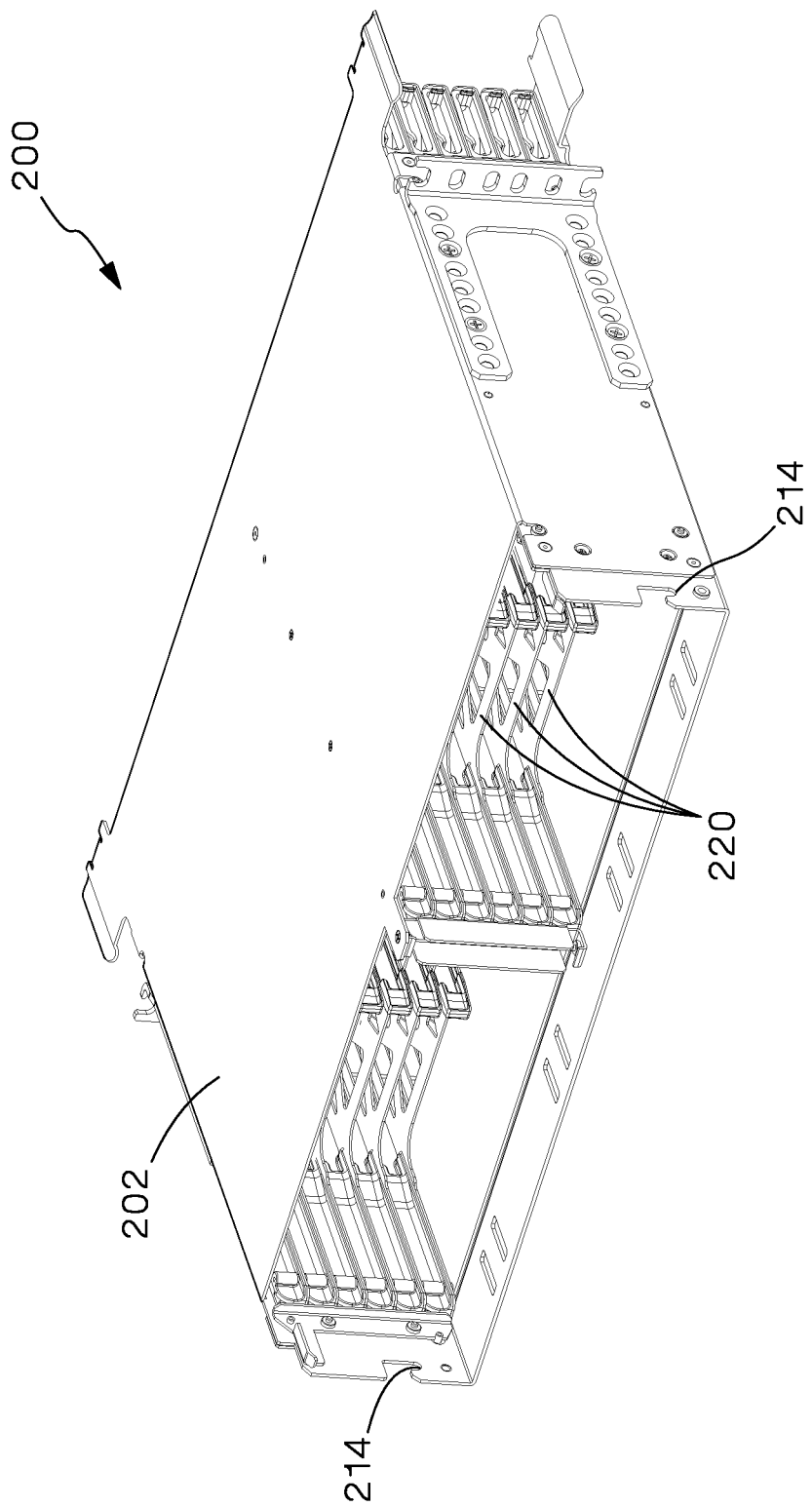
FIG. 31 is a perspective view of the rear of another embodiment of a HDFE.
Figure 32:
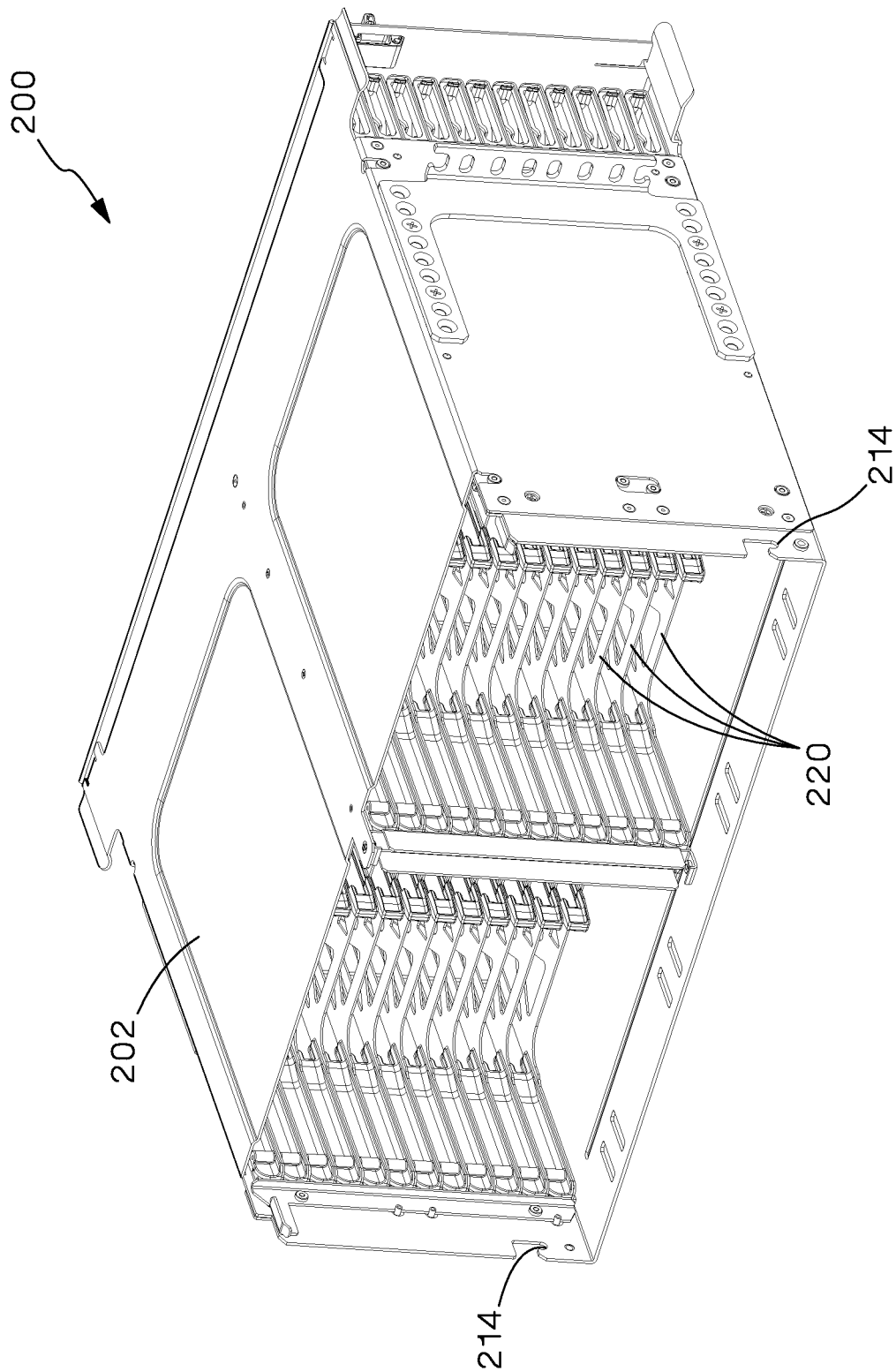
FIG. 32 is a perspective view of the rear of another embodiment of a HDFE.
Figure 33:
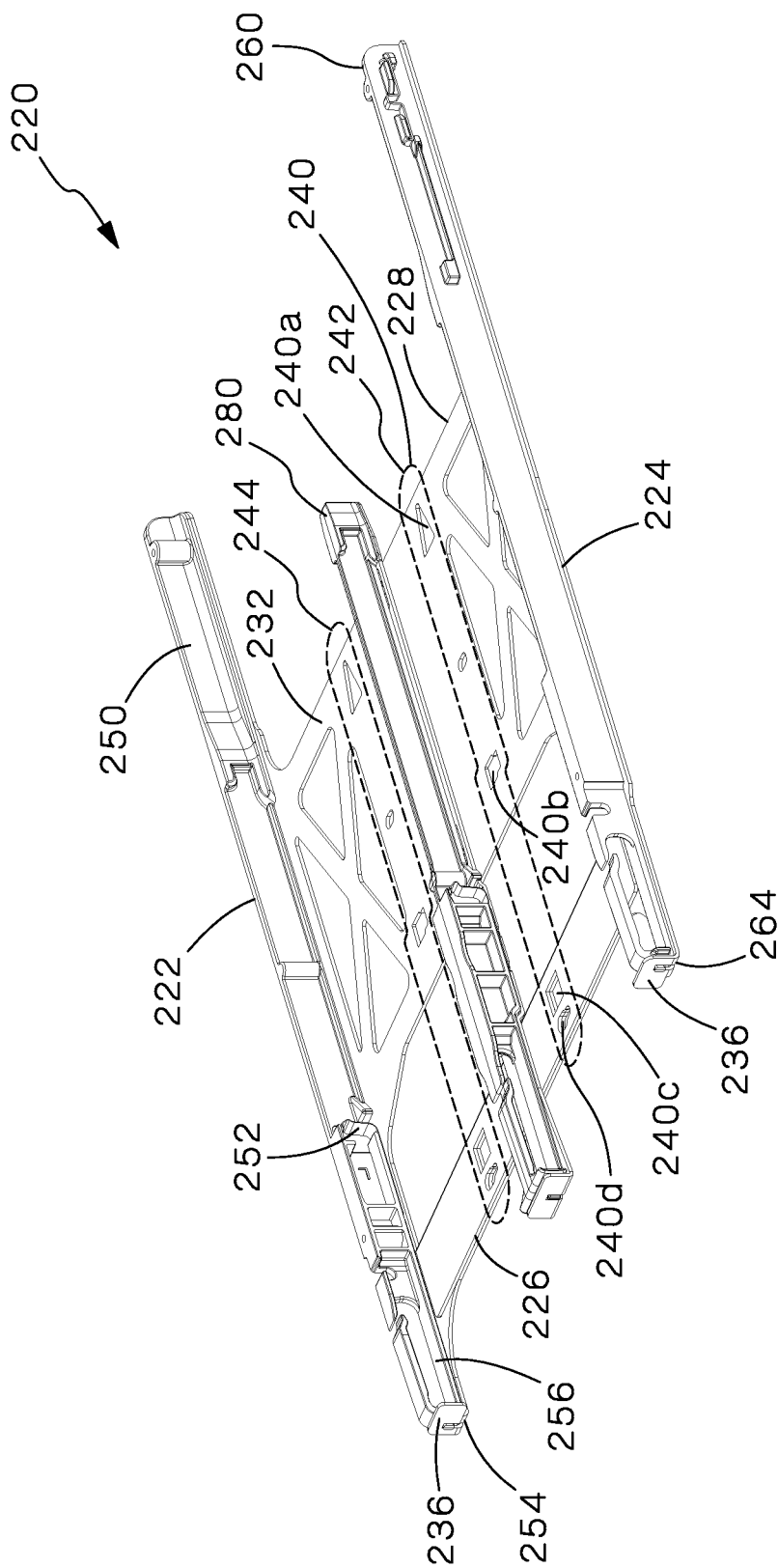
FIG. 33 is a perspective view of the HDFE tray with a removable rail installed in the tray.
Figure 34:
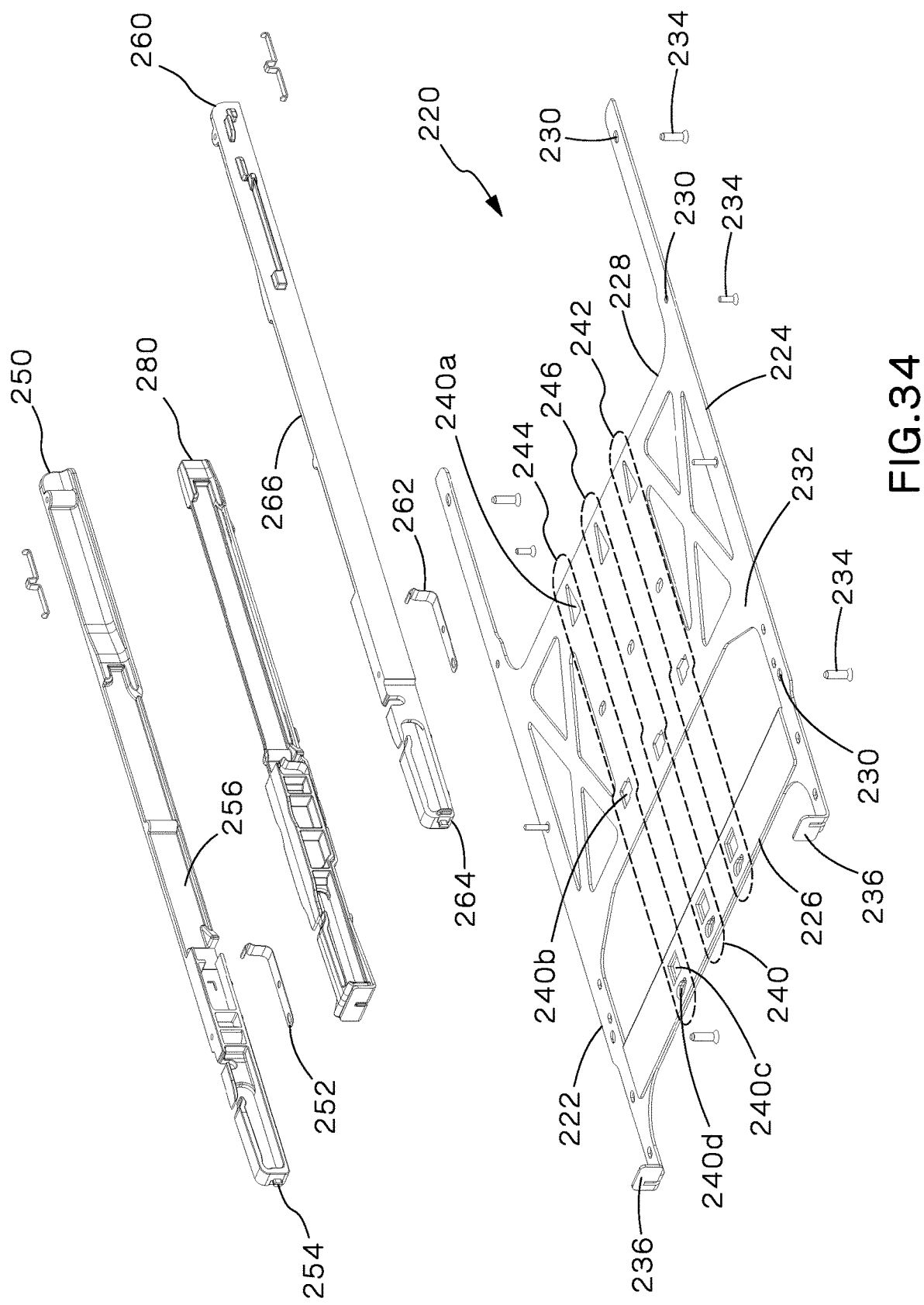
FIG. 34 is an exploded perspective view of the HDFE tray of FIG. 33.
Figure 35:
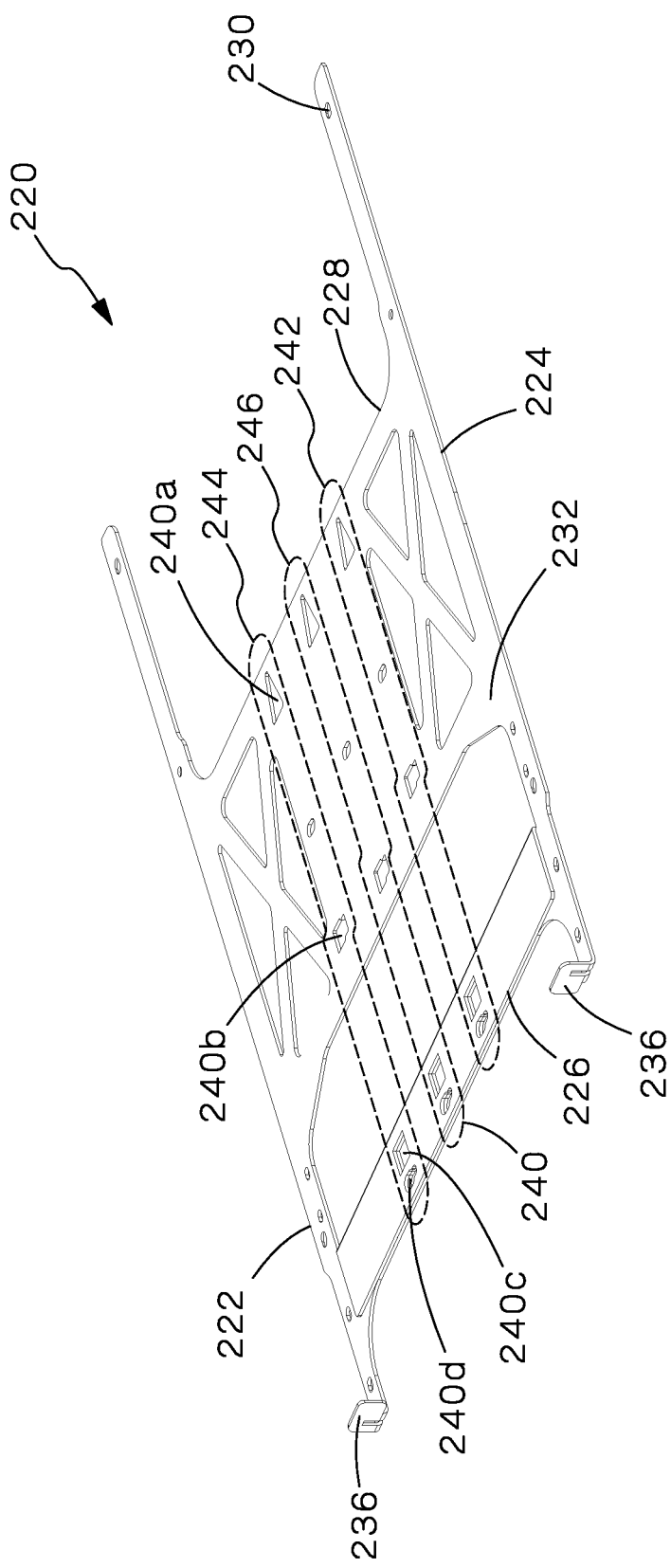
FIG. 35 is a perspective view of the body of the HDFE tray.
Figure 36:
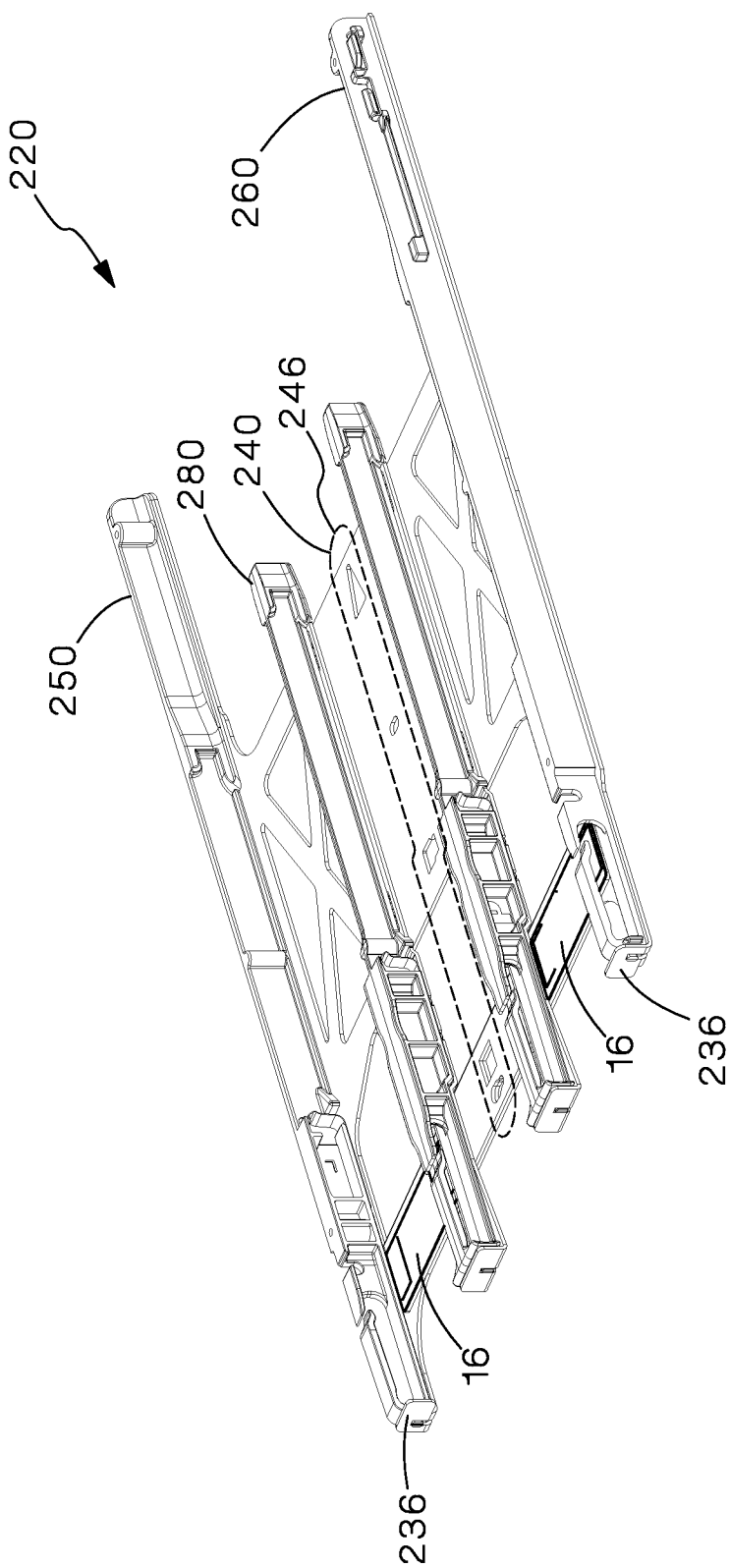
FIG. 36 is a perspective view of the HDFE tray with two removable rails installed in the tray.
Figure 37:
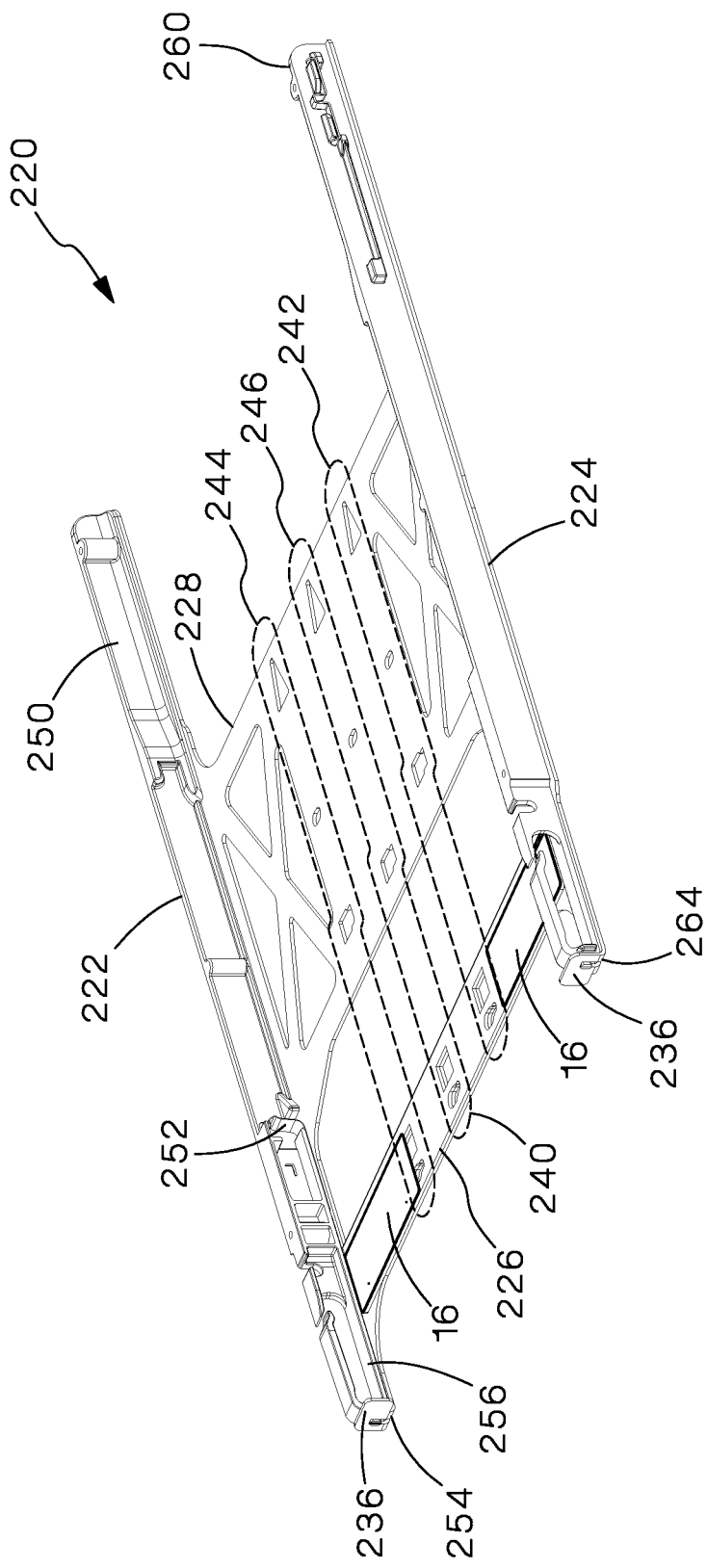
FIG. 37 is a perspective view of body of the HDFE tray including right and left rails.

Another embodiment of the present invention, a High Density Fiber Enclosure (HDFE) 200 that includes a modular tray and removable rail design is described below. As shown in FIGS. 30-32, the High Density Fiber Enclosure 200 includes a top cover 202, bottom portion 212, and mounting for cable slack management 214. As further shown in FIG. 33, the HDFE 200 also includes a HDFE modular tray 220 that includes at least one tray body 232, HDFE cut out features 240, alignment pins 234, alignment holes 230, metal tabs 236, a HDFE left rail 250, a HDFE right rail 260, and two labels 16 (shown in FIGS. 36-37). One alignment pin 234 each is located on the left edge 222 and right edge 224 of the HDFE modular tray 220 and passes through an alignment hole 230. The alignment pins 234 are self-clinching and are configured to engage with a hole in a HDFE left rail 250 and right rail 260, respectively, to align the HDFE left rail 250 and right rail 260 with the left edge 222 and right edge 224 of the HDFE modular tray 220. The alignment pins 234 may be self-tapping screws or another suitable fastener known in the art. A metal tab 236 is located at the front-most portion of the left edge 222 and right edge 224 of the HDFE modular tray 220. The metal tab 236 extends upward at a 90-degree angle to the HDFE modular tray 220 and secures the front portion of the HDFE left rail 250 and right rail 260. The labels 16 are disposed on the front 226 of the HDFE tray 220.

The HDFE left rail 250 and HDFE right rail 260 are both permanently secured to the left edge 222 and right edge 224 respectively of the HDFE modular tray 220. The HDFE left rail 250 and HDFE right rail 260 also both include a metal spring clip 252, 262 for retaining a fiber optic module 10. The metal spring clip 252 is disposed on the right side 256 of the HDFE left rail 250, and the metal spring clip 262 is disposed on the left side 266 of the HDFE right rail 260 so that the metal spring clips 252, 262 face one another.

The HDFE cutout features 240 are formed to removably receive HDFE removable rails 280. As shown in FIGS. 33-37, a HDFE cutout feature 240 is a set of two or more cutouts in the body of the tray 220 each shaped to receive a portion of the HDFE removable rail 280. The set of cutout features 240 are disposed in a line parallel to the left and right rails 250, 260. In a preferred embodiment four cutouts comprise one set of cutout features 240. The rear-most cutout 240*a* is triangularly-shaped so that the triangle points toward the rear 228 of the HDFE modular tray 220. The middle cutout 240*b* is formed of an overlapping larger and smaller rectangle, where the smaller rectangle is configured to securely hold a portion of the HDFE removable rail 280. The final two cutouts are disposed proximate to one another near the front 226 of the HDFE modular tray 220. The forward-most cutout 240*d* is formed of two ovals cut out of the HDFE modular tray 220. One of the ovals is larger than the other, and the ovals overlap so that a self-clinching keyhole fastener 284 of a removable rail 280 may be inserted into the larger oval portion of the forward-most cutout 240*d* and then slid over to be secured in the smaller oval portion of the forward-most cutout 240*d*. The final cutout, the latch-receiving cutout 240*c*, is located just to the rear of the forward-most cutout 240*d* and is configured to receive a latch 290*c* located on the HDFE removable rail 280. One embodiment of the latch-receiving cutout 240*c* is a rectangular-shaped cutout.

Figure 38:
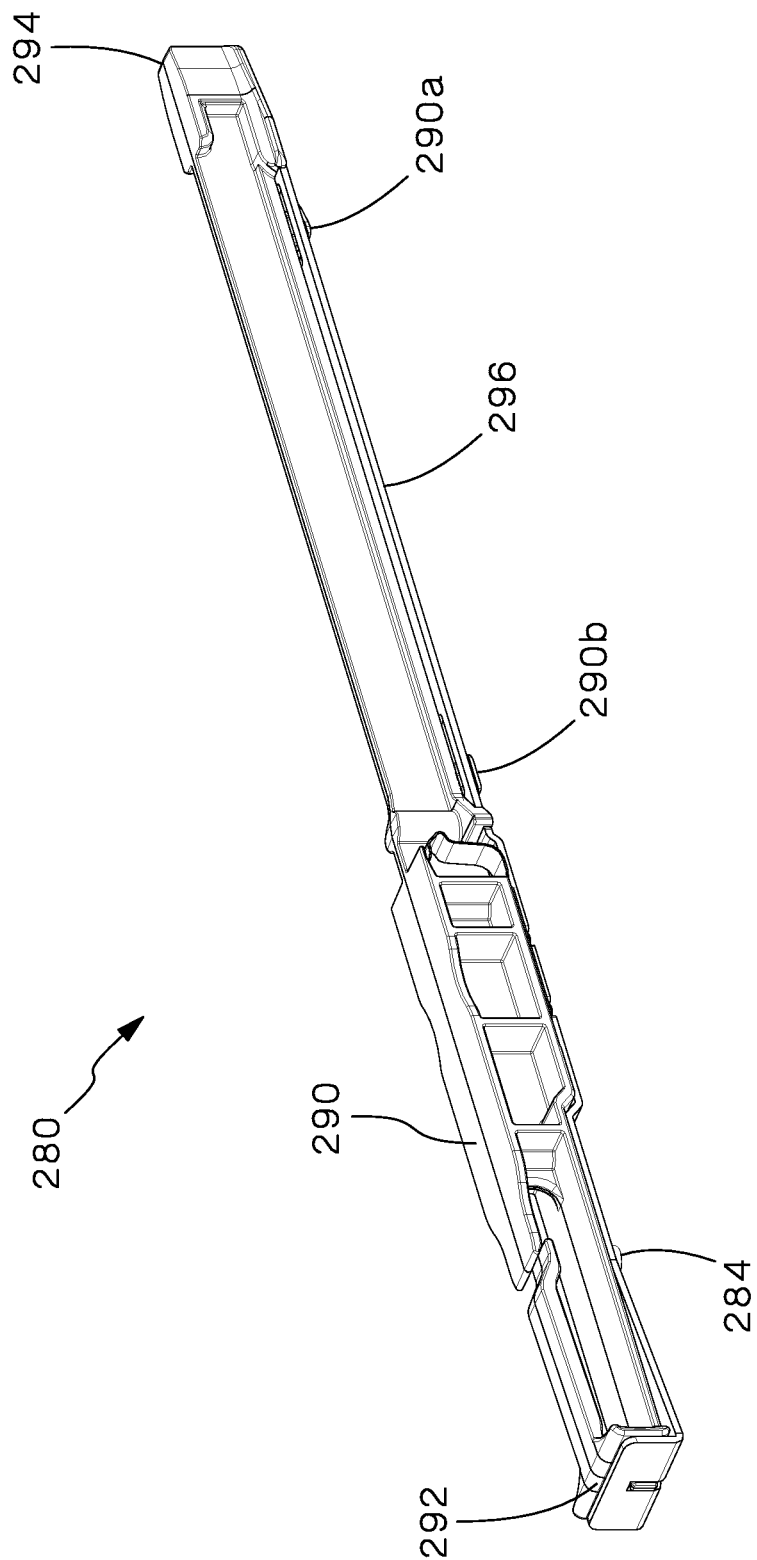
FIG. 38 is a perspective view of the HDFE removable rail.
Figure 39:
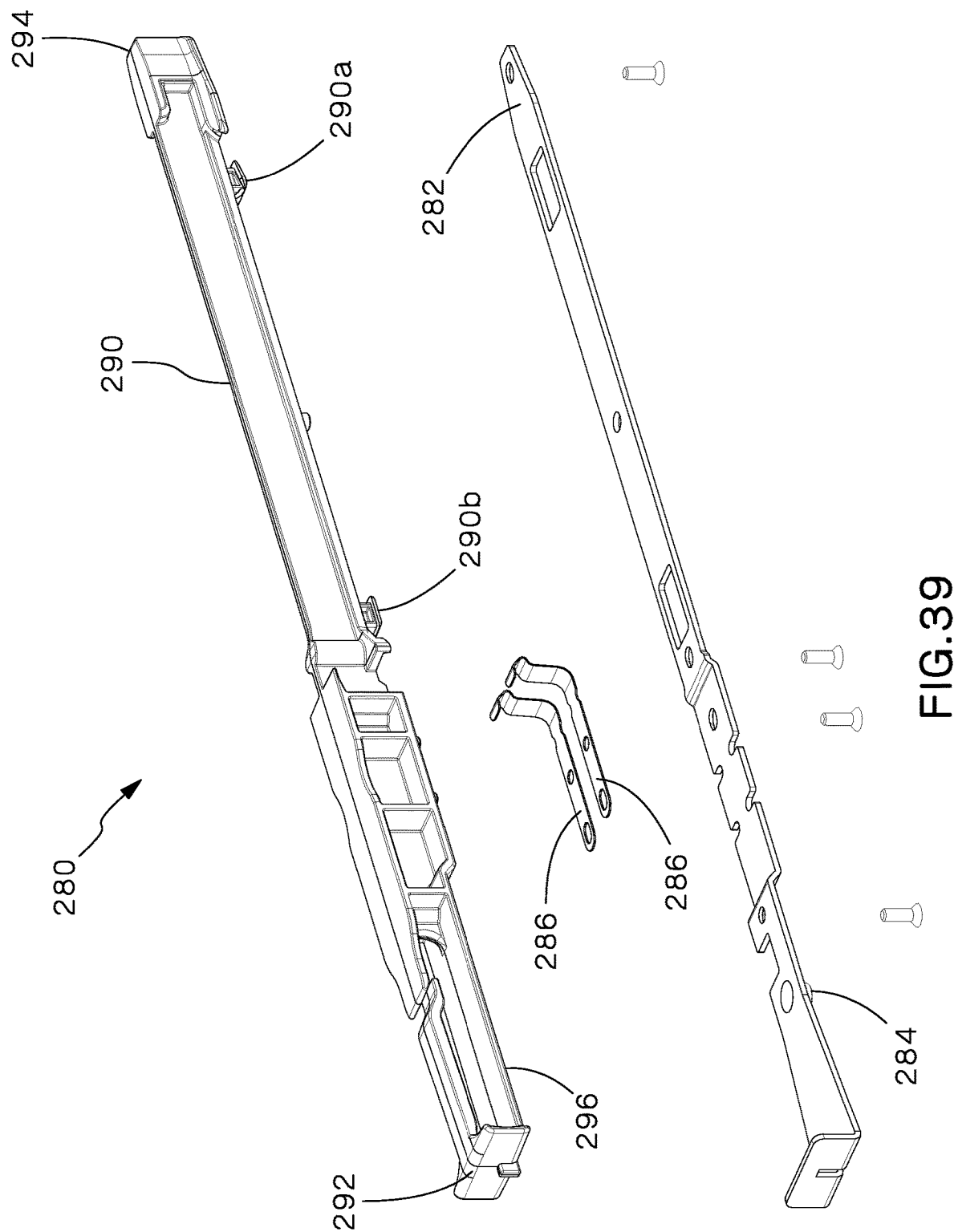
FIG. 39 is an exploded perspective view of the HDFE removable rail.
Figure 40:
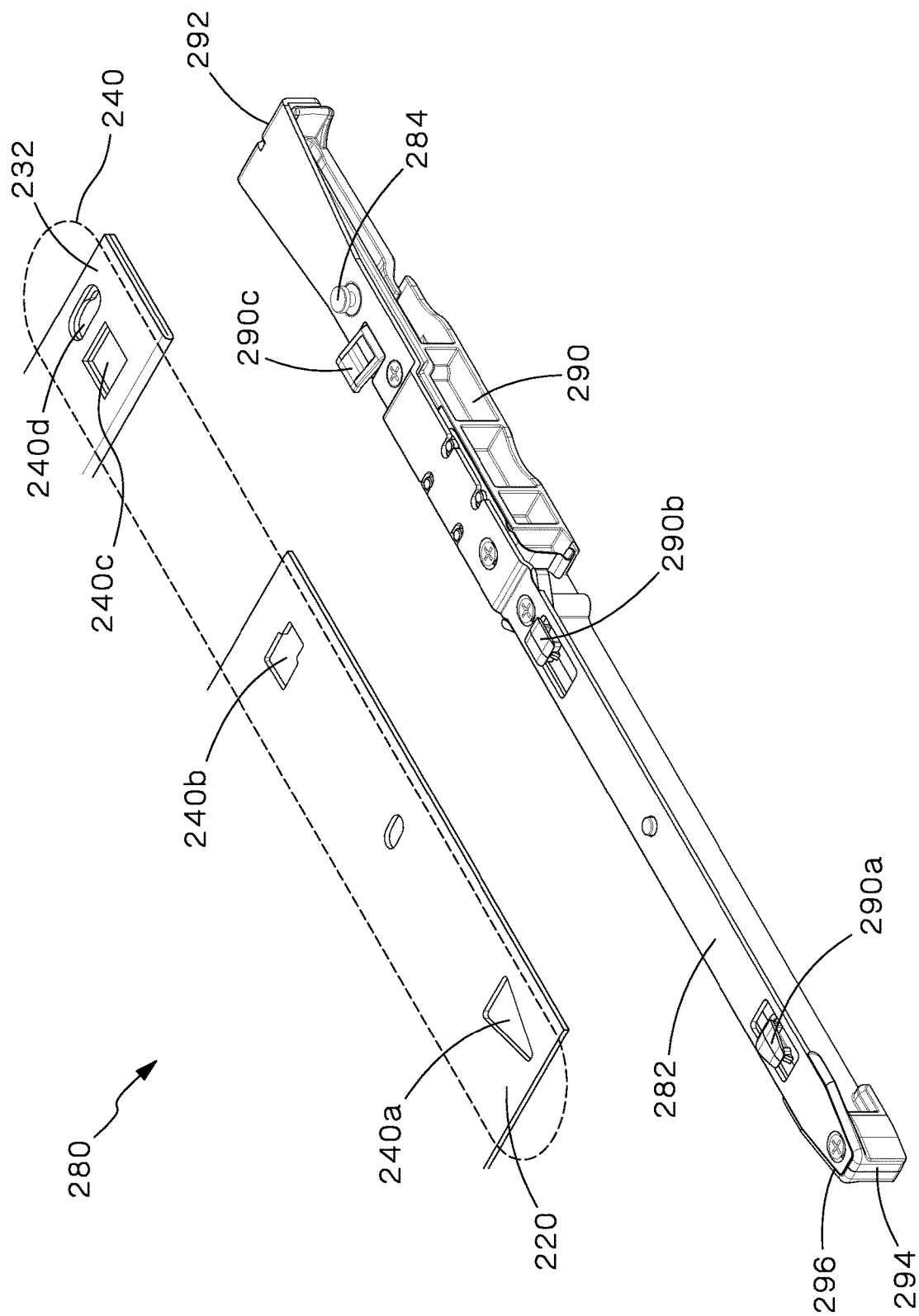
FIG. 40 is a bottom perspective view of a portion of a HDFE tray and a HDFE removable rail.
Figure 41:
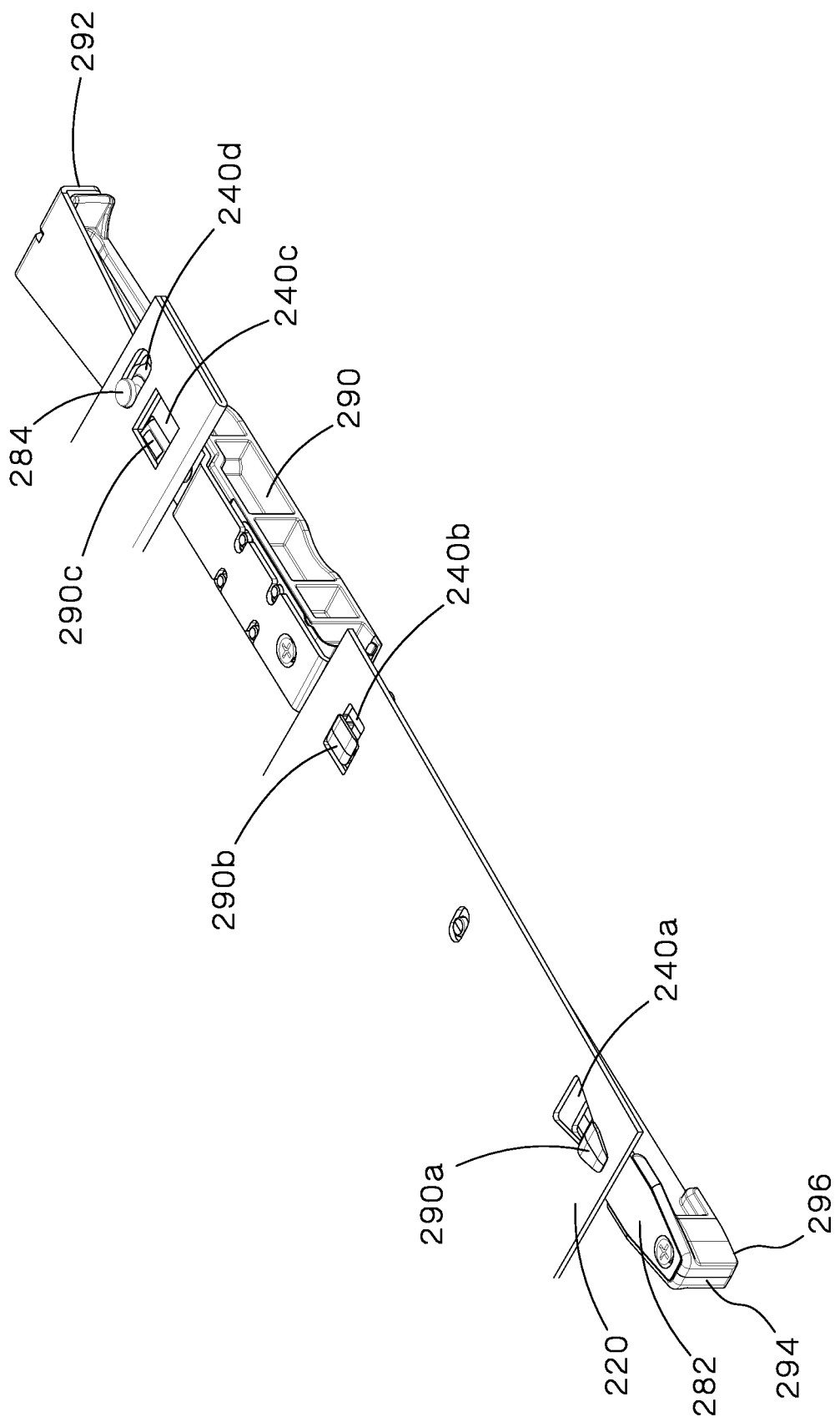
FIG. 41 is a bottom perspective view of a portion of a HDFE tray with a HDFE removable rail partially installed in the tray.
Figure 42:
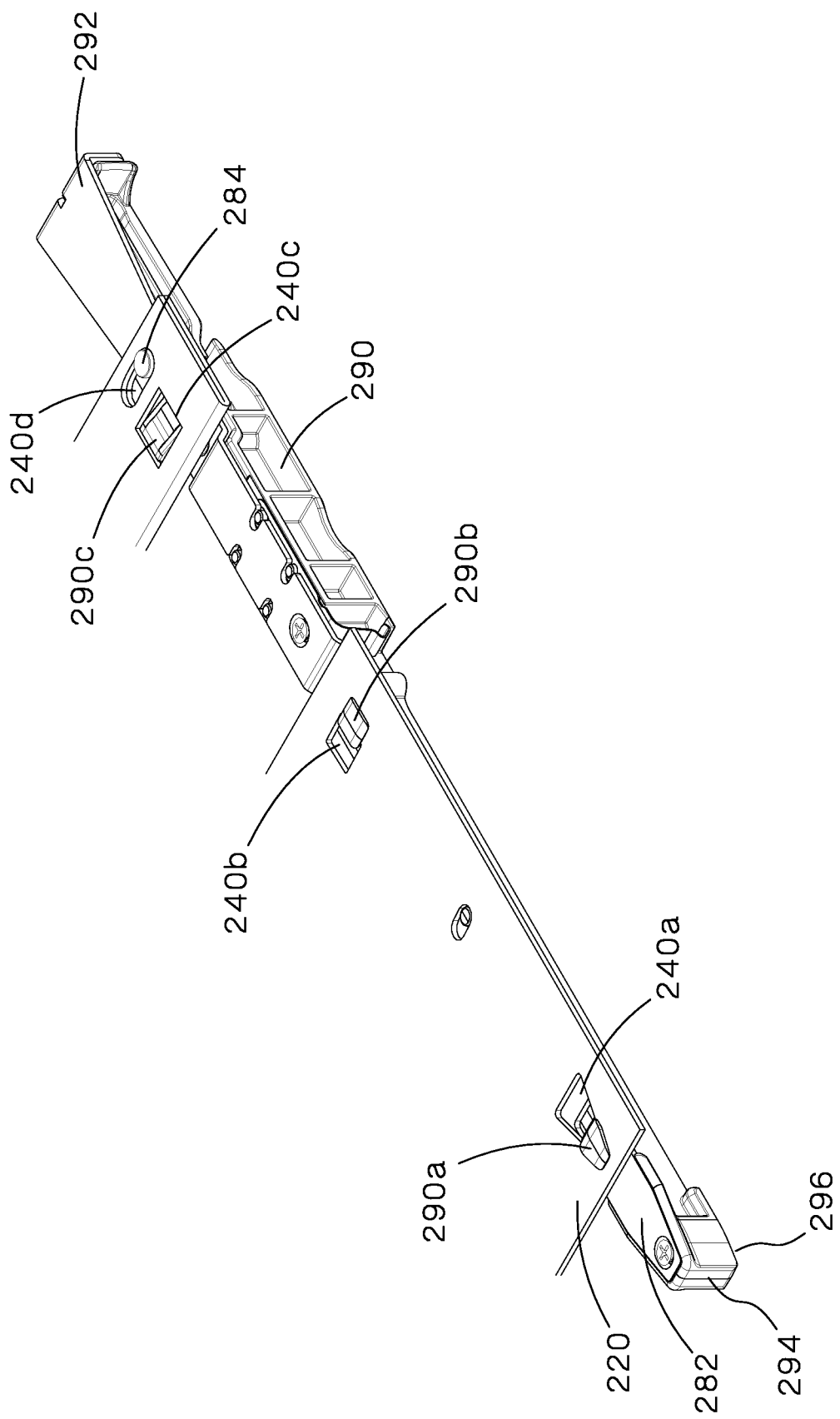
FIG. 42 is a bottom perspective view of a portion of a HDFE tray with a HDFE removable rail fully installed in the tray.
Figure 43:
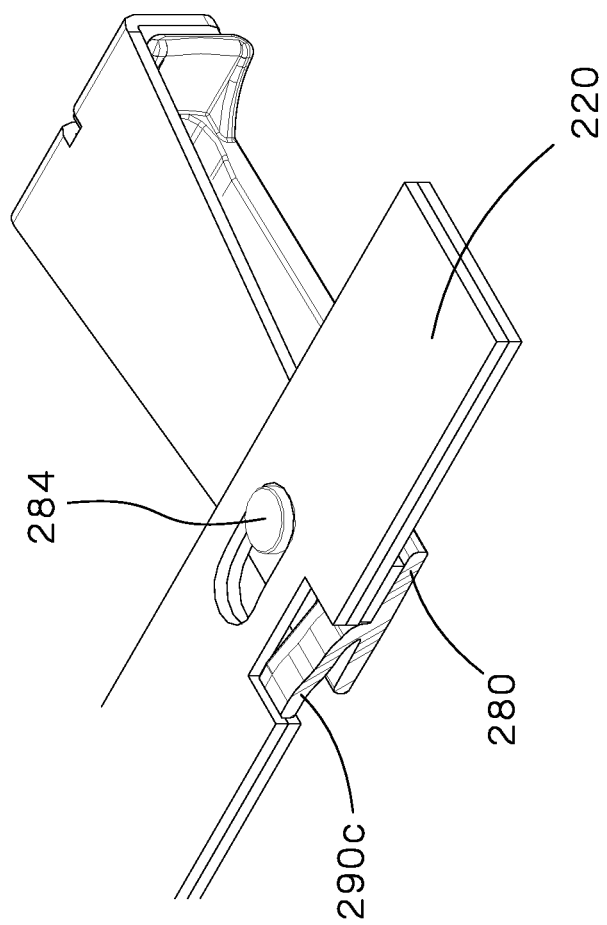
FIG. 43 is a bottom perspective view of a portion of a HDFE removable rail installed in a HDFE tray.

Referring now to FIGS. 38 and 39, the HDFE removable rail 280 includes a metal bracket 282, two metal spring clips 286, a cassette guide 290, and protrusions for engaging with the cutout features on the HDFE modular tray 220. The metal bracket 282 extends along the bottom portion 296 of the cassette guide 290 and includes a self-clinching keyhole fastener 284 for engaging with the forward-most cutout 240*d* of the HDFE modular tray 220. The two metal spring clips 286 are disposed on either side of the HDFE removable rail 280. The cassette guide 290 is disposed on top of the metal bracket 282 and includes several protrusions for engaging with the cutout features on the HDFE modular tray 220 as described below. One of ordinary skill in the art would understand, and it is contemplated by this invention, that the HDFE removable rail 280 could also be formed of just one piece and/or could be made of one material. Moreover, HDFE removable rail 280 could be color-coded for easy identification by a user.

As shown in FIGS. 40-43, the protrusions for engaging with the cutout features on the HDFE modular tray 220 include a front latch 290*c*, a middle protrusion 290*b*, and a rear protrusion 290*a*. The front latch 290*c* includes a latching portion which extends in the direction of the HDFE modular tray 220 when the HDFE removable rail 280 is installed in the HDFE tray 220 so that the HDFE removable rail 280 may not be moved side to side upon the HDFE removable tray 220. The front latch 290*c* is disposed on the front portion 292 of the cassette guide 290. The latching portion of the front latch 290*c* extends into the latch-receiving cutout 240*c* to lock the HDFE removable rail 280 to the HDFE modular tray 220. The middle protrusion 290*b* is formed to engage with the middle cutout 240*b* and disposed between the front 292 and rear 294 portions of the cassette guide 290. The middle protrusion 290*b* is preferably T- or I-shaped so that the top of the T or I of the middle protrusion 290*b* is disposed through the middle cutout 240*b* when the HDFE removable rail 280 is installed in the HDFE modular tray 220. The rear protrusion 290*a* is formed to engage with the rear-most cutout 240*a* and disposed on the rear 294 of the cassette guide 290. The rear protrusion 290*a* is formed so that the rear portion of rear protrusion 290*a* engages with the triangularly-shaped rear-most cutout 240*a* so that the HDFE removable rail 280 can pivot in a plane parallel to the HDFE modular tray 220.

Figure 44:
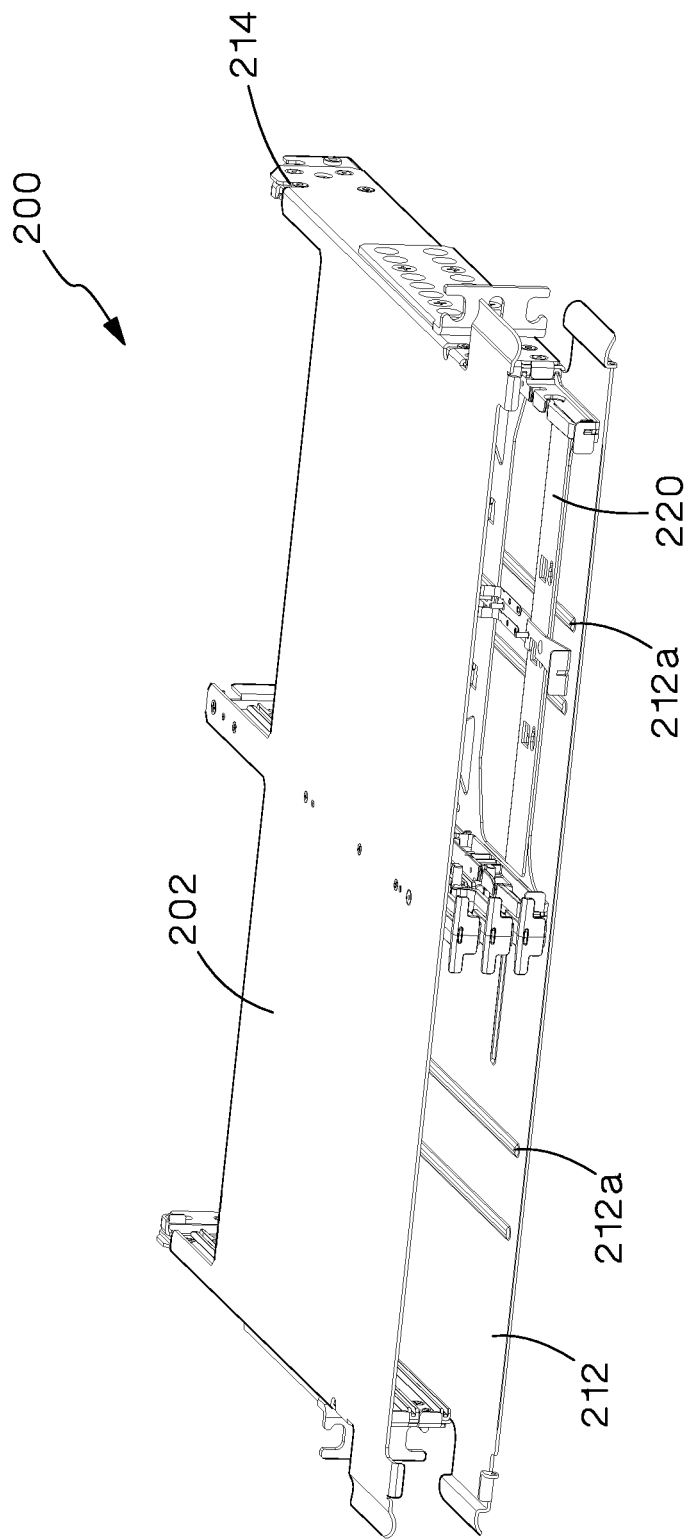
FIG. 44 is a perspective view of a HDFE enclosure.
Figure 45:
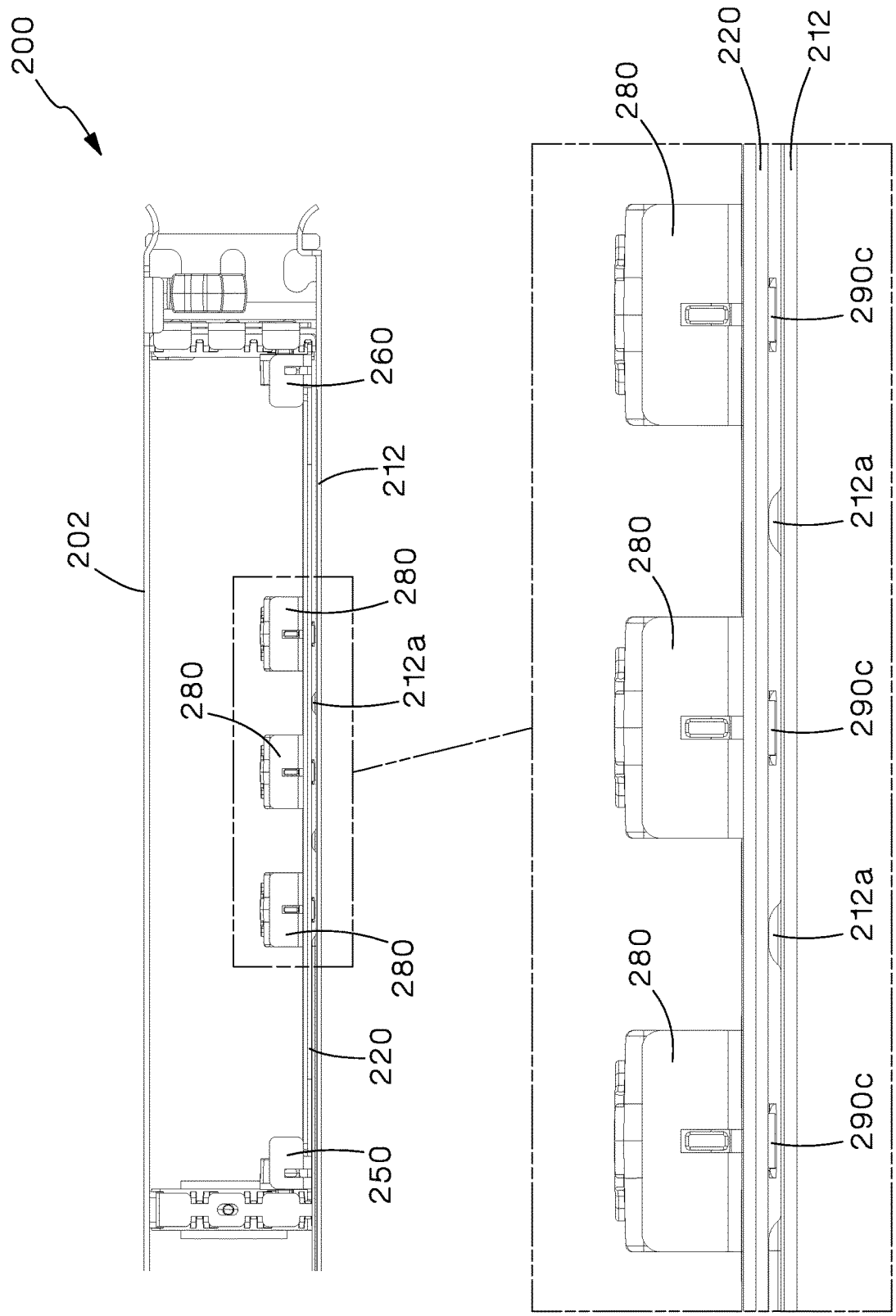
FIG. 45 is a front magnified view of the HDFE enclosure.
Figure 46:
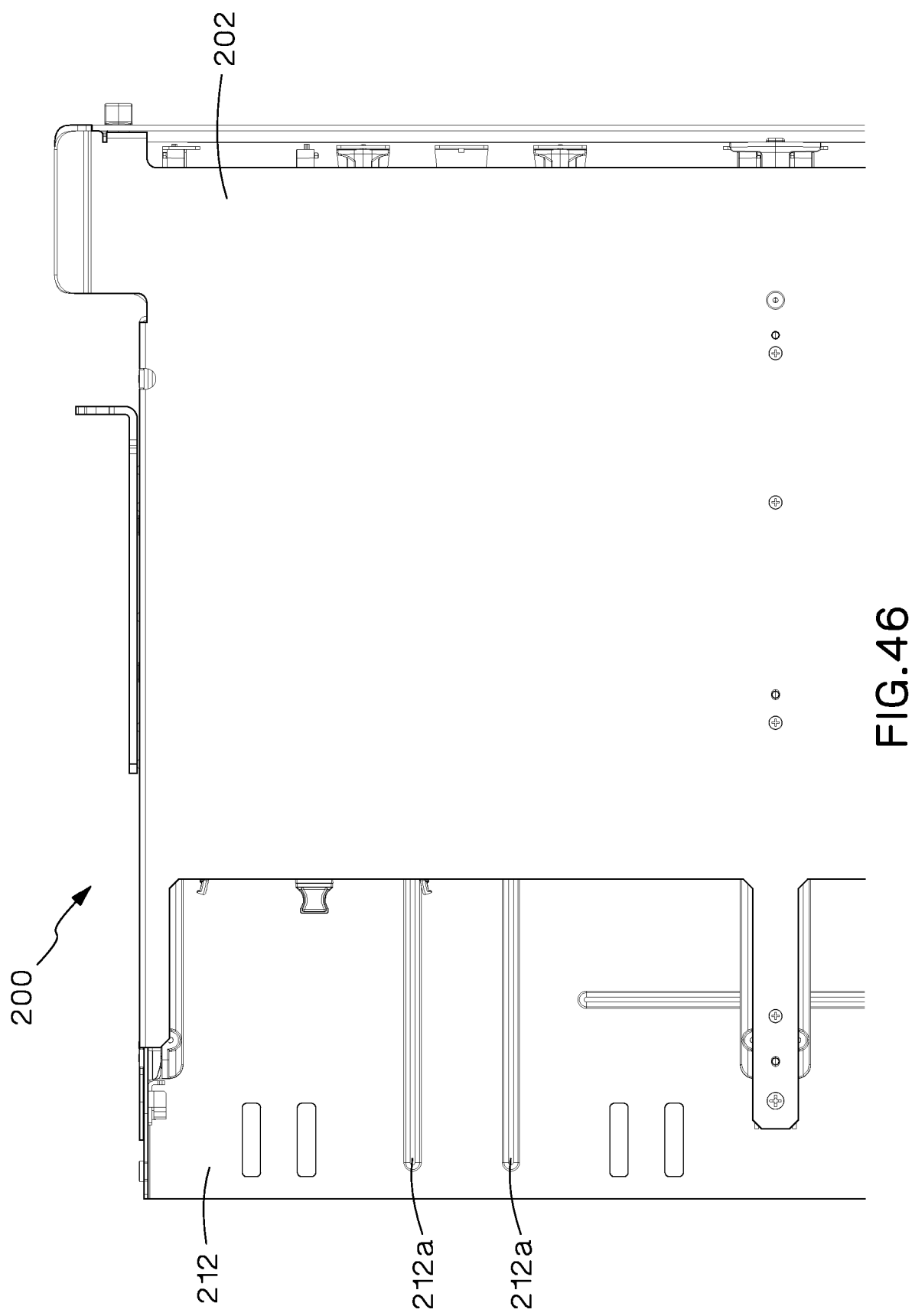
FIG. 46 is a top view of a portion of a HDFE enclosure.

As shown in FIGS. 44-46, portions of the bottom portion 212 of the HDFE enclosure 200 may be raised. One of ordinary skill in the art would understand that these raised or beaded portions are typically included in an enclosure to strengthen the enclosure. However, the beads 212*a* that run parallel to the rails 250, 260, and 280 also provide clearance between the HDFE tray 220 and the bottom portion 212 of the HDFE enclosure 200. This provides a space for the protrusions 290*a*, 290*b*, and 290*c* of the HDFE removable rail 280 to move within when a HDFE removable rail 280 is installed within an HDFE tray 220. Other shapes and types of beads 212*a* are contemplated by this disclosure.

Figure 47:
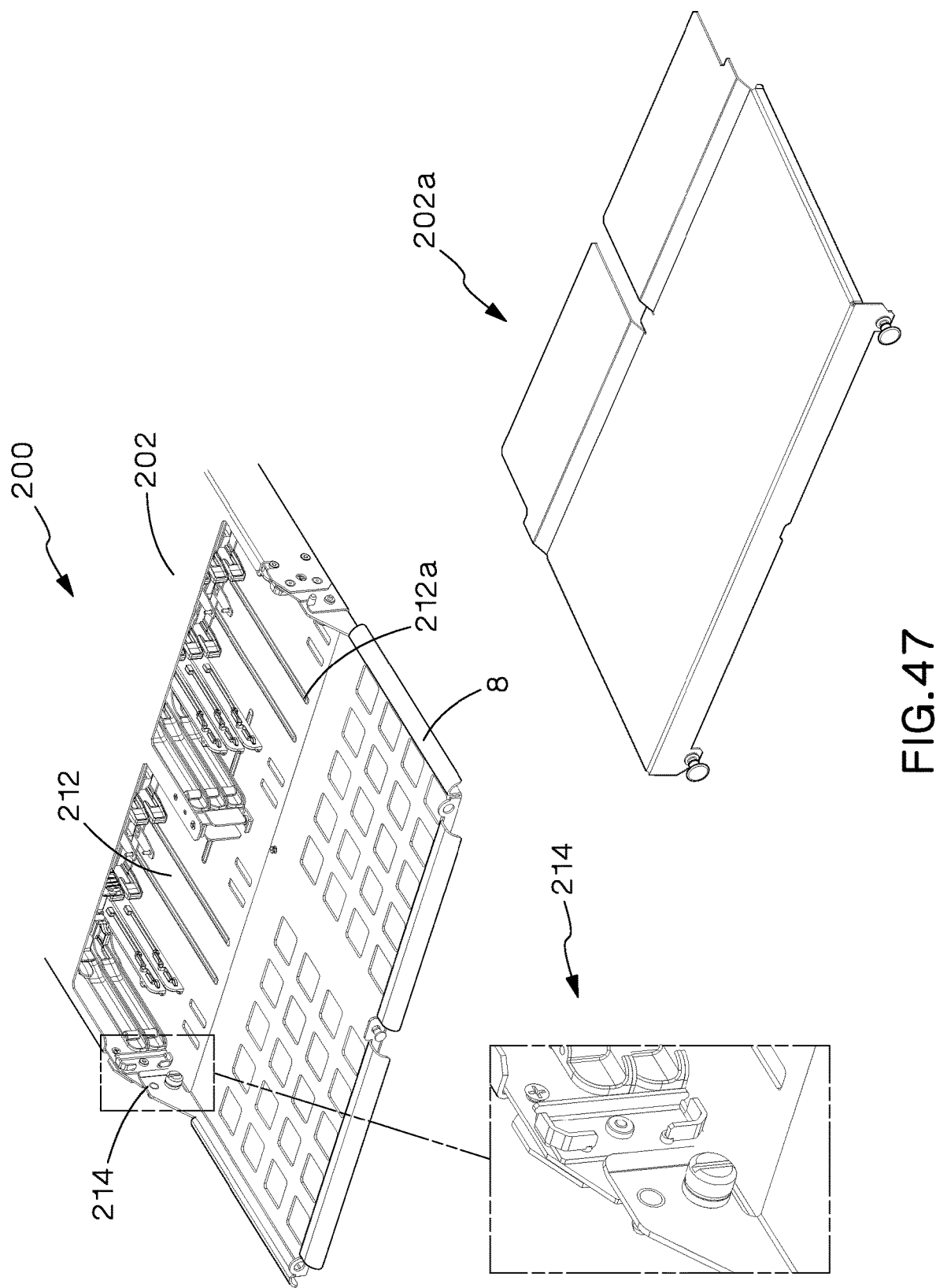
FIG. 47 is an exploded perspective view of the rear of the HDFE enclosure including a removable top cover.
Figure 48:
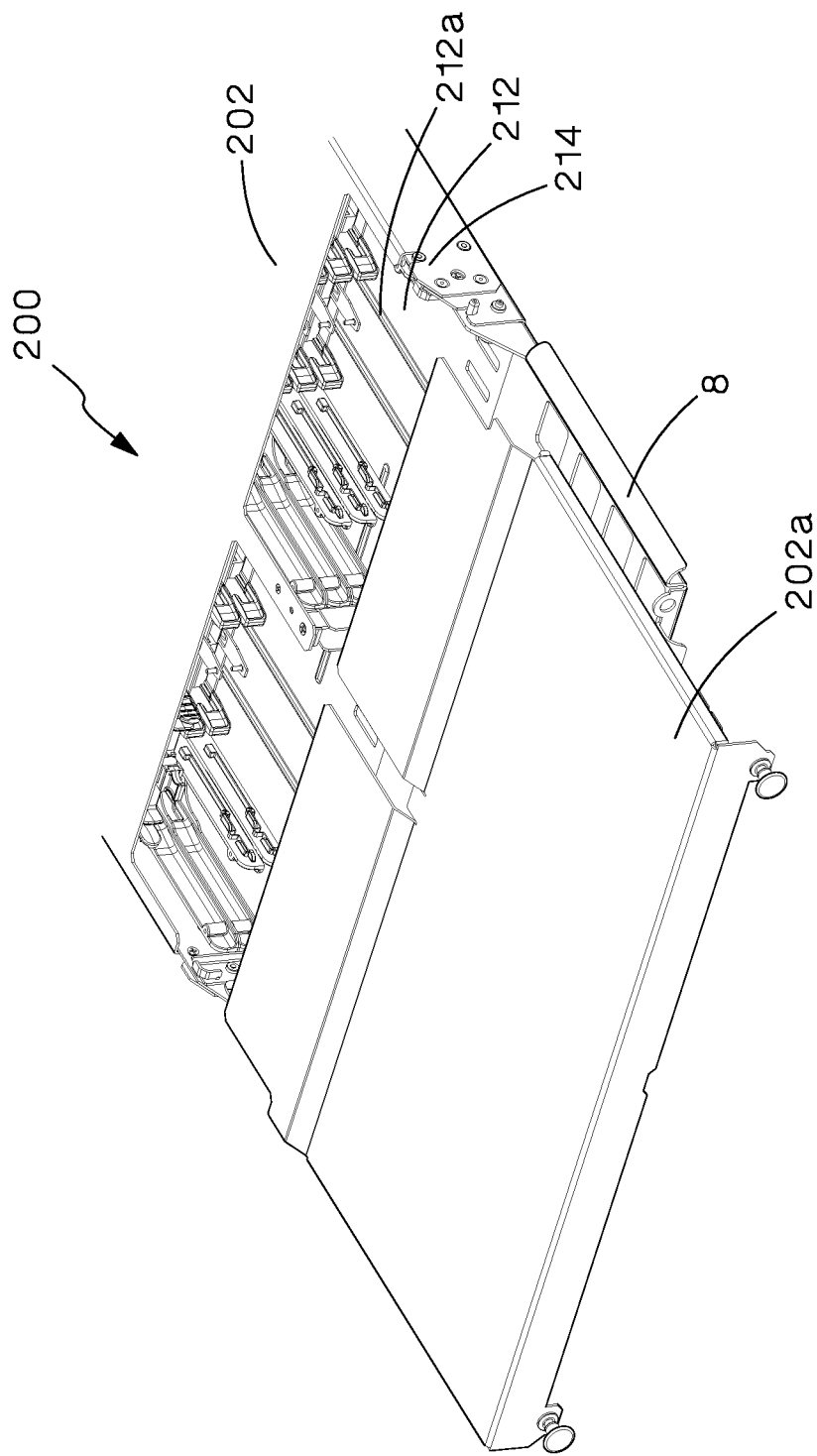
FIG. 48 is an exploded perspective view of the rear of the HDFE enclosure including a removable top cover.
Figure 49:
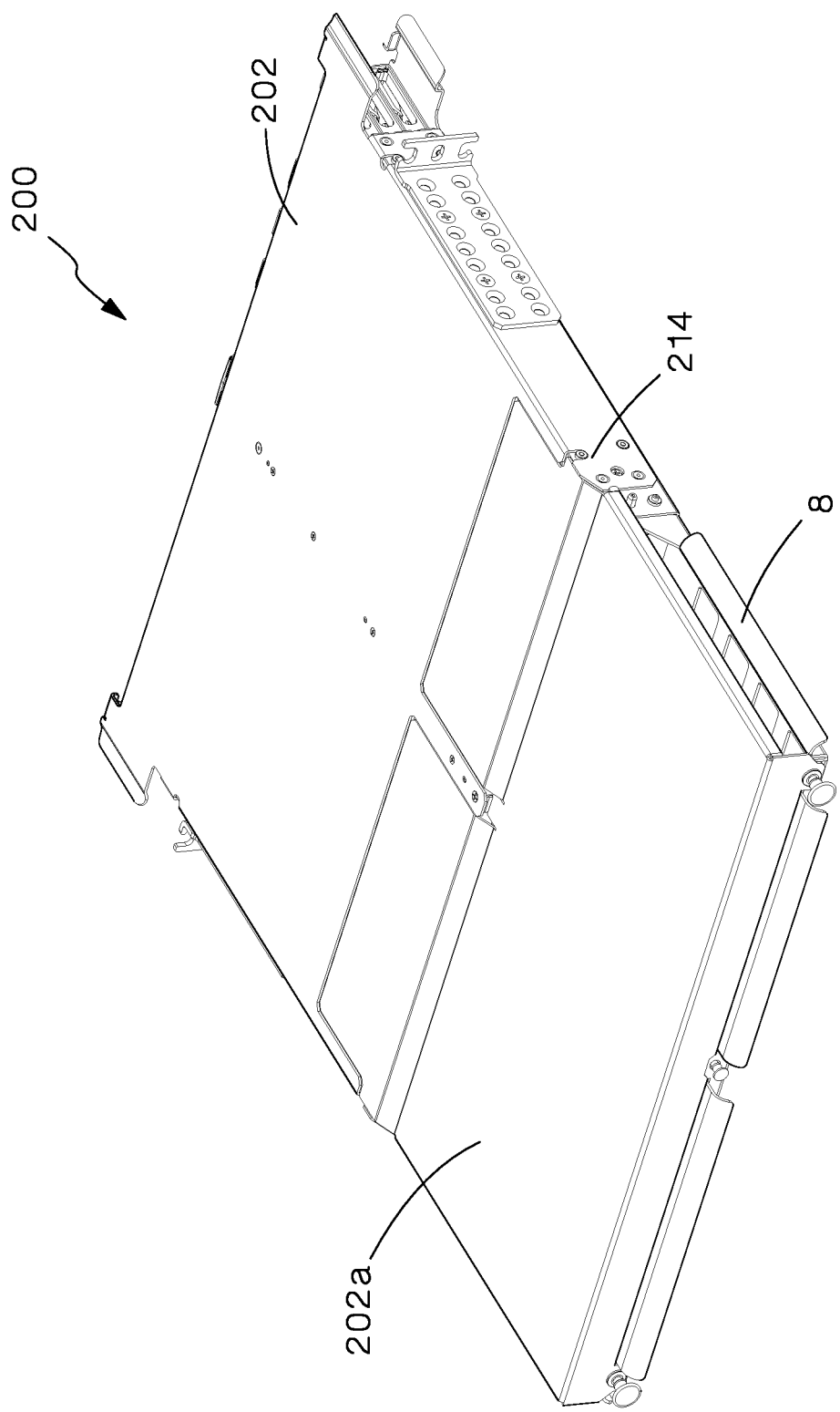
FIG. 49 is a perspective view of the rear of the HDFE enclosure with the removable top cover installed.

As shown in FIGS. 46-47, the top cover 202 of the HDFE enclosure 200 is cut away above the mounting for cable slack management 212. In one embodiment of the disclosed invention, this cut away portion may be covered by a removable top cover 202*a* as shown in FIGS. 47-49.

The sets of cutout features 240 in the HDFE modular tray 220 and protrusions on the HDFE removable rail 280 may be slightly different so that only a particular HDFE removable rail 280 may be secured within a set of cutout features 240 as previously described with respect to the patch panel embodiment. For example, the middle set of cutouts 246 may be disposed slightly closer to the front of the HDFE modular tray 220 than the left and right sets of cutouts 242, 244, and the protrusions on the HDFE removable rail 280 may be disposed closer to the front of the HDFE removable rail 280.

Figure 50:
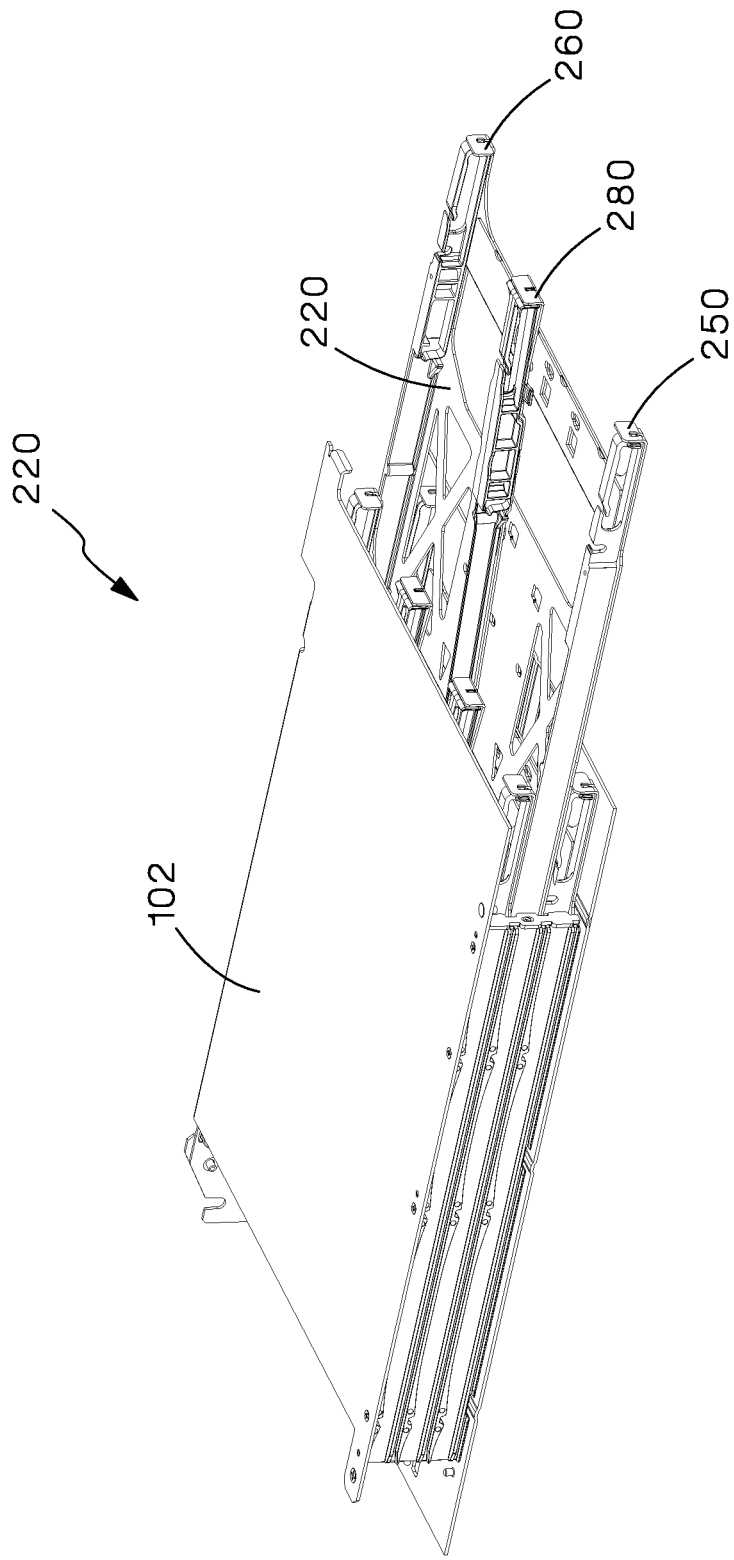
FIG. 50 is a perspective view of the HDFE enclosure with a HDFE removable rail partially installed.
Figure 51:
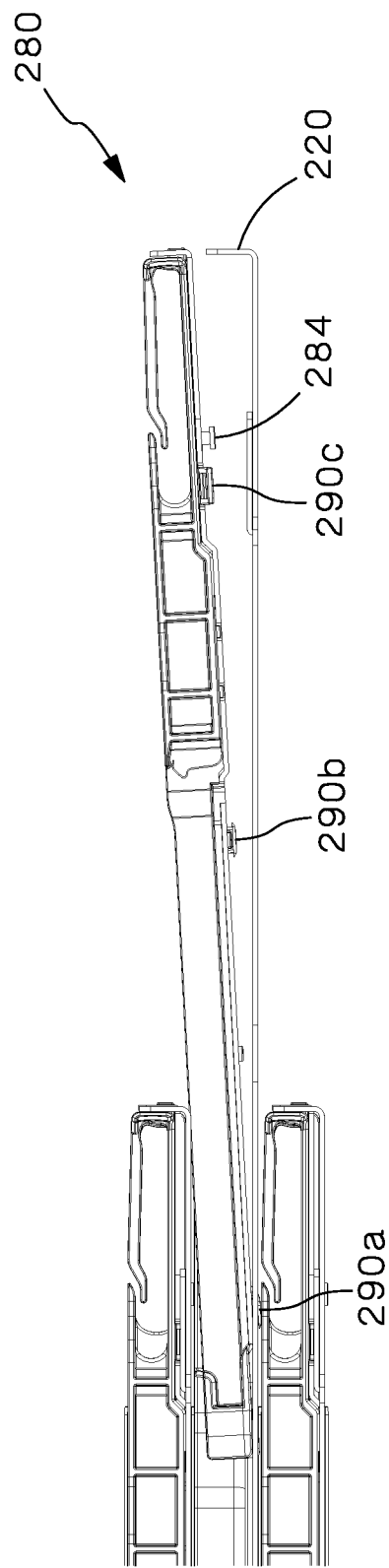
FIG. 51 is a side view of a HDFE modular tray with a HDFE removable rail partially installed.
Figure 52:
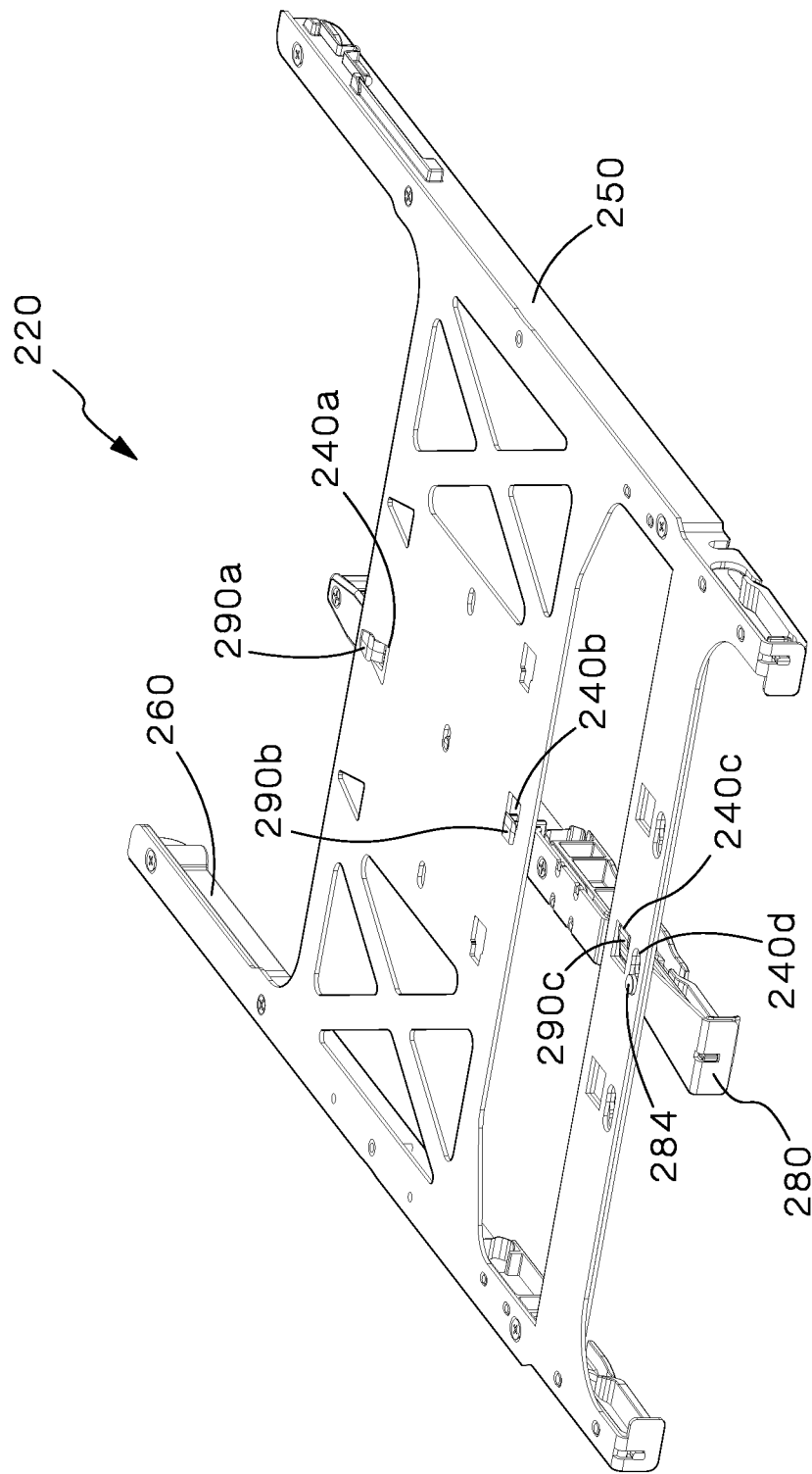
FIG. 52 is a bottom perspective view of the body of a HDFE modular tray with a HDFE removable rail installed in the tray.

Referring now to FIGS. 50-52, in order to insert the HDFE removable rail 280 into the HDFE modular tray 220, a user first positions the HDFE removable rail 280 so that all of the protrusions 290*a*, 290*b*, 290*c* and the self-clinching keyhole fastener 284 are disposed within one set of cutout features 240. The user then pushes the removable rail 280 toward the rear of the HDFE tray 220 to seat the rear-most protrusion 290*a* into rear of the rear-most cutout 240*a*. Maintaining the protrusions 290*a*, 290*b*, 290*c* and self-clinching keyhole fastener 284 in corresponding cutouts 240*a*, 240*b*, 240*c*, and 240*d*, the user then rotates the HDFE removable rail 280 so that the middle protrusion 290*b* is moved into the smaller portion of the middle cutout 240*b*. As this occurs, the front latch 290*c* seats within the latch-receiving cutout 240*c* to secure the HDFE removable rail 280 in the HDFE modular tray. The self-clinching keyhole fastener 284 seats in cutout 240*d* at this time as well. In order to remove the HDFE removable rail, the user depresses and releases the front latch 290*c*, rotates the HDFE removable rail 280 slightly so that the front latch 290*c*, middle protrusion 290*b*, and self-clinching keyhole fastener 284 are no longer seated in the latch-receiving cutout 240*c*, the smaller portion of the middle cutout 240*b*, and the smaller portion of forward most cutout feature 240*d*. The user then pulls HDFE removable rail 280 slightly forward, lifts, and removes the HDFE removable rail 280 from the HDFE modular tray 220.

Figure 53:
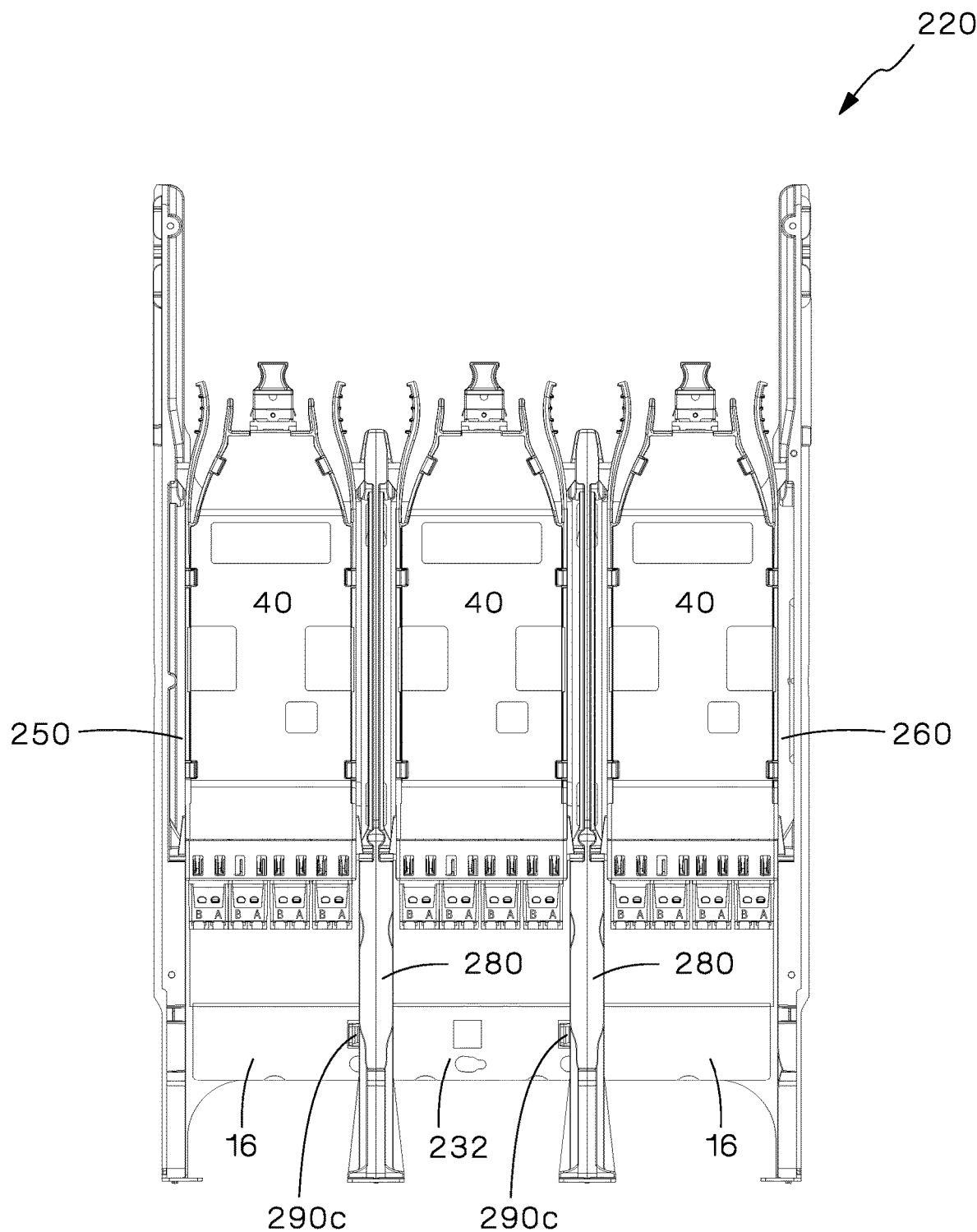
FIG. 53 is a top view of a HDFE modular tray with three modules installed in the tray.
Figure 54:
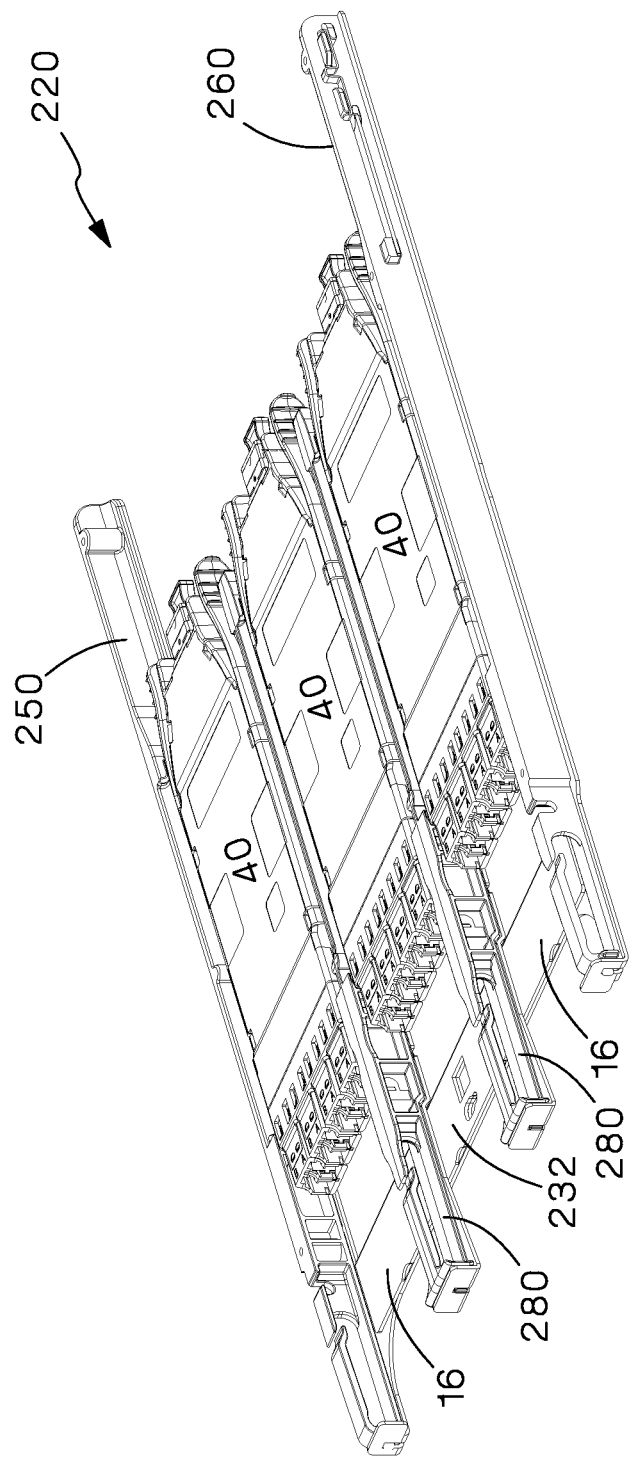
FIG. 54 is a perspective view of a HDFE modular tray with three modules installed in the tray.
Figure 55:
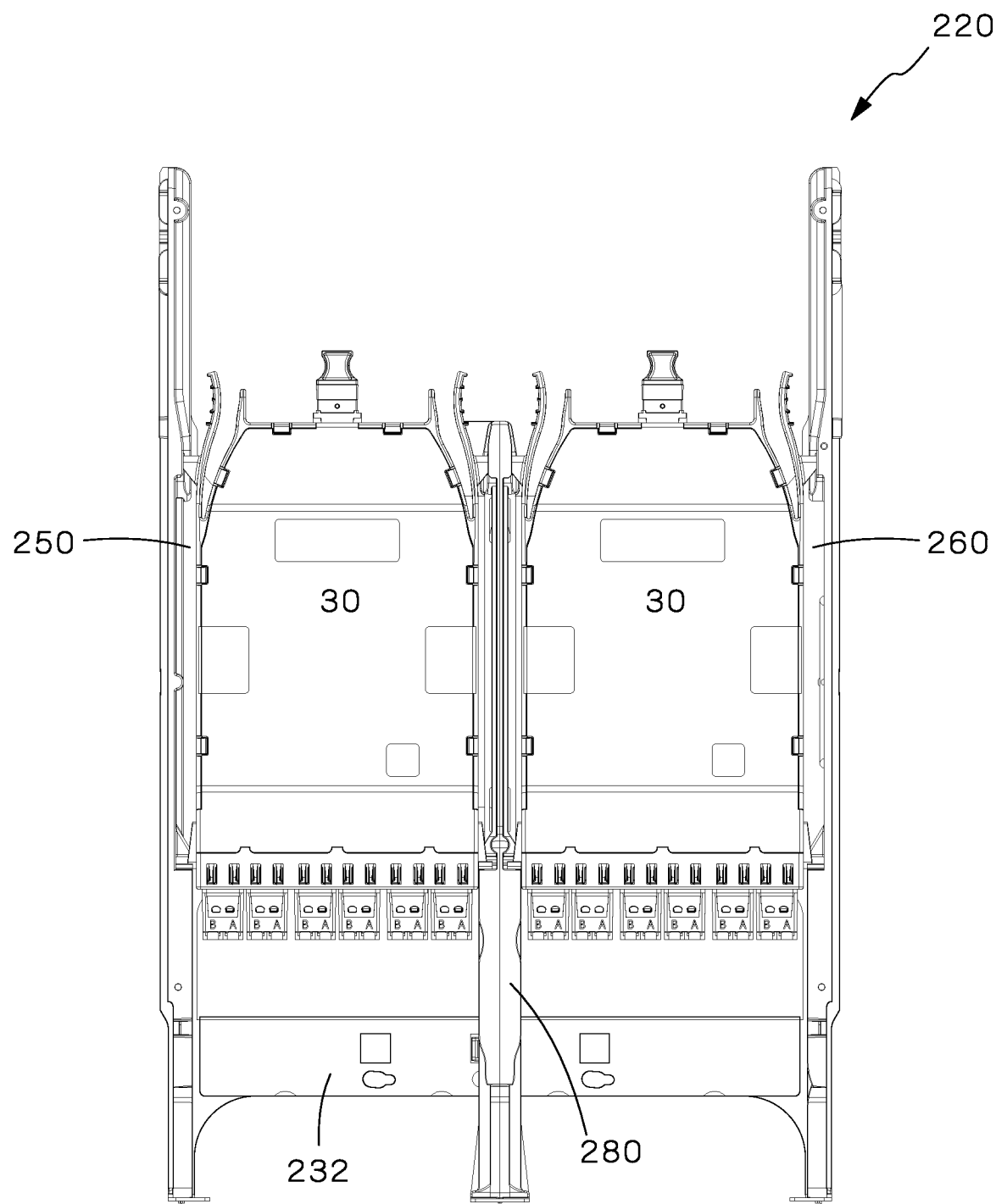
FIG. 55 is a top view of a HDFE modular tray with two modules installed in the tray.
Figure 56:
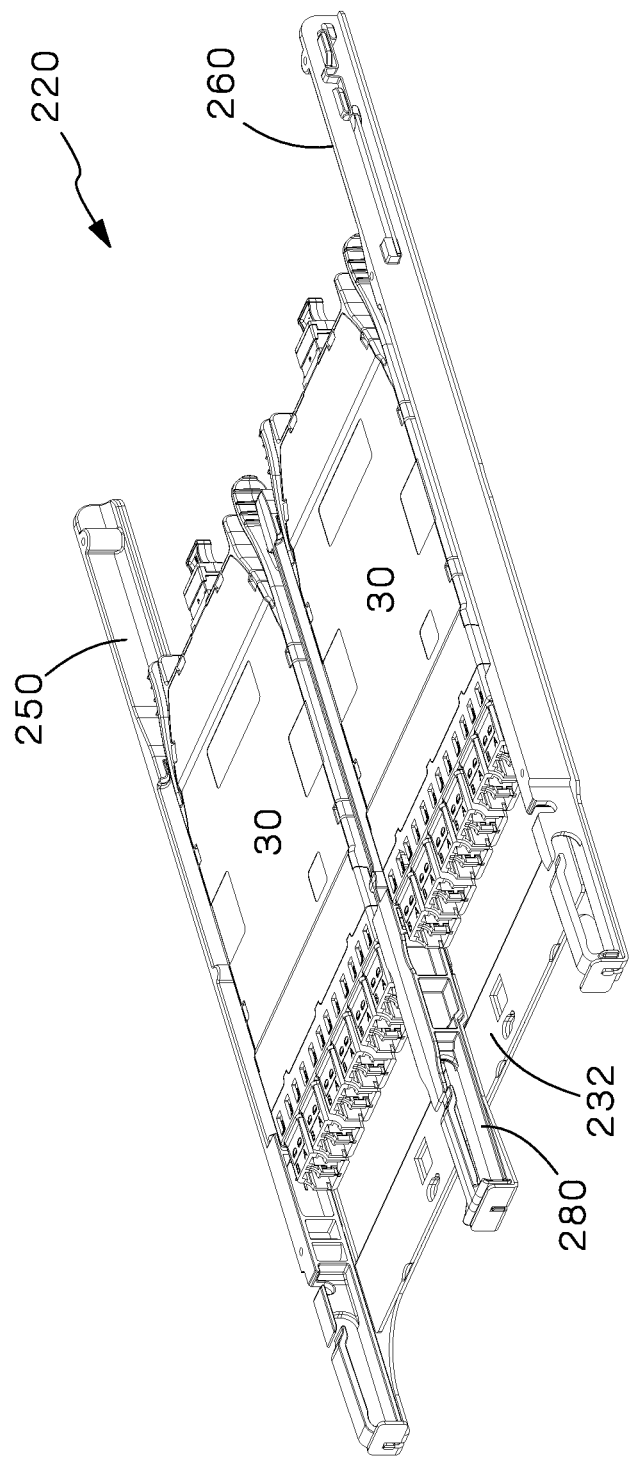
FIG. 56 is a perspective view of a HDFE modular tray with two modules installed in the tray.
Figure 57:
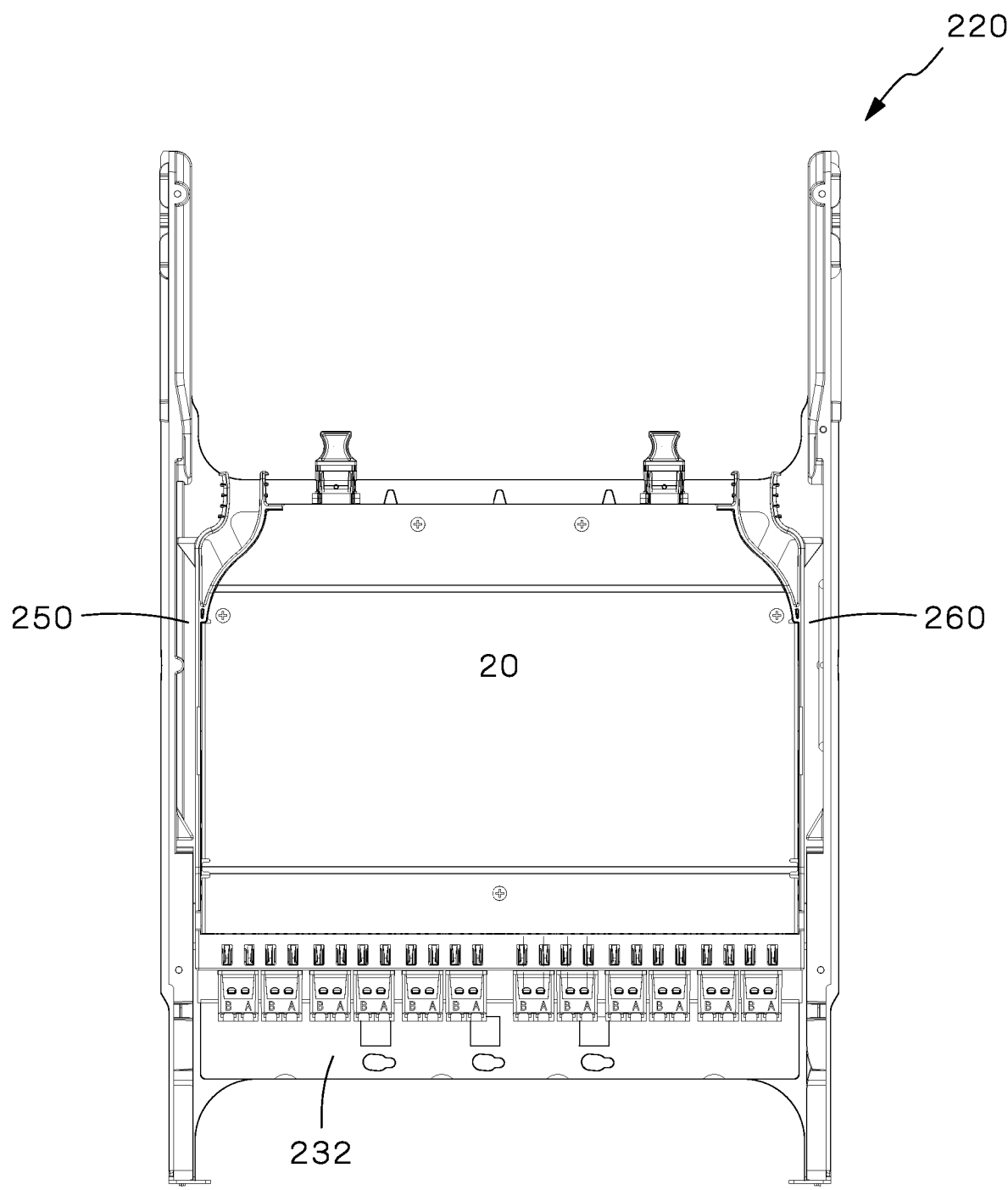
FIG. 57 is a top view of a HDFE modular tray with one module installed in the tray.
Figure 58:
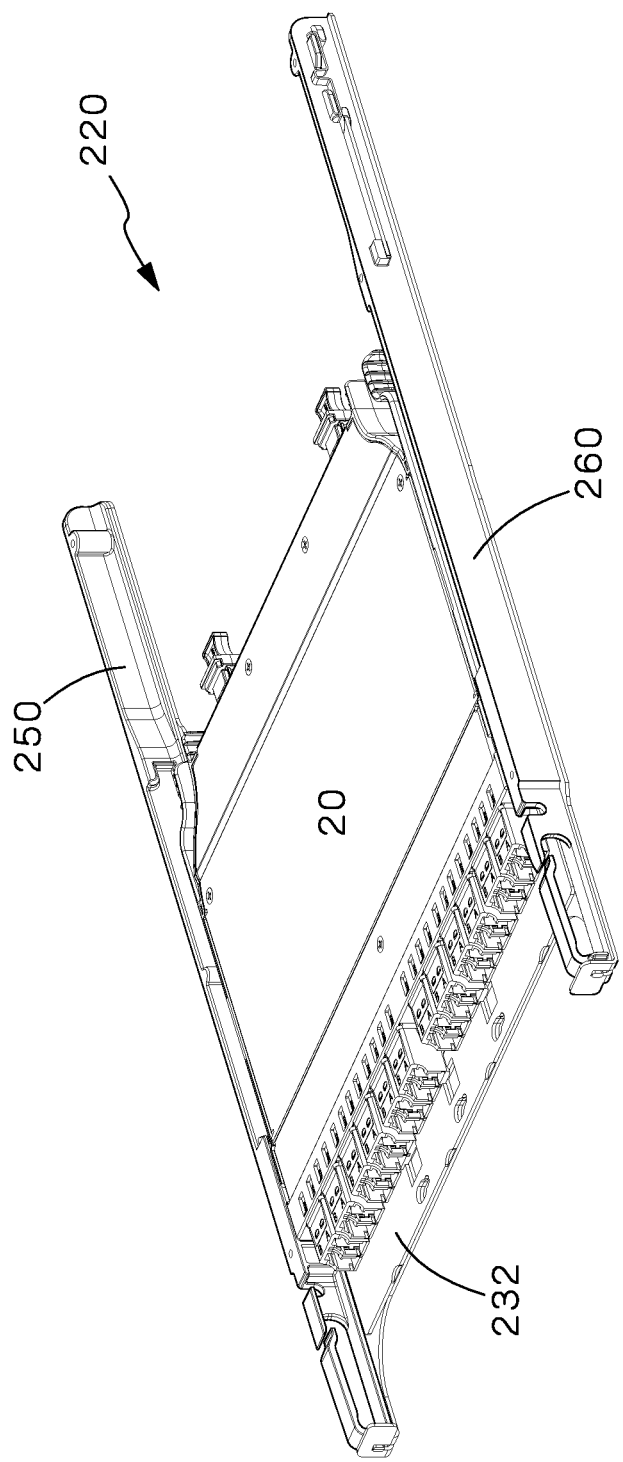
FIG. 58 is a perspective view of a HDFE modular tray with one module installed in the tray.
Figure 59:
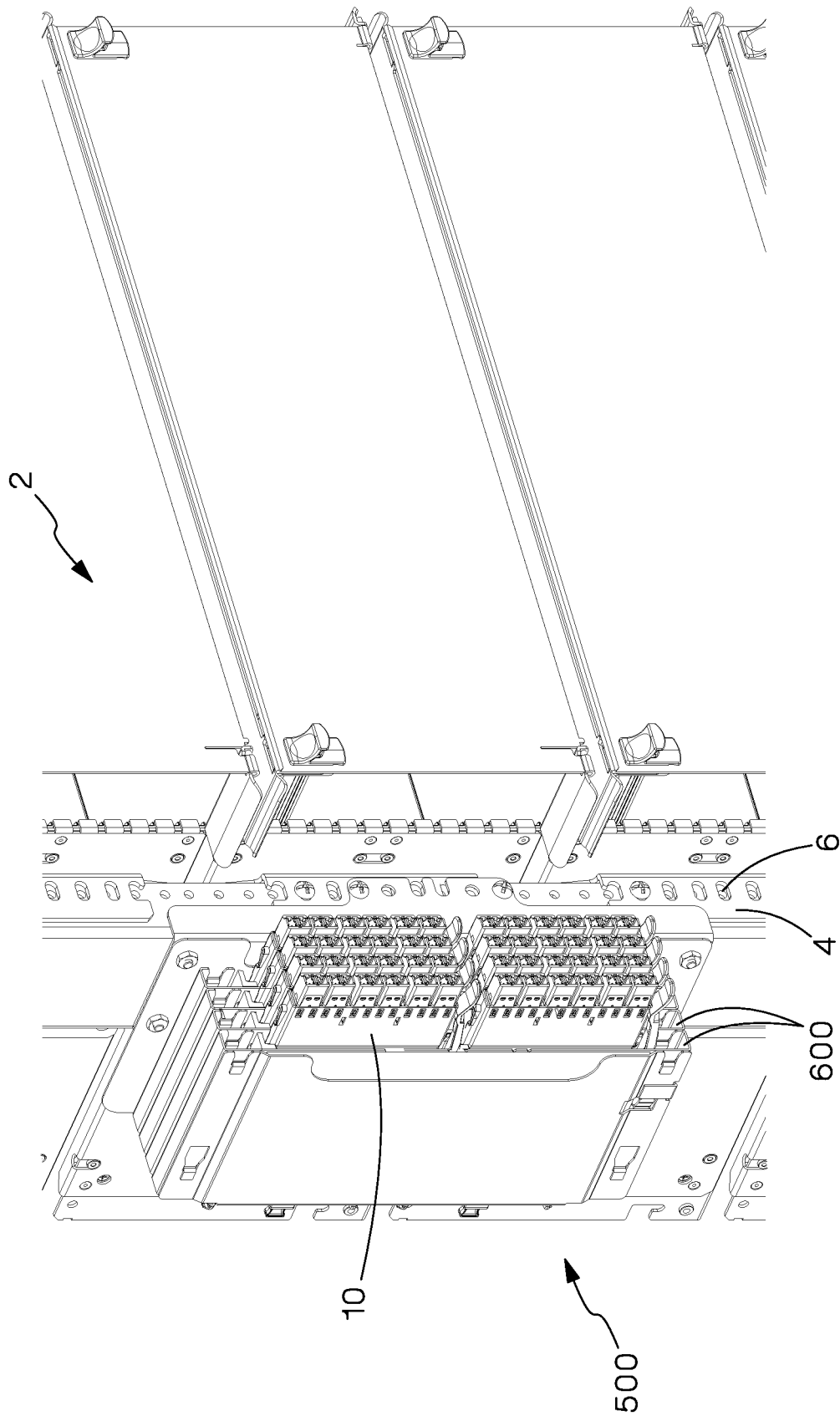
FIG. 59 is a perspective view of a modular patch panel installed on the front face of the equipment rail of a fiber optic enclosure.
Figure 60:
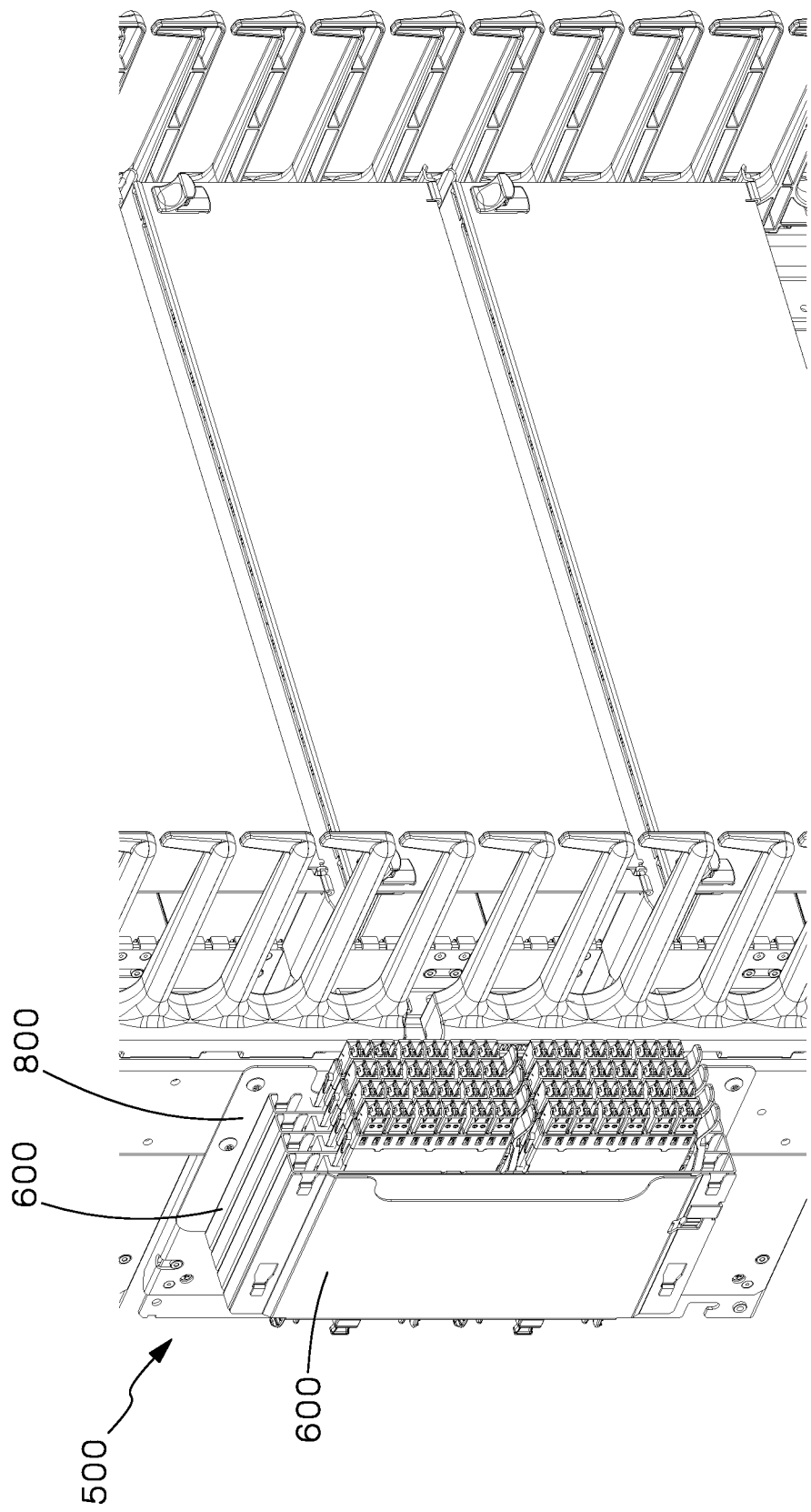
FIG. 60 is another perspective view of a modular patch panel installed on the side of the equipment rail of a fiber optic enclosure.
Figure 61:
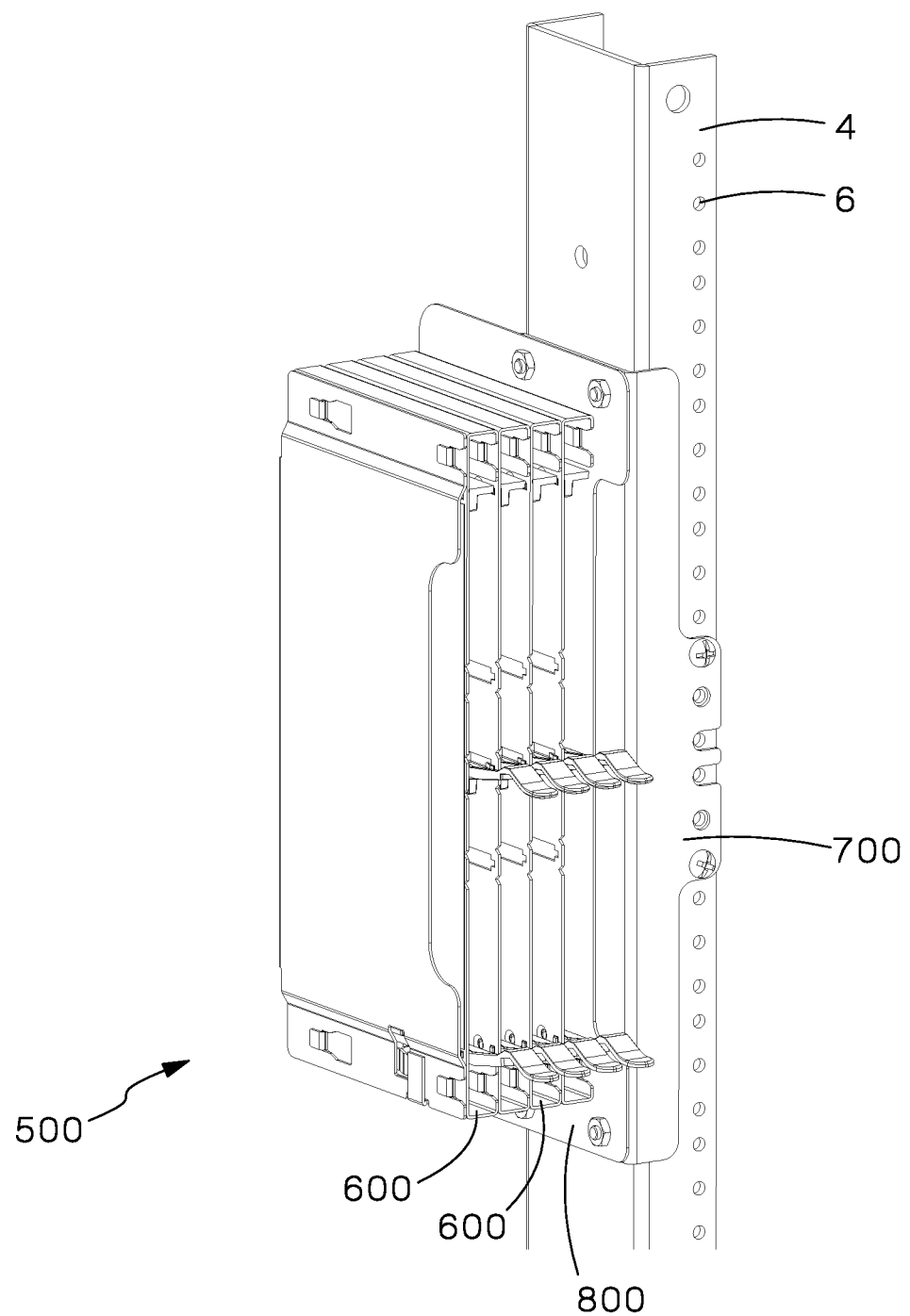
FIG. 61 is a perspective view of a modular patch panel installed on the rear face of the equipment rail of a fiber optic enclosure.

Preferably, three sets of cutout features 240 are disposed on the HDFE tray. One middle set of cutout features 246 is disposed along the midline between the left and right rails 250, 260, so that, when a removable rail 280 is installed within the middle set of cutout features 246, two 12-optical fiber modules 30 may be installed on either side of the removable rail 280 as shown in FIGS. 55-56. Two additional sets of cutout features, left set of cutout features 244 and right set of cutout features 242, are disposed on either side of the middle set of cutout features 246 so that, when removable rails 280 are installed in both the left set of cutout features 244 and right set of cut out features 242, three 8-optical fiber modules 40 may be installed into the HDFE tray 220 as shown in FIGS. 53-54. Finally, when no removable rails 280 are installed in the HDFE tray 220, one 24-optical fiber module 20 may be installed between the left rail 250 and right rail 260 as shown in FIG. 57-58.

One of ordinary skill in the art would understand that the cutout features 140 and removable rails 180 described with respect to the patch panel 50 could be used within the High Density Fiber Enclosure 200, and that the HDFE cutout features 240 and HDFE removable rail 280 could be used with the patch panel 50. Moreover, one of ordinary skill in the art would understand that differently shaped cutouts and removable rail mount shapes could be used in either the patch panel 50 or High Density Fiber Enclosure 200. These additional modular tray and removable rail designs are contemplated and included within this description.

Finally, a modular patch panel that may include removable rails described above is also disclosed. Referring now to FIGS. 59-63, the modular patch panel 500 includes at least one unit 600 that can be attached to a fiber optic enclosure equipment rail 4 or another unit 600, a post mounting bracket 700, and a mounting plate 800. A unit 600 includes four hooks 610, four openings 612, a cantilever latch 614, a mating hole 616, and a cutout 618. The four hooks 610 are disposed on the top portion 602 of the unit 600. Two of the hooks 610 are disposed on the left edge 606 of the unit 600 so that the hooks face the same direction. Two of the hooks 610 are disposed on the right edge 608 of the unit 600 so that the hooks 610 face the same direction as the hooks 610 disposed on the left edge 606 of the unit 600. The four holes 612 are disposed through the bottom portion 604 of the unit 600. The holes 612 are configured to slidably receive the four hooks 610 of a different unit 600 to secure the units 600 together. One of ordinary skill in the art would understand, and it is contemplated in this invention, that hooks 610 of different shapes, or even posts or other protrusions, could be used to engage with holes 612.

The cantilever latch 614 is disposed between two of the hooks 610 on the right edge 608 of the unit 600 and includes a cantilevered portion 620. The cantilevered portion 620 faces the opposite direction of the hooks 610 and is configured to lock the units 600 to one another when the hooks 610 are fully installed in the holes 612 by engaging with the mating hole 616 of another unit 600. The mating hole 616 is disposed on the bottom portion 604 of each unit 600, and the cantilever latch 614 is disposed on the top portion 602 of each unit 600. A cutout 618 in each unit 600 allows a user to reach between the units 600 to depress and release the cantilever latch 614. The units 600 may be stacked and secured to one another as discussed below to add additional mounting for fiber optic trays and modules outside a fiber optic enclosure 2.

The bottom-most unit 600 can be attached to a fiber optic equipment enclosure rail 4 by using a post mounting bracket 700 and a mounting plate 800. The post mounting bracket 700 is designed to be secured to the fiber optic equipment enclosure rail 4 using the mounting holes already existing in the enclosure rail 4. The mounting plate 800 is secured to the post mounting bracket 700 and includes four hooks 810 and a cantilever latch 814. The hooks 810 and cantilever latch 814 are all configured to be the same as the hooks 610 and cantilever latch 614. A unit 600 may also include a label card 902 and label card holder 900 for identifying the particular unit 600.

Figure 62:
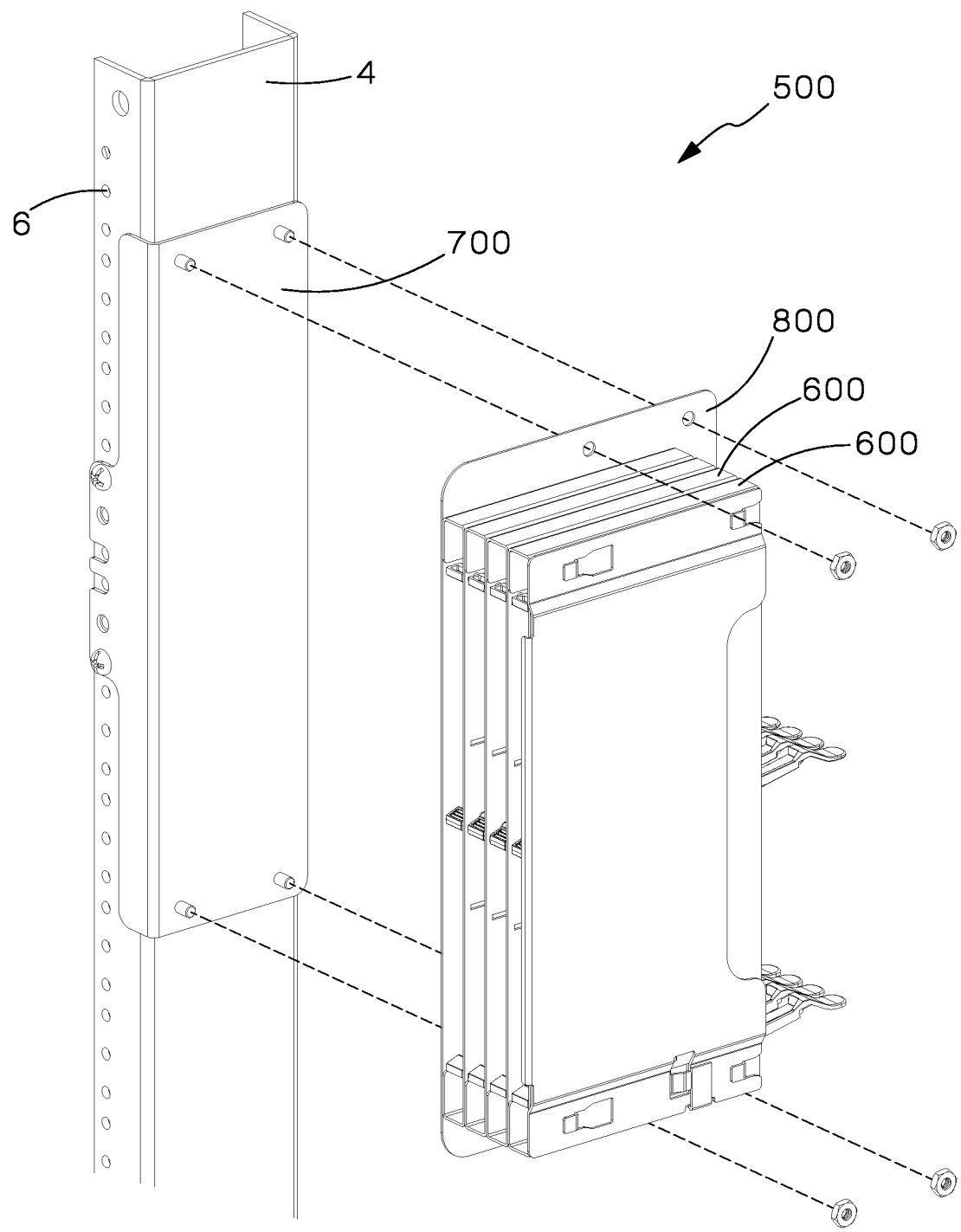
FIG. 62 is an exploded perspective view of the modular patch panel of FIG. 61.
Figure 63:
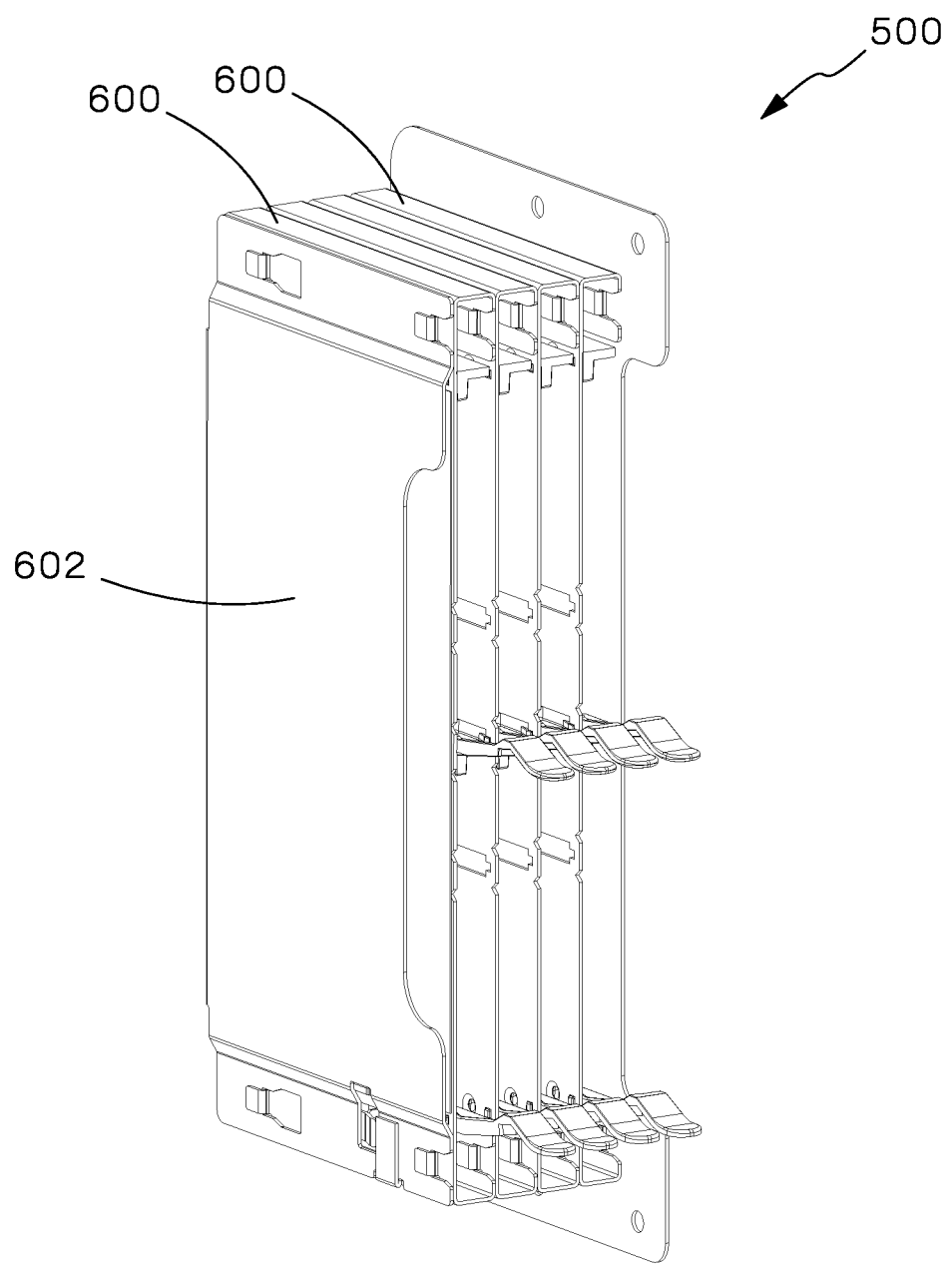
FIG. 63 is a perspective view of the modular patch panel.
Figure 64:
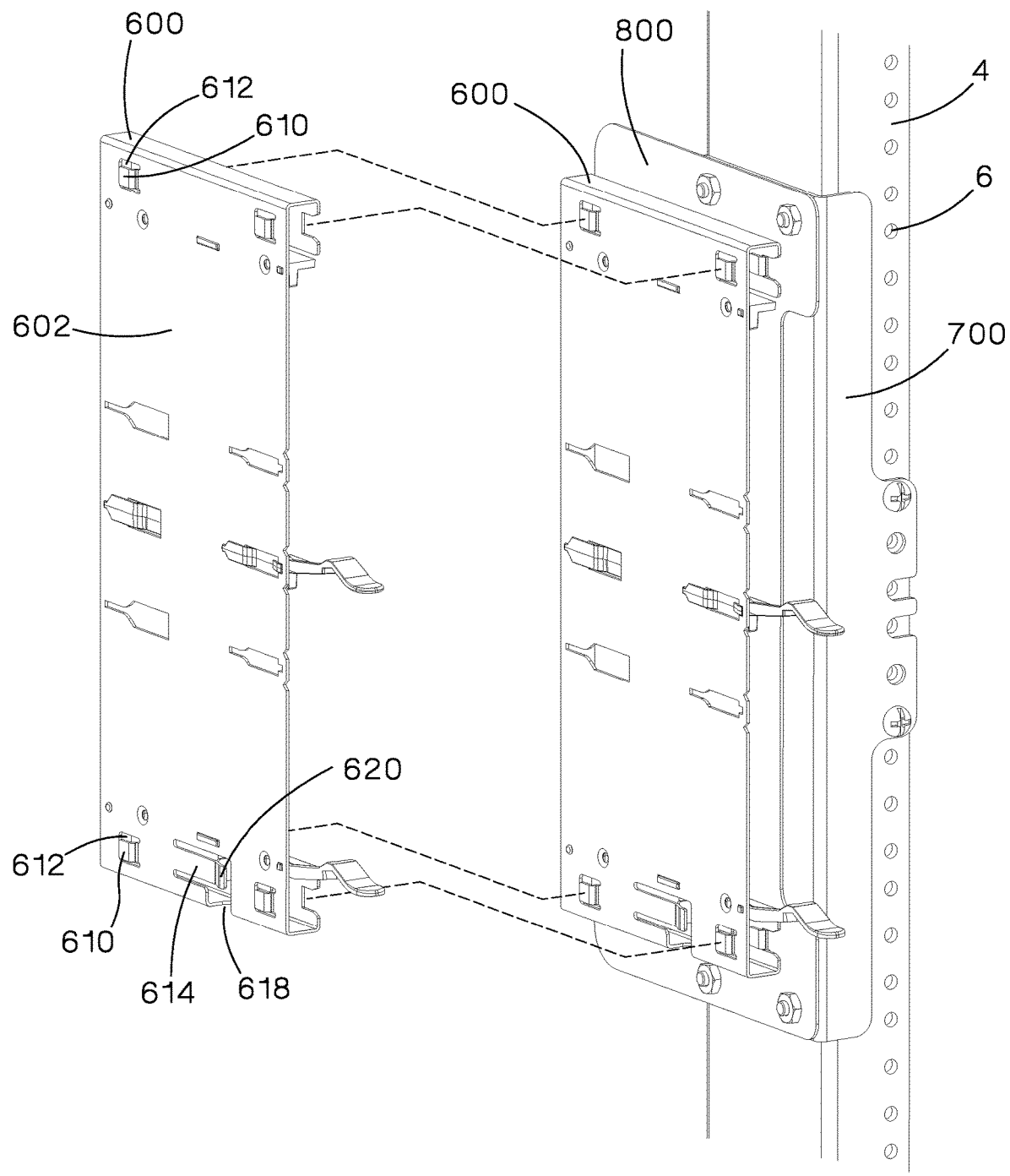
FIG. 64 is an exploded perspective view of the modular patch panel of FIG. 63.
Figure 65:
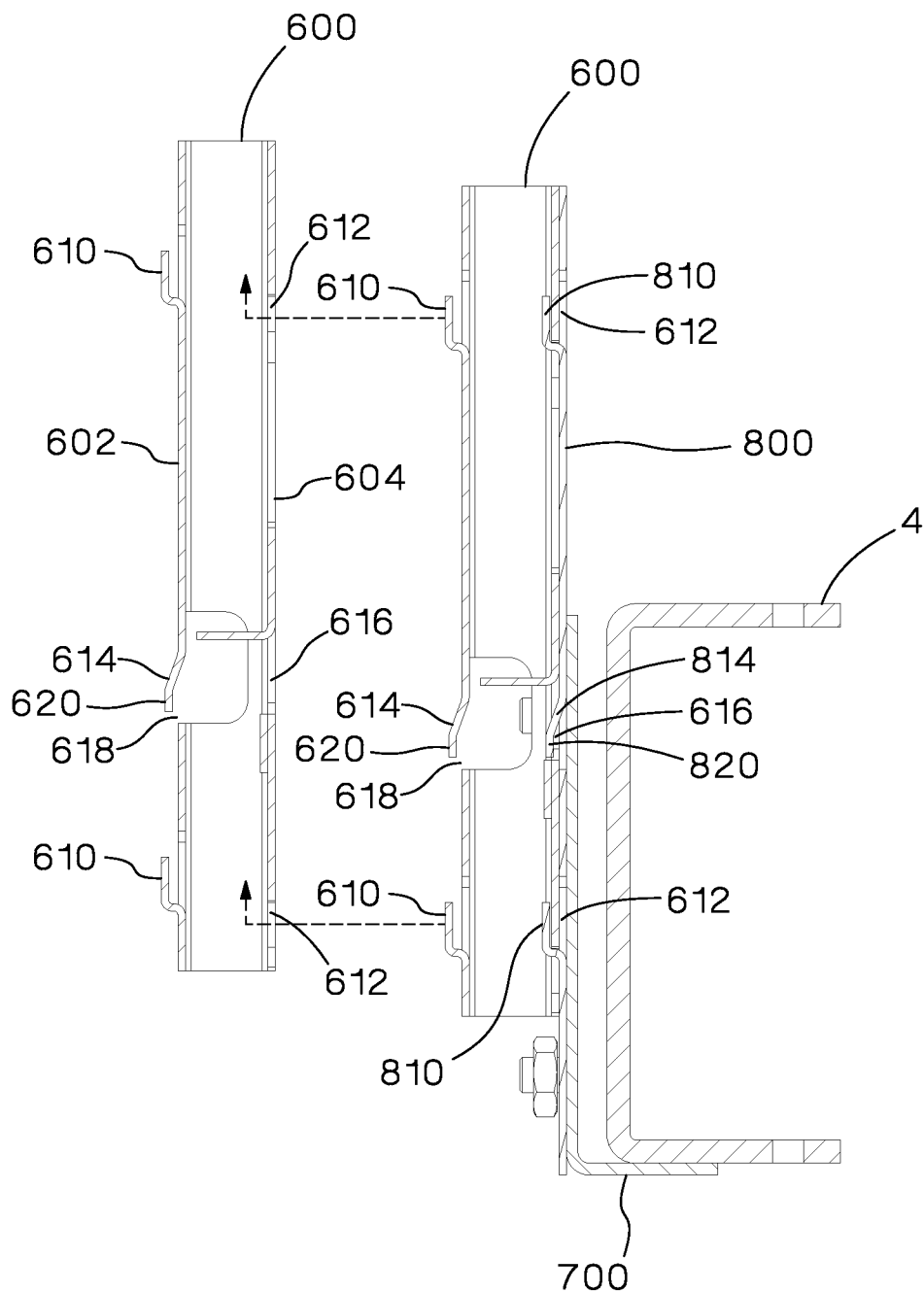
FIG. 65 is a cross sectional view of the modular patch panel prior to installation of an additional unit.
Figure 66:
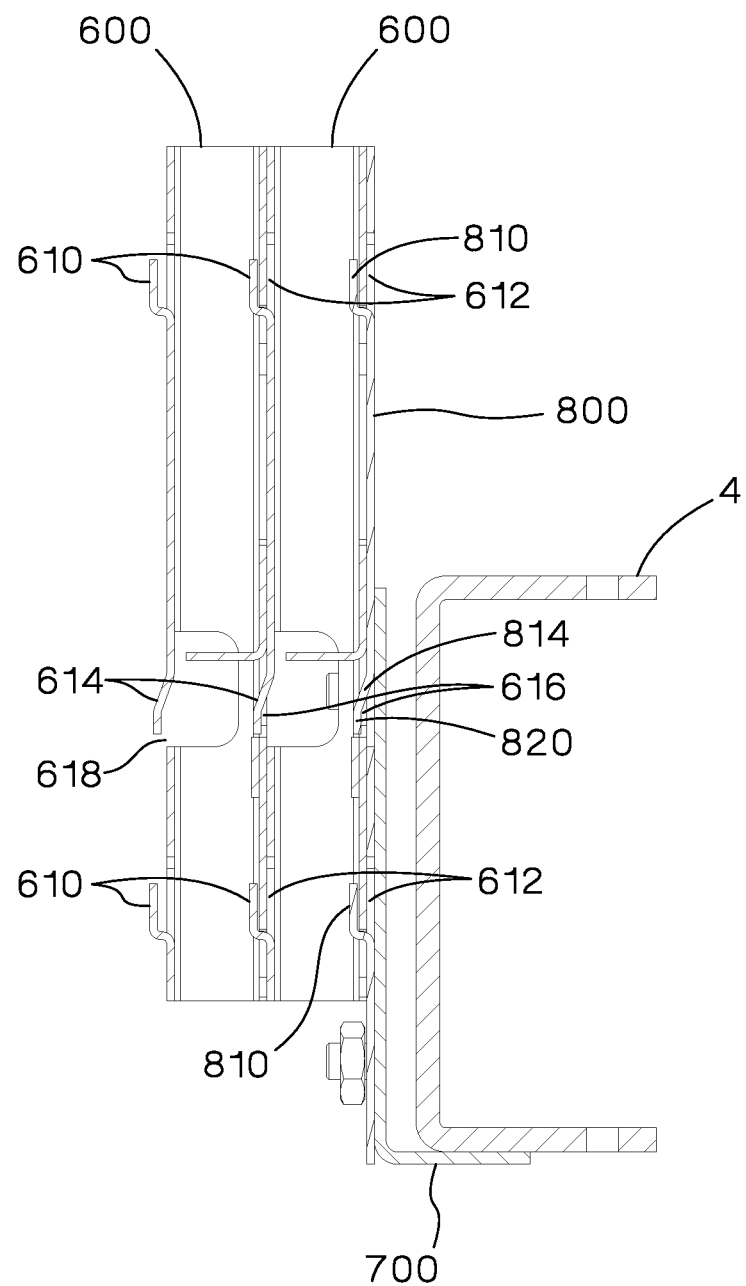
FIG. 66 is a cross sectional view of the modular patch panel with all units shown in FIG. 65 installed.

Referring now to FIGS. 64-66, to install a set of units 600 on the front or rear face of an equipment rail 4 of a fiber optic enclosure 2, the user first installs the post mounting bracket 700 using the pre-existing mounting holes on the fiber optic equipment enclosure rail 2, corresponding holes on the post mounting bracket 700, and bolts or screws to secure the post mounting bracket 700 to the rail 4 as shown in FIG. 62. A user then installs the mounting plate 800 onto the post mounting bracket 700 using bolts or screws. Once the post mounting bracket 700 and mounting plate 800 are secure, the user can attach a first unit 600 to the mounting plate 800 by positioning the mounting holes 612 of the unit 600 over the hooks 810 of the mounting plate 800. The user then slides the unit 600 with respect to the mounting plate 800 so that the edge of each the mounting holes 612 is positioned within the crook of each of the hooks 810. When the edge of the mounting holes 612 touches the back of the hooks 810, the cantilever latch 814 of the mounting plate 800 is positioned within the mating hole 616 of the unit 600 and the cantilevered portion 820 abuts the edge of the mating hole 616 to secure the unit 600 to the mounting plate 800. The first unit 600 may be pre-installed by a manufacturer on the post mounting bracket 700 and mounting plate 800, such that a user may simultaneously install the first unit 600, mounting bracket 700, and mounting plate 800. A second unit 600 may be installed on the first unit 600 by positioning the hooks 610 of the first unit within the mounting holes 612 of the second unit 600 and sliding the second unit 600 relative to the first unit 600 until the hooks 610 and cantilever latch 614 are positioned in their corresponding holes as discussed above.

To remove a unit 600 from a stack of units 600 installed together, the user uses his hand or a tool to depress the cantilever latch 614 and release the top-most unit 600. The user then slides the unit 600 until the hooks 610 no longer engage the mounting holes 612. The unit 600 may then be removed from the stack of units 600.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

What is claimed is:

1. A fiber optic equipment support system comprising:
a tray body having a first side edge portion, a second side edge portion, a front side edge portion, a rear side edge portion, and a middle portion located between the first side edge portion and the second side edge portion;
a plurality of mounting features secured to a floor surface of the middle portion;
a first rail secured to the first side edge portion;
a second rail secured to the second side edge portion;
a first fiber optic module positioned between the first rail and the second rail, and wherein the first fiber optic module is configured to be mounted to the middle portion of the tray body by at least one of the plurality of mounting features; and
a second fiber optic module positioned between the first rail and the second rail, and wherein the second fiber optic module is configured to be mounted to the middle portion of the tray body by at least one of the plurality of mounting features, and wherein a width of the second fiber optic module is different from a width of the first fiber optic module.

2. The fiber optic equipment support system of claim 1, the first fiber optic module comprising a release latch positioned on a side of the first fiber optic module, and wherein the first fiber optic module is releasable from the tray body via the release latch.

3. The fiber optic equipment support system of claim 1, the second fiber optic module comprising a release latch positioned on a side of the second fiber optic module, and wherein the second fiber optic module is releasable from the tray body via the release latch.

4. The fiber optic equipment support system of claim 1, wherein the first fiber optic module is configured to support a first number of fiber optic connection adapters, and the second fiber optic module is configured to support double the first number of fiber optic connection adapters.

5. The fiber optic equipment support system of claim 1, the floor surface of the middle portion comprising a cutout opening adjacent to the front side edge portion, wherein a width of the cutout opening is less than the width of the second fiber optic module.

6. The fiber optic equipment support system of claim 1, wherein the floor surface of the middle portion includes a cutout opening adjacent to the front side edge portion, and wherein when the first fiber optic module is mounted to the middle portion of the tray body at least a portion of the first fiber optic module hangs over a portion of the cutout opening.

7. The fiber optic equipment support system of claim 6, further comprising a cable routing component positioned further forward of the cutout opening in a forward direction.

8. The fiber optic equipment support system of claim 1, wherein a length of the plurality of mounting features is less than a length of the first rail, and the length of the plurality of mounting features is less than a length of the second rail.

9. A tray assembly for receiving a fiber optic module, the tray assembly comprising:
a tray body having a first side edge portion, a second side edge portion, a front side edge portion, a rear side edge portion, and a middle portion located between the first side edge portion and the second side edge portion;
a plurality of mounting features secured to a floor surface of the middle portion, the plurality of mounting features configured to mount a plurality of fiber optic modules to the tray body;
a first rail secured to the first side edge portion;
a second rail secured to the second side edge portion; and
a cutout opening included in the floor surface and located adjacent to the front side edge portion such that when a fiber optic module is mounted to the middle portion of the tray body at least a portion of the fiber optic module hangs over a portion of the cutout opening.

10. The tray assembly of claim 9, wherein the plurality of fiber optic modules includes a first fiber optic module positioned between the first rail and the second rail and a second fiber optic module positioned between the first rail and the second rail, and wherein a width of the second fiber optic module is different from a width of the first fiber optic module.

11. The tray assembly of claim 10, the first fiber optic module comprising a release latch positioned on a side of the first fiber optic module, and wherein the first fiber optic module is releasable from the tray body via the release latch.

12. The tray assembly of claim 10, the second fiber optic module comprising a release latch positioned on a side of the second fiber optic module, and wherein the second fiber optic module is releasable from the tray body via the release latch.

13. The tray assembly of claim 10, wherein the first fiber optic module is configured to support a first number of fiber optic connection adapters, and the second fiber optic module is configured to support double the first number of fiber optic connection adapters.

14. The tray assembly of claim 10, wherein a width of the cutout opening is less than the width of the second fiber optic module.

15. The tray assembly of claim 9, further comprising a cable routing component positioned further forward of the cutout opening in a forward direction.

16. The tray assembly of claim 9, wherein a length of the plurality of mounting features is less than a length of the first rail, and the length of the plurality of mounting features is less than a length of the second rail.

* * * * *